United States Patent
Wu et al.

(10) Patent No.: US 7,364,602 B2
(45) Date of Patent: Apr. 29, 2008

(54) AIR CLEANER ASSEMBLY

(75) Inventors: Guolian Wu, St. Joseph, MI (US); Andrew D. Litch, St. Joseph, MI (US); Marcus R. Fischer, St. Joseph, MI (US); Paul B. Allard, Stevensville, MI (US); Alexander J. Karp, St. Charles, IL (US)

(73) Assignee: Whirlpool Corporation, Benton Harbor, MI (US)

( * ) Notice: Subject to any disclaimer, the term of this patent is extended or adjusted under 35 U.S.C. 154(b) by 416 days.

(21) Appl. No.: 11/025,496

(22) Filed: Dec. 29, 2004

(65) Prior Publication Data

US 2005/0204713 A1    Sep. 22, 2005

Related U.S. Application Data

(63) Continuation-in-part of application No. 10/801,325, filed on Mar. 16, 2004, now abandoned.

(51) Int. Cl.
*B01D 46/00* (2006.01)

(52) U.S. Cl. .................. 55/493; 55/496; 55/497; 55/499; 55/501; 55/521; 55/DIG. 31; 55/DIG. 35; 55/422; 55/478; 55/480; 55/481; 55/506; 210/493.1; 210/493.3; 200/61.51; 200/61.52

(58) Field of Classification Search .............. 55/496, 55/497, 493, 499, 501, 521, DIG. 31, DIG. 35, 55/422, 478, 480, 481, 506; 210/493.1, 493.3; 200/61.51, 61.52
See application file for complete search history.

(56) References Cited

U.S. PATENT DOCUMENTS

| | | | | |
|---|---|---|---|---|
| 5,968,217 A | * | 10/1999 | Stein et al. ............... | 55/496 |
| 6,464,745 B2 | * | 10/2002 | Rivera et al. ............ | 55/497 |
| 6,723,150 B2 | * | 4/2004 | Parker ..................... | 55/521 |
| 7,037,354 B1 | * | 5/2006 | Dimicelli ................. | 55/497 |

* cited by examiner

*Primary Examiner*—Duane Smith
*Assistant Examiner*—Minh-Chau T. Pham
(74) *Attorney, Agent, or Firm*—Michael D. Lafrenz; John Morrison

(57) ABSTRACT

An air cleaner assembly for use with a conventional household air conditioning system with a duct having an opening sized to receive a standard panel filter comprises a peripheral frame sized to be received within the opening in the return duct and sized to receive a standard panel filter. The air cleaner assembly is adapted to move a filter element inserted into the recess to a position exterior of the recess so that multiple filter elements can be mounted inside the duct.

24 Claims, 47 Drawing Sheets

AIR CLEANER ASSEMBLY

This application is a Continuation-in-Part of patent application Ser. No. 10/801,325, filed Mar. 16, 2004 now abandoned.

BACKGROUND OF THE INVENTION

1. Field of the Invention

The invention relates generally to an air cleaner for an air conditioning system, such as a furnace or a central air conditioner, and more particularly to an air cleaner for loading multiple filter elements into an air duct of the air conditioning system.

2. Description of the Related Art

Conventional forced air household furnaces or central air conditioners (generically referred to as air conditioning systems) comprise a return duct to direct air into a central unit for conditioning the air by either heating or cooling the air and an outlet duct for distribution of the conditioned air from the central unit throughout the home. The return duct or other structure of the furnaces though which air flows typically has a filter disposed therein for removing dust and other particulate matter from the incoming air. As air passes through the filter, the matter is removed to prevent distribution through the home and to avoid contamination of the central unit.

Several types of filters exist for removal of matter from the air. The most common variety is a standard, rectangular panel replaceable filter, which is composed of a random arrangement of fibers, such as fiberglass. Panel filters are usually approximately one inch thick and are inserted into a similarly sized opening in the duct. They filter the air by trapping particles within the randomly oriented fibers. Although these filters are used in about 85% of American homes and are able to capture large particles, they do little to remove smaller contaminants from the air. Rather, standard panel filters mainly protect the central unit and minimize the amount of dust on the heating or cooling equipment. Once these filters become saturated with dirt, dust, and the like, they are meant to be removed from the duct and thrown away and replaced with a new filter.

Alternatives to the replaceable panel filter include replaceable and reusable pleated filters, high efficiency pleated filters, high efficiency particulate air (HEPA) filters, and washable fiberglass filters. Each of these alternatives is about one inch thick and can be used in lieu of the standard panel filter. As their name indicates, pleated filters are filters that are pleated or folded to provide a large surface area for collecting particles. High efficiency pleated filters are reusable or disposable and are electrostatically charged to capture small particulate matter less than one micron in diameter. Such small particles comprise approximately 98-99% of the particles of indoor air by count or number and are most strongly related to observed health impact. HEPA filters are efficient at removing submicron particles and comprise a core fiber that is folded back and forth over corrugated separators. The fiber is composed of very fine sub-micron glass fibers in matrix of larger fibers. Washable fiberglass filters are similar to the conventional panel filters but can be washed and, therefore, reused.

Each type of filter has advantages and disadvantages. For example, pleated filters are effective at removing small particles, but they must be replaced more frequently than panel filters to avoid airflow restriction. HEPA filters efficiently remove submicron particles, but they are relatively expensive and create a high pressure drop, which is undesirable in a home heating or cooling system. Additionally, washable fiberglass filters cannot be completely cleaned to their original state and, therefore, can restrict airflow. Because only one of these filters can fit into the duct at a time, the user must analyze the advantages and disadvantages of each type of filter while selecting which one to employ.

Another system for removing particles from air in a home heating or cooling system is an electronic air cleaner. Duct mounted electronic air cleaners, which typically use electrostatic precipitation systems, use an electrostatic or ionic field to trap charged particles. Such systems are extremely efficient, especially in the 0.1 to 10 micron size range, and advantageously create a very low pressure drop. Because trapped particles on collecting plates can build up and reduce the electrostatic field and, hence, collection efficiency, the cleaners should be cleaned weekly or monthly. Electrostatic precipitators can emit small amounts of ozone, which can be reduced with the addition of a carbon post filter or by using positive ionization instead of negative. While electronic air cleaners are more effective than the above-described fiber-based filters (with the exception of HEPA filters), they are relatively very expensive by comparison. Currently, they also are designed as a separate special unit that is installed between the central unit and the return duct and have a width typically between four and six inches. The special unit cannot fit within the standard filter opening found in most return ducts and also require relatively complicated installation, which is typically performed by a professional.

Electronic air cleaners are sometimes known to include conventional fiber-based filters instead of energized collecting plates along with its typical ionizer or field charger section. The filter may also in some instances be actively charged or energized to improve collection efficiency. This combination is called a hybrid filter. These hybrid filters can have a slightly increased air pressure drop compared to an electronic air cleaner with collecting plates due to decreased free flow area, but they have better particulate loading properties due to increased surface area.

The need for professional installation of electronic air cleaners, including hybrid filters, and other air cleaner assemblies and their much higher cost weighs heavily against retrofitting current heating or cooling systems with these types of systems. Thus, it is desirable to have a highly effective air cleaner can be easily installed into the standard filter opening found in most return ducts.

SUMMARY OF THE INVENTION

An expandable air cleaner frame according to the invention for an air conditioning system having a duct with an opening having a predetermined size and defining an airflow path comprises a peripheral frame sized to be slidably received within the opening in the duct, and the peripheral frame forming a filter element recess sized to receive a filter element; and a carrier for carrying a filter element and moveably mounted to the peripheral frame for movement between a collapsed condition, where the collective thickness of the peripheral frame and the carrier is such that they can be received within the opening in the duct, and an expanded condition, wherein the collective thickness of the peripheral frame and the carrier is greater than the opening in the duct. The expandable air cleaner frame can be inserted into the duct opening with the carrier in the collapsed condition and then moved to the expanded condition to permit multiple filter elements to be inserted into the duct through the duct opening.

At least a portion of the carrier can be received within the filter element recess when the carrier is in the collapsed condition.

The peripheral frame can comprise an aperture through which a filter element can be slidably inserted into the peripheral frame.

During movement of the carrier from the collapsed to the expanded condition, the carrier can move into the duct in a direction along the airflow path through the duct.

The expandable air cleaner frame can further comprise an expansion mechanism for moving the carrier between the collapsed and expanded conditions. The expansion mechanism can be operable externally of the duct when the expandable air cleaner frame is inserted into the duct to permit the movement of the carrier from the collapsed to the expanded condition after the expandable air cleaner frame is inserted within the duct. The expansion mechanism can move the carrier relative to the peripheral frame to thereby change the collective thickness of the peripheral frame and the carrier.

The carrier can comprise a guide support with a guide for moving at least one of the multiple filter elements from the filter element recess to a position exterior of the filter element recess. The guide support can direct the at least one of the multiple filter elements to the position exterior of the filter element recess as the at least one of the multiple filter elements is inserted into the duct through the duct opening. The carrier can further comprise a guide follower mounted on the at least one of the multiple filter elements and operably coupled to the guide for directing the at least one of the multiple filter elements to the position exterior of the filter element recess. The guide can comprise a groove in the guide support, and the guide follower can comprise a projection sized for receipt within the groove. The groove can comprise an arcuate portion that guides the projection exterior of the recess as the filter element is inserted into the duct. The guide follower can further comprise a trailing projection, and the guide can further comprise a positioning branch integral with the groove for positioning the trailing projection exterior of the recess.

The guide support can comprise an actuator to permit the movement of the carrier from the collapsed to the expanded condition after the expandable air cleaner frame is inserted into the duct. At least a portion of the guide support can extend exterior of the filter element recess when the carrier is in the expanded condition. The guide support can be pivotally mounted to the peripheral frame.

An air cleaner assembly according to the invention for an air conditioning system having a duct with an opening having a predetermined size and defining an airflow path comprises a peripheral frame sized to be slidably received within the opening in the duct, and the peripheral frame forming a recess with an insert opening; a filter element mountable to the peripheral frame in an installed position, where at least a portion of the filter element is upstream or downstream of the recess, by inserting the filter element through the insert opening; and a positioning coupler operably coupling the filter element and the peripheral frame and guiding the filter element to the installed position as the filter element is inserted through the insert opening.

The positioning coupler comprises a guide support mounted to the peripheral frame for moving the filter element upstream or downstream of the recess. The guide support can be movable from a collapsed condition, where the peripheral frame and the guide support can be inserted through the opening in the duct, to an expanded condition, where at least a portion of the guide support extends upstream or downstream of the recess. The guide support can comprise an actuator to permit the movement of the guide support from the collapsed condition to the expanded condition after the peripheral frame is inserted into the duct. The guide support can be pivotally mounted to the peripheral frame.

The guide support can comprise a guide that directs the filter element upstream or downstream of the recess as the filter element is inserted into the insert opening. The positioning coupler can further comprise a guide follower mounted on the filter element and operably coupled to the guide for directing the filter element upstream or downstream of the recess. The guide can comprise a groove, and the guide follower can comprise a projection sized for receipt within the groove. The groove can comprise an arcuate portion that guides the projection upstream or downstream of the recess as the filter element is inserted through the insert opening. Alternatively, the guide can comprise a tapered groove, and the guide follower can comprise a swing arm that mounts the projection and is movably mounted to the filter element such that the swing arm forces the filter element upstream or downstream of the recess as the projection moves along the tapered groove. The air cleaner assembly can further comprise a biasing element that biases the swing arm to a ready position wherein the projection is oriented relative to the filter element for insertion into the guide. The biasing element can comprise a cantilevered leaf spring or a torsion spring.

An air cleaner assembly according to the invention for an air conditioning system having a duct with an opening having a predetermined size and defining an airflow path comprises a peripheral frame sized to be slidably received within the opening in the duct, and the peripheral frame forming a recess with an insert opening; a first filter element sized to be slidably received in the recess through the insert opening; and an expander mounted to the peripheral frame and operable from an insert condition to an installed condition for moving the first filter element from the recess to an installed position wherein at least a portion of the first filter element is exterior of the recess.

The exterior of the recess can be one of upstream and downstream of the recess relative to the airflow path in the duct. The air cleaner assembly can further comprise a second filter element in the other of the upstream and downstream of the recess. Alternatively, the air cleaner assembly can further comprise a second filter element in the recess and a third filter element in the other of the upstream and downstream of the recess.

The first filter element can be inserted into the recess through the insert opening. The first filter element can be only partially received in the recess before the expander moves the first filter element exterior of the recess.

The expander can comprise an auxiliary peripheral frame sized to carry the first filter element and located at least partially in the recess when the expander is in the insert condition and exterior of the recess when the expander is in the installed condition. The expander can further comprise an expansion mechanism that couples the auxiliary peripheral frame to the peripheral frame and moves the auxiliary peripheral frame relative to the peripheral frame when the expander moves between the insert and the installed conditions.

The expander can comprise a guide that directs the first filter element exterior of the recess as the first filter element is inserted into the insert opening. The expander can further comprise a guide follower mounted on the first filter element and operably coupled to the guide for directing the first filter element exterior of the recess. The guide can comprise a groove in the expander, and the guide follower can comprise a projection sized for receipt within the groove. The groove can comprise an arcuate portion that guides the projection exterior of the recess as the expander moves to the installed condition. Alternatively, the guide can comprise a tapered groove, and the guide follower can comprise a swing arm that mounts the projection and is movably mounted to the first filter element and the tapered groove such that the tapered groove forces the swing arm and the first filter element exterior of the recess as the projection moves along the tapered groove. The air cleaner assembly can further comprise a biasing element that biases the swing arm to a ready position wherein the projection is oriented relative to the first filter element for insertion into the guide. The biasing element can comprise a cantilevered leaf spring or a torsion spring.

DESCRIPTION OF THE INVENTION

The invention provides a cost-efficient air cleaner that permits usage of a multi-component filter system in a standard filter opening without professional installation. One implementation of the invention is an expandable air cleaning system having an expandable air cleaner frame that supports multiple filters and/or air conditioning elements and that can be inserted into a standard opening of a duct while in a collapsed condition and thereafter transformed to an expanded condition. The frame can be reverted to the collapsed condition for removal from the duct if any of the multiple filters and/or air conditioning elements require replacement or cleaning.

Figure 1:
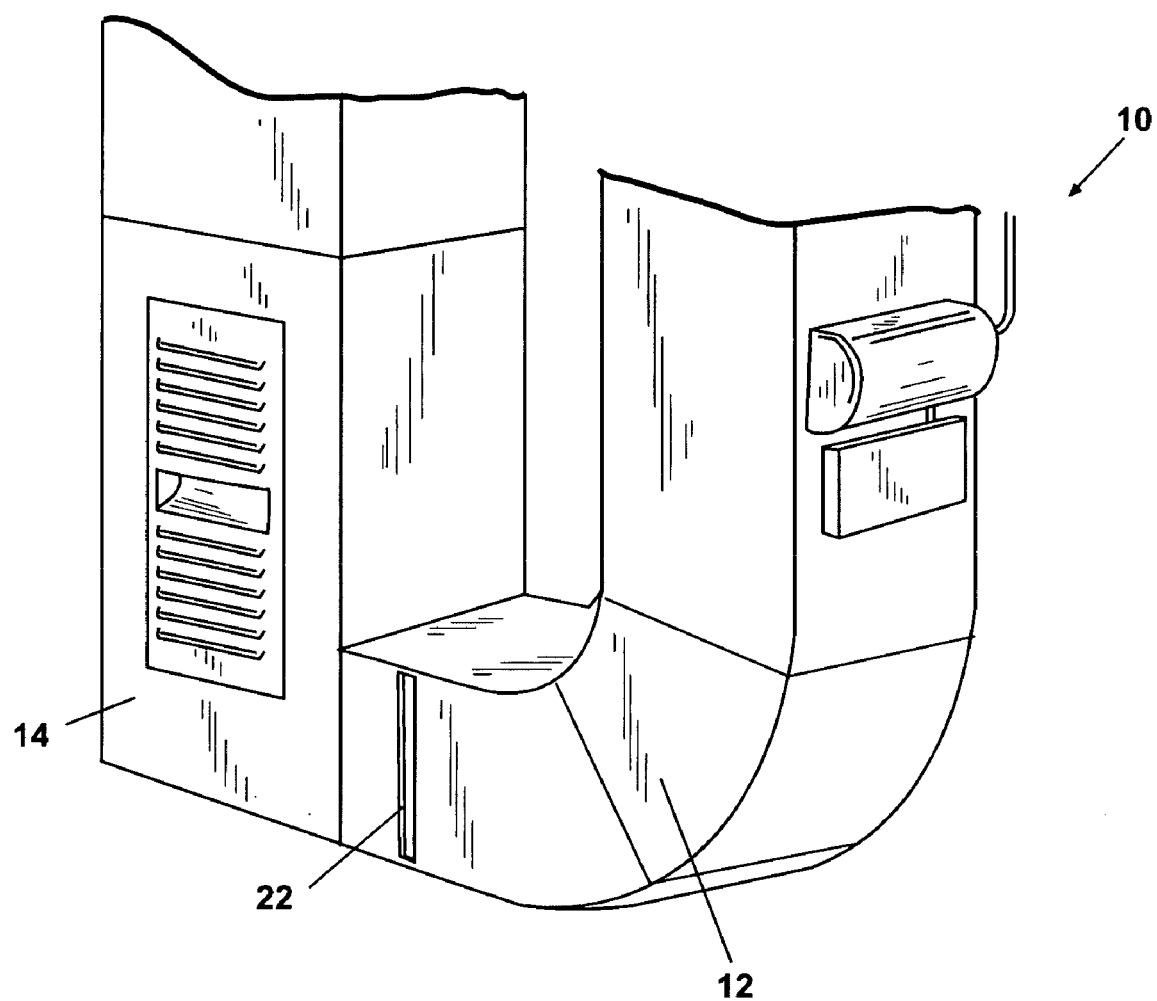
FIG. 1 is a perspective view of an air conditioning system in the form of a household furnace having a return duct defining an airflow passageway and having an opening sized to receive a standard filter.

Referring now to the figures and to FIG. 1 in particular, a typical air conditioning system in the form of a household furnace 10 comprises a return duct 12 defining an interior airflow passageway (FIG. 12), a central unit 14, and outlet ducts (not shown) downstream from the central unit 14. A blower or fan (not shown) draws air from the return duct 12 and into the central unit 14, where the air is heated. The heated air is distributed from the central unit 14 throughout a house though the outlet ducts. The return duct 12 usually comprises a filter opening 22 having an industry standard predetermined size to receive a conventional, standard panel filter, which typically has a square or rectangular shape, depending on the size of return duct, and has an industry standard thickness of approximately one inch. When disposed inside the return duct 12, the conventional panel filter removes dust and other particulate matter from the airflow therethrough. Once the conventional panel filter becomes dirty, it is removed through the opening and discarded.

In homes with central air conditioning, the central unit 14 includes one or more evaporator coils to cool the air. When the air conditioning system is used, the air drawn into the central unit 14 is cooled by the evaporator coil(s) and then distributed throughout the house through the outlet ducts. As used in this description, the term central unit 14 applies to any air heating and/or cooling system using circulated air.

For purposes of this description, the term air conditioning system is used to generically reference any system that conditions the air. Such systems include traditional household forced-air furnaces and air conditioners. For simplicity, the description focuses on the use of the invention within a furnace. However, the invention is applicable to any air conditioning system.

Figure 2:
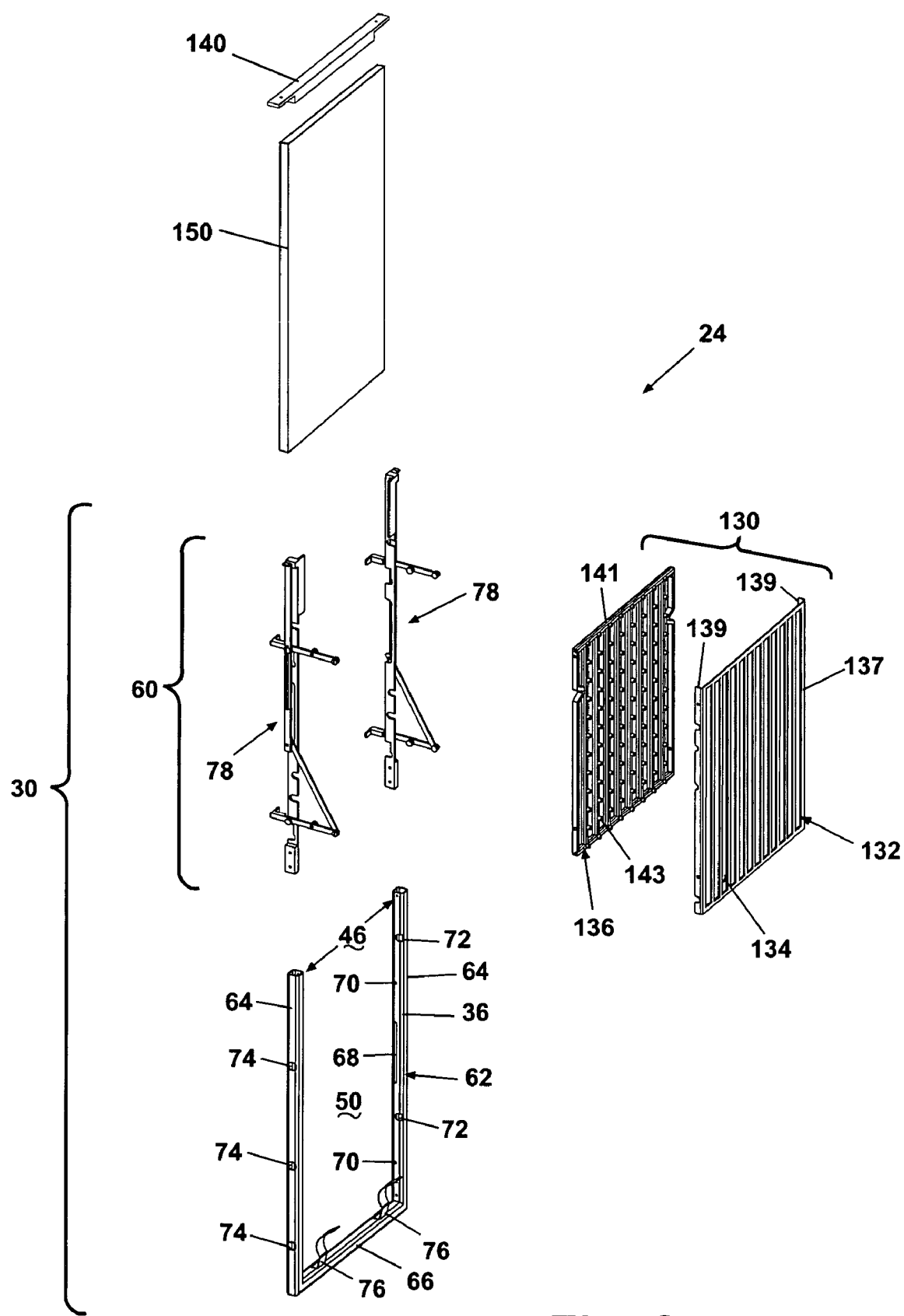
FIG. 2 is an exploded view of an air cleaner according to the invention and comprising a collector, an air conditioning element, and an expandable air cleaner frame including a peripheral frame and an expansion mechanism.
Figure 3:
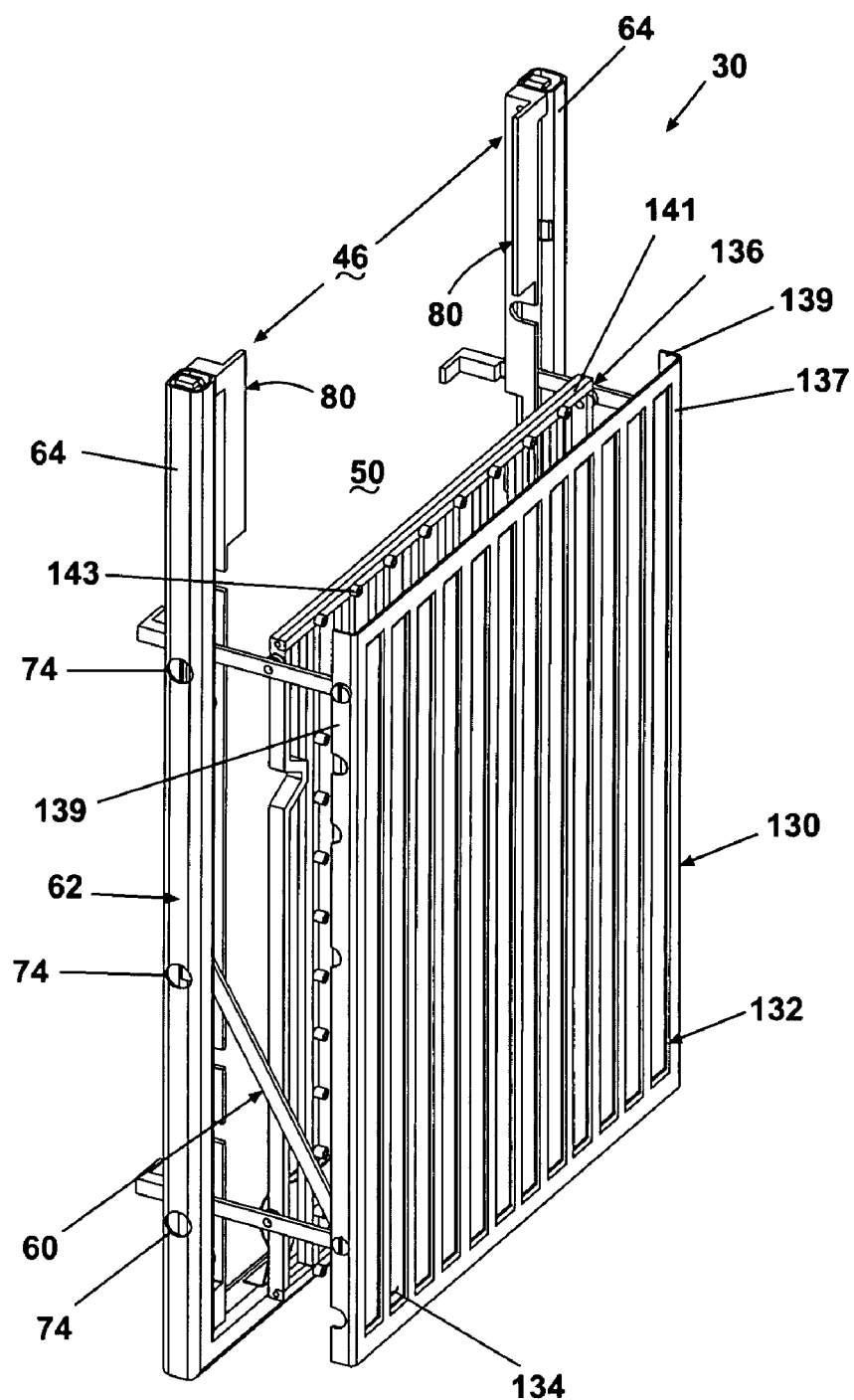
FIG. 3 is a perspective view of the expandable air cleaner frame and air conditioning element in FIG. 2, wherein the expandable air cleaner frame is in an expanded condition.
Figure 4:
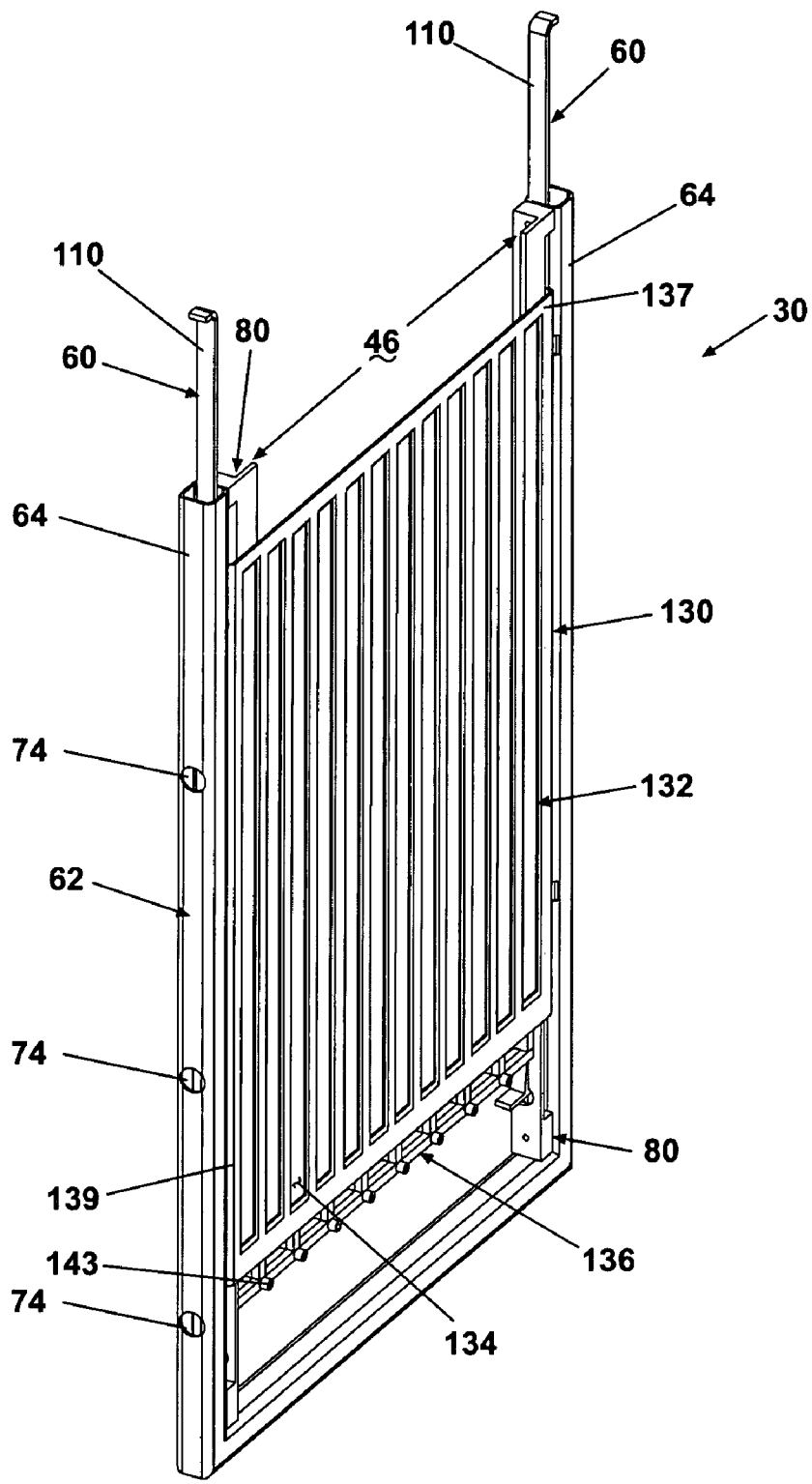
FIG. 4 is a perspective view of the expandable air cleaner frame and air conditioning element in FIG. 2, wherein the expandable air cleaner frame is in a collapsed condition.

FIGS. 2-4 illustrate an air cleaner 24 according to the invention that can be inserted through the standard filter opening 22 in the return duct 12 of the furnace 10 or of a central air conditioning system without the need for professional installation. The air cleaner 24 comprises an expandable air cleaner frame 30 that carries or supports an air conditioning element 130 and a collector 150. The expandable air cleaner frame 30 is operable between a collapsed position (FIG. 4), where it can be inserted into the opening 22, and an expanded condition (FIG. 3), where it carries the air conditioning element 130 within the duct 12.

In the present embodiment, the air conditioning element 130 is a field charger comprising an earth plane 132 and an ionization grid 136. The earth plane 132, located upstream of the ionization grid 136, has a planar base 137 with down-turned side edges 139, is preferably composed of a metallic material, and is preferably at an electrical potential of earth ground. A plurality of geometrically shaped cutouts 134 is formed in the planar base 137 of the earth plane 132. The ionization grid 136 comprises a peripheral frame 141 supporting electrically connected pins 143 or, alternatively, metal wires, that are at a high voltage to perform ionization of the air. The ionization grid 136 creates and releases ions that are drawn upstream to the grounded metallic earth plane 132. Dirt, dust, and other particulate matter within the air that flows through the cutouts 134 interact with the ions to form ionized particles that carry a charge. The cutouts 134 of the earth plane 132 condition the flow direction of the air and the particles constrained therein so as to increase the likelihood that the dust particles will be drawn to the ions to create ionized particles.

In the present embodiment, an air conditioning element carrier is integral with the air conditioning element 130. The planar base 137 and the edges 139 perform the carrier function for the earth plane 132. The peripheral frame 141 performs the carrier function for the ionization grid 136. The carrier function is the mounting of the air conditioning element 130 to an expansion mechanism 60 and a peripheral frame 62. For purposes of the invention, however, the air conditioning element carrier can be a separate component, such as a frame or crossbars, that supports the air conditioning element 130. Because the air conditioning element carrier and the air conditioning element 130 are integral in the present embodiment, reference to the air conditioning element 130 in the remainder of the description of this embodiment inherently refers to both the air conditioning element carrier and the air conditioning element 130.

The type of air conditioning element is not critical to the invention. Other types of air conditioning elements can also be used. Examples of other suitable air conditioning elements are a series of charged metal collection plates, as in an electrostatic precipitator. Alternatively, the air conditioning element can comprise a single element, such as a flow directing plane; an ionization grid; a charging plate, such as a charging grid; a standard panel filter; a pleated filter; an electrostatically charged pleated filter; a washable filter; an actively charged filter; an odor elimination and/or volatile organic compound (VOC) elimination module such as a carbon filter; an ultraviolet light module for eliminating bacteria, fungi, and viruses; an ultraviolet light or standard light with a titanium dioxide coated filter module for eliminating VOCs and other pollutants; a module having an anti-microbial agent; a humidification module; a dehumidification module; an aromatherapy module that emits fragrant substances; a booster fan module; or combinations thereof. In short, the air conditioning element can comprise any type and number of structures or devices to alter, in any respect, the air that flows therethrough.

The collector 150 collects the particles or other matter in the air. Preferably, the collector 150 is complementary to the air conditioning element 130 and is designed to collect the ionized particles created by the air conditioning element 130. However, the type of collector, like the air conditioning element, is not critical to the invention. Many suitable types of collectors can be used. The collector 150 can be any device for collecting dust or other particulate matter, including ionized particles, from the air. Examples of the collector are a panel filter; a pleated filter; an electrostatically charged pleated filter; a washable filter; an actively charged filter; a charged plate; an odor elimination and/or VOC elimination module such as a carbon filter; an ultraviolet light module for eliminating bacteria, fungi, and viruses; an ultraviolet light or standard light with a titanium dioxide coated filter module for eliminating VOCs and other pollutants; a module having an anti-microbial agent; a humidification module; a dehumidification module; or combinations thereof suitable for use in a household furnace 10. Another example of the collector 150 is a charged device as disclosed in PCT Application Publication No. 00/61293. This device includes airflow passageways defined by plastic walls having areas of conductive material. High and low potentials are applied to these areas to attract charged or ionized particles as they flow through the passageways. Additionally, the collector 150 can comprise more than one collector, including multiples of the same collector or combinations of different types of collectors. Further, the collector 150 can be an air conditioning element similar to the air conditioning element 130. When the collector 150 is different from the air conditioning element 130, the combination of the collector 150 and the air conditioning element 130 forms a hybrid air cleaner. Both the collector 150 and the air conditioning element 130, regardless of type, can be generically referred to as filter elements.

The expandable air cleaner frame 30 permits the use of the air conditioning element 130 and/or collector 150 in the standard filter opening 22, unlike prior air cleaning systems. The expandable air cleaner frame 30 comprises the expansion mechanism 60 and the peripheral frame 62. The peripheral frame 62 comprises spaced hollow bars 64 joined at one end by a cross bar 66 to form a U-shaped structure defining a recess 50 therein. An elongated aperture 46 that functions as an insert opening separates the other ends of the hollow bars 64. A plurality of apertures, such as slot 68, holes 70, and notches 72, are disposed along the inside surface of the hollow bars 64, and three generally circular apertures 74 are positioned on the outside surface of the hollow bars 64. Additionally, optional spring tabs 76 positioned on the cross bar 66 extend towards the recess 50. When the collector 150 comprises more than one collector, the spring tabs 76 push the individual collectors in the direction of airflow to facilitate loading of subsequent collectors.

The expansion mechanism 60 functions as an expander and couples the air conditioning element 130 to the peripheral frame 62. As the expandable air cleaner frame 30 is moved between the expanded and collapsed conditions by actuating the expansion mechanism 60, the air conditioning element 130 is correspondingly moved between an expanded condition, wherein the air conditioning element 130 is spaced from the recess 50, as shown in FIG. 3, and a collapsed condition, wherein the air conditioning element 130 is displaced towards the recess 50, as shown in FIG. 4.

Figure 5:
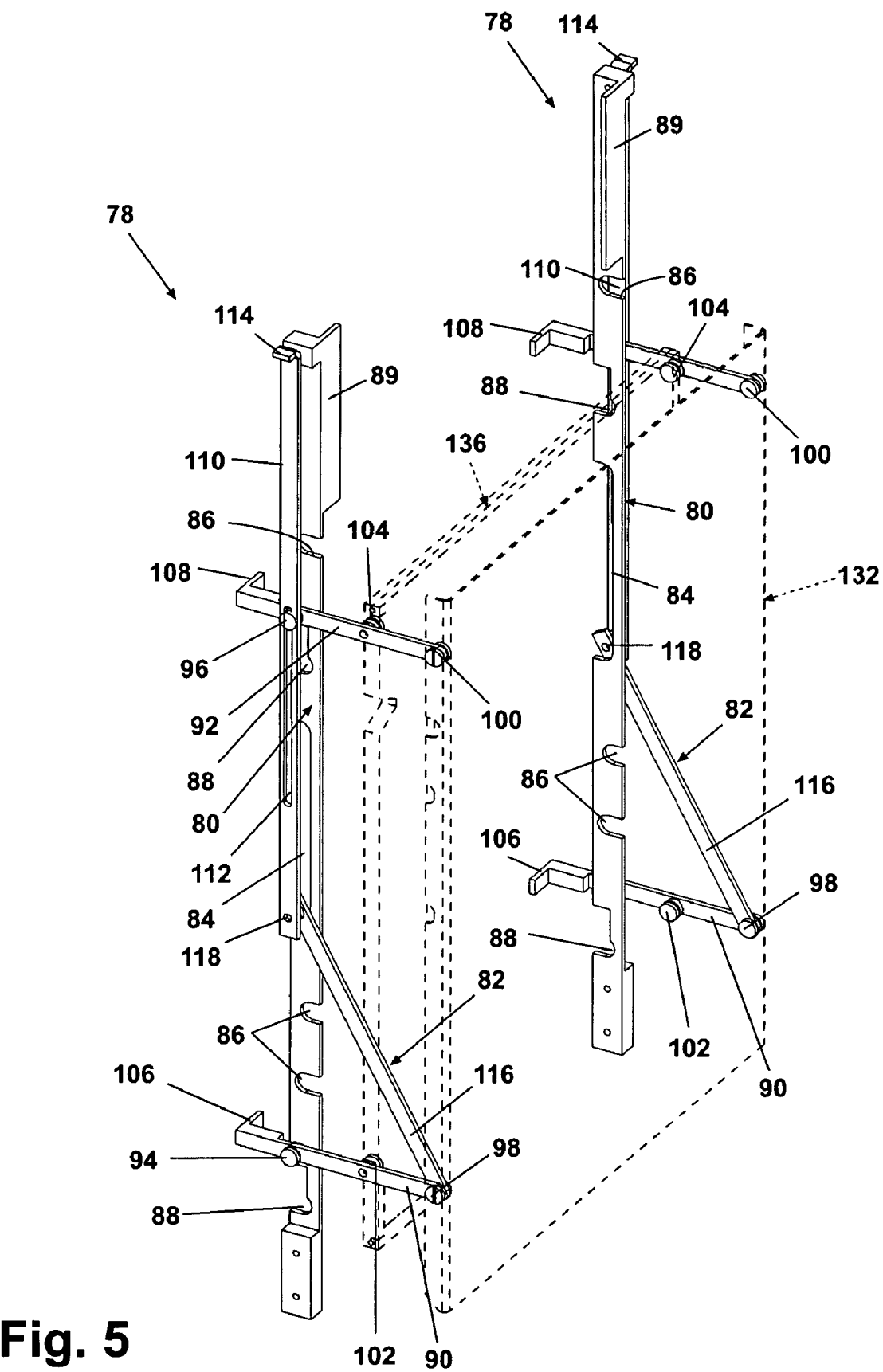
FIG. 5 is perspective view of the expansion mechanism from FIG. 2 in the expanded condition.
Figure 6:
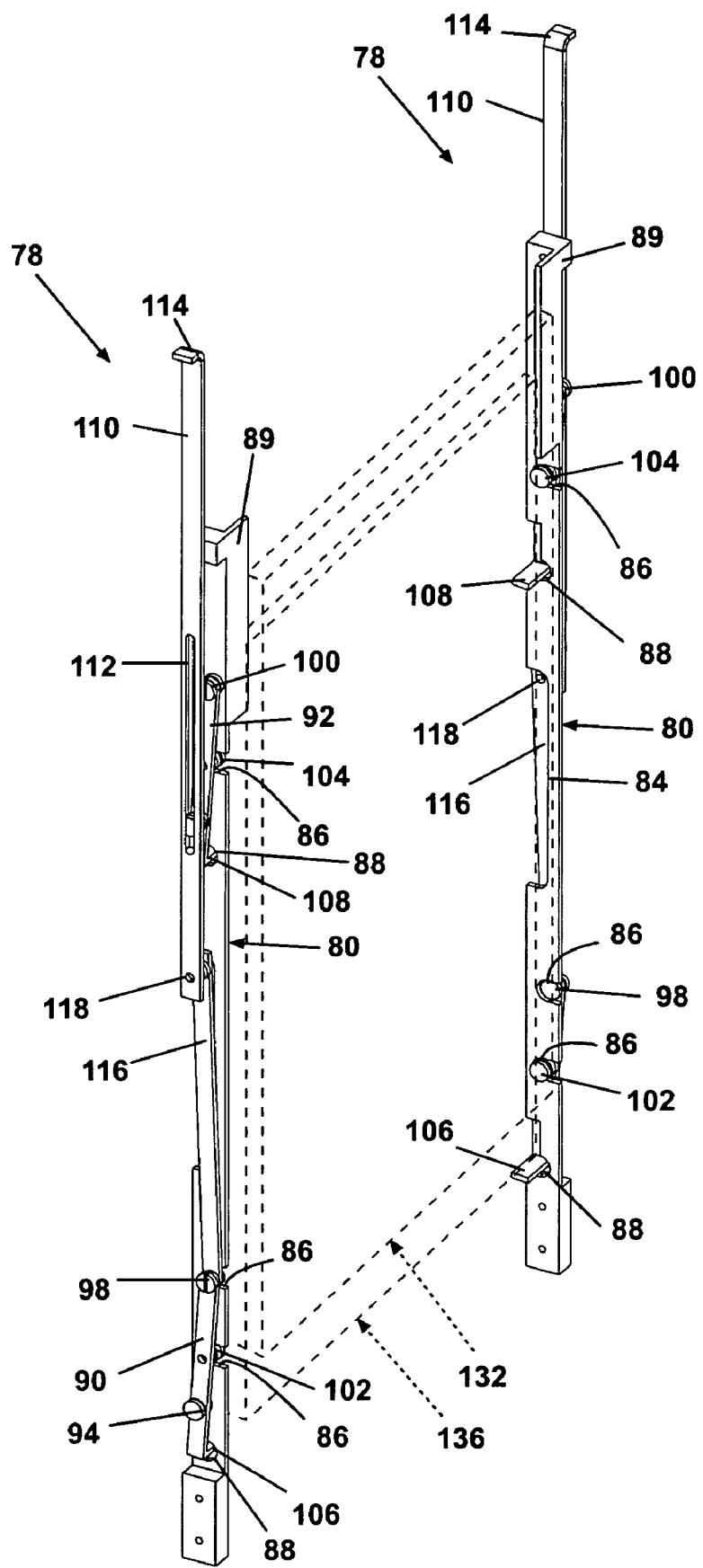
FIG. 6 is a perspective view of the expansion mechanism from FIG. 2 in the collapsed condition.

Referring to FIGS. 5 and 6 specifically and FIGS. 2-4 generally, the expansion mechanism 60 comprises two linkage assemblies 78 that are mirror images of each other and wherein one is disposed on each side of the peripheral frame 62 and the air conditioning element 130. For simplicity, only one of the linkage assemblies 78 will be described herein in detail, with it being understood the description applies to both.

The linkage assembly 78, which is best viewed in the expanded condition in FIG. 5, comprises a guide rail 80 and a series of mechanical linkages 82. The relative positioning of elements of the expansion mechanism 60 will be described herein with reference to the orientation of FIGS. 5 and 6. The guide rail 80 is an elongated member with an inwardly extending filter guide 89 at one end thereof and further comprises a central elongated groove 84, a plurality of notches 86, and a pair of indents 88.

The mechanical linkages 82 comprises parallel first and second mounting arms 90 and 92 that are each pivotally mounted near one end to the guide rail 80 with pivot pins 94 and 96, respectively, and to the air conditioning element 130, which is shown in phantom in FIGS. 5 and 6, at the other end. Specifically, the mounting arms 90 and 92 are mounted to the earth plane 132 at pivot pins 98 and 100, respectively, and to the ionization grid 136 at pivot pins 102 and 104, respectively. When the air conditioning element 130 comprises only one component, the pivot pins 102 and 104 are not required. Each of the first and second mounting arms 90 and 92 further comprise an inwardly directed flange 106 and 108, respectively, at the end adjacent the pivot pins 94 and 96.

Because of the orientation of the pivot pins 98 and 100 relative to that of the pivot pins 102 and 104, the earth plane 132 and the ionization grid 136 are secured in parallel alignment. However, since the first and second mounting arms 90 and 92 are coupled with the earth plane 132 and the ionization grid 136 by means of pivot pins, the first and second mounting arms 90 and 92 can pivot relative to the air conditioning element 130. As the mounting arms 90 and 92 rotate, the earth plane 132 and the ionization grid 136 maintain a parallel orientation while the spacing therebetween decreases or increases, depending on the rotation direction.

The series of mechanical linkages 82 further comprises an actuating arm 110 with a lengthwise slot 112 and a finger tab 114. The actuating arm 110 is substantially colinear with and movable relative to the guide rail 80, and the pivot pin 96 of the second mounting arm 92 resides in the slot 112. When the expansion mechanism 60 is in the expanded condition, as shown in FIG. 5, the finger tab 114 is coincident with an end of the guide rail 80. As the finger tab 114 is pulled away from the end of the guide rail 80, the actuating arm 110 moves to the collapsed condition shown in FIG. 6, and the slot 112 is displaced relative to the pivot pin 96.

A linkage arm 116 links the first mounting arm 90 with the actuating arm 110. Specifically, the linkage arm 116 is pivotally coupled with the first mounting arm 90 at the pivot pin 98 and with the end of the actuating arm 110 at a pivot pin 118. Further, the pivot pin 118 resides in the groove 84 of the guide rail 80 such that the pivot pin 118 can slide along the groove 84 as the expansion mechanism 60 moves between the expanded and collapsed conditions. As a result of the pivot pins 98 and 118, the first mounting arm 90, the linkage arm 116, and the actuating arm 110 are interconnected. Movement of one of the arms 90, 116, or 110 results in simultaneous movement of the other two arms. Most notably, the reciprocation of the actuating arm causes the first mounting arm to pivot. The second mounting arm 92 is likewise pivoted because the first and second mounting arms are coupled in movement by the air conditioning element 130. Thus, the reciprocation of the actuating arm 110 moves the air conditioning element 130 between the collapsed and extended positions.

When the expansion mechanism 60 is assembled to the peripheral frame 62, the actuating arm 110 is disposed inside the corresponding hollow bar 64, as seen in FIGS. 3 and 4, while the guide rail 80 and the other components of the mechanical linkages 82 are disposed adjacent to the corresponding hollow bar 64 such that the filter guides 89 are directed towards the recess 50. The pivot pins 94 and 96 are received through the corresponding holes 70 of the hollow bar 64, and the pivot pin 118 resides in the slot 68 in the hollow bar 64.

To move the expandable air cleaner frame 30 from the expanded condition in FIGS. 2, 3, and 5, to the collapsed condition in FIGS. 4 and 6, the actuating arms 110 are pulled away from the peripheral frame 62 by means of the finger tabs 114. As the actuating arms 110 move, the slots 112 are displaced relative to the pivot pins 96 of the second mounting arms 92, and the pivot pins 118 of the actuating arms 110 travel through the grooves 84 on the guide rails 80. In turn, the pivot pins 118 draw the linkage arms 116 in the same direction as the actuating arms 110, and the linkage arms 116 simultaneously pivot and pull the pivot pins 98 towards the guide rails 80. The motion of the linkage arms 116 and the pivot pins 98 causes the first mounting arms 90 to pivot counterclockwise, relative to the view in FIG. 5, about pivot pin 94 and towards the guide rails 80. Rotation of the first mounting arms 90 forces the earth plane 132 and the ionization grid 136 to move in the same direction as the actuating arms 110. As a result, the earth plane 132 and the ionization grid 136 compel the second mounting arms 92 to rotate about the pivot pins 96 in a counterclockwise direction, relative to the view in FIG. 5, towards the guide rails 80. During rotation of the first and second mounting arms 90 and 92, the flanges 106 and 108 move towards the nearby indents 88 in the guide rails 80 and the pivot pins 102, 98, and 104 move towards the corresponding notches 86 in the guide rails 80. Furthermore, the pivot pins 98 and 100 move towards the notches 72 of the hollow bars 64.

As discussed above, the earth plane 132 and the ionization grid 136 maintain a parallel orientation as the first and second mounting arms 90 and 92 rotate towards the guide rails 80. Further, the earth plane 132 and the ionization grid 136 become offset relative to each other while the spacing therebetween decreases. In particular, the ionization grid 136 shifts towards the peripheral frame 62, and the earth plane 132 moves towards the ionization grid 136.

The expandable air cleaner frame 30 achieves the collapsed condition in FIG. 6 when the actuating arms 110 are fully extended, the linkage arms 116 are substantially parallel with the guide rails 80, and the first and second mounting arms 90 and 92 are completely rotated and substantially colinear with the guide rails 80. The flanges 106 and 108 of the fully rotated first and second mounting arms 90 and 92, respectively, are received within the nearby indents 88 in the guide rails 80, the pivot pins 102, 98, and 104 are positioned in the corresponding notches 86 in the guide rails 80, and the pivot pins 98 and 100 are disposed in the notches 72 of the hollow bars 64.

In the collapsed condition, the air conditioning element 130 is shifted towards the peripheral frame 62. In the embodiment shown in FIG. 3, the earth plane 132 and the ionization grid 136 are directly adjacent to each other and the ionization grid 136 is directly adjacent to the guide rails 80. The air conditioning element 130 can reside completely within the recess 50, as illustrated in FIG. 3, or in another location, such as partially within the recess 50 or adjacent the recess 50. When collapsed, the collective thickness of the expandable air cleaner frame 30, which, in general, is the thickness of the peripheral frame 62 plus the thickness of any portion of the expansion mechanism 60 and the air conditioning element carrier that extends beyond the peripheral frame 62, is equal to a predetermined expandable air cleaner frame thickness that is less than the width of the opening 22. Because the collective thickness is less than the width of the opening 22 in the return duct 12, the collapsed expandable air cleaner frame 30 can be received within the opening 22.

To move the expandable air cleaner frame 30 from the collapsed condition to the expanded condition, the actuating arms 110 are pushed towards the peripheral frame 62, by means of the finger tabs 114. As a result, the series of mechanical linkages 82 moves and rotates in a manner opposite of that described above for moving the expandable air cleaner frame 30 from the expanded condition to the collapsed condition. In brief, the actuating arms 110 urge the linkage arms 116 towards the first mounting arms 90 thereby forcing the first mounting arms 90 to rotate clockwise, relative to the view in FIG. 5, about the pivot pins 94. As the first mounting arms 90 rotate, the air conditioning element 130 shifts away from the recess 50. Movement of the earth plane 132 and the ionization grid 136 forces the second mounting arms 92 to rotate clockwise, relative to the view in FIG. 5, about the pivot points 96. The first and second mounting arms 90 and 92 rotate until they are substantially perpendicular relative to the guide rails 80. In this condition, the earth plane 132 and the ionization grid 136 are spaced from each other and from the peripheral frame, as shown in FIG. 5, and the collective thickness is greater than the width of the opening 22.

When the expandable air cleaner frame 30 is in the expanded condition, the air conditioning element 130 is spaced from the recess 50, and the collector 150, such as a conventional or standard panel filter or an electrostatically charged filter, having a width less than that of the aperture 46 can be positioned therein. The collector 150 is inserted into the expandable frame 30 through the aperture 46 in the peripheral frame 62, and the filter guides 89 on the guide rails 80 direct the collector 150 into position. The spring tabs 76 on the peripheral frame 62 secure the fully inserted collector 150 within the expandable air cleaner frame 30. The flanges 106 and 108 support the collector 150 so that it is not inadvertently forced downstream. An end cap 140, as shown in FIG. 2, can be positioned over the aperture 46 and mounted to the actuating arms 110 to further secure the collector 150 in place. The collector 150 can be removed by simply pulling it out of the recess 50 through the aperture 46. If there is more than one collector, a last inserted collector can be removed by simply pulling it through the aperture 46, and removal of a first inserted collector can optionally be facilitated by the use of finger loops or tabs (not shown).

Alternatively, the collector 150 can be positioned within the peripheral frame 62 when the expandable air cleaner frame 30 is in the collapsed condition, depending on the orientation of the collapsed air conditioning element 130 relative to the recess 50 or the size of the collector 150. If the air conditioning element 130 is adjacent to the recess 50 or if the thickness of the collector 150 is small enough to provide sufficient clearance for the air conditioning element 130 within the recess 50, then the collector 150 can be received within the peripheral frame 62 while the expandable air cleaner frame 30 is collapsed. In another scenario, a compressible collector can be inserted into the peripheral frame 62 while the expandable air cleaner frame 30 is expanded, and the expandable air cleaner frame 30 can thereafter be moved to the collapsed condition even if at least a portion of the air conditioning element 130 resides within the recess 50. As the air conditioning element 130 enters the recess 50, it compresses the collector 150 to accommodate the portion of the air conditioning element 130 that resides within the recess 50.

The expandable air cleaner frame 30, the air conditioning element 130, and the collector 150 form an air cleaner assembly having an effective thickness. The effective thickness is defined as the thickness of the expandable air cleaner frame 30 with the collector 150 therein plus the thickness of any portion of the air conditioning element 130 that extends beyond the expandable air cleaner frame 30. When in the collapsed condition, the effective thickness of the air cleaner assembly is less than the width of the opening 22, and the air cleaner assembly can be inserted through the opening 22. However, when moved to the expanded condition, the effective thickness of the air cleaner assembly increases to greater than the width of the opening 22.

Figure 7:
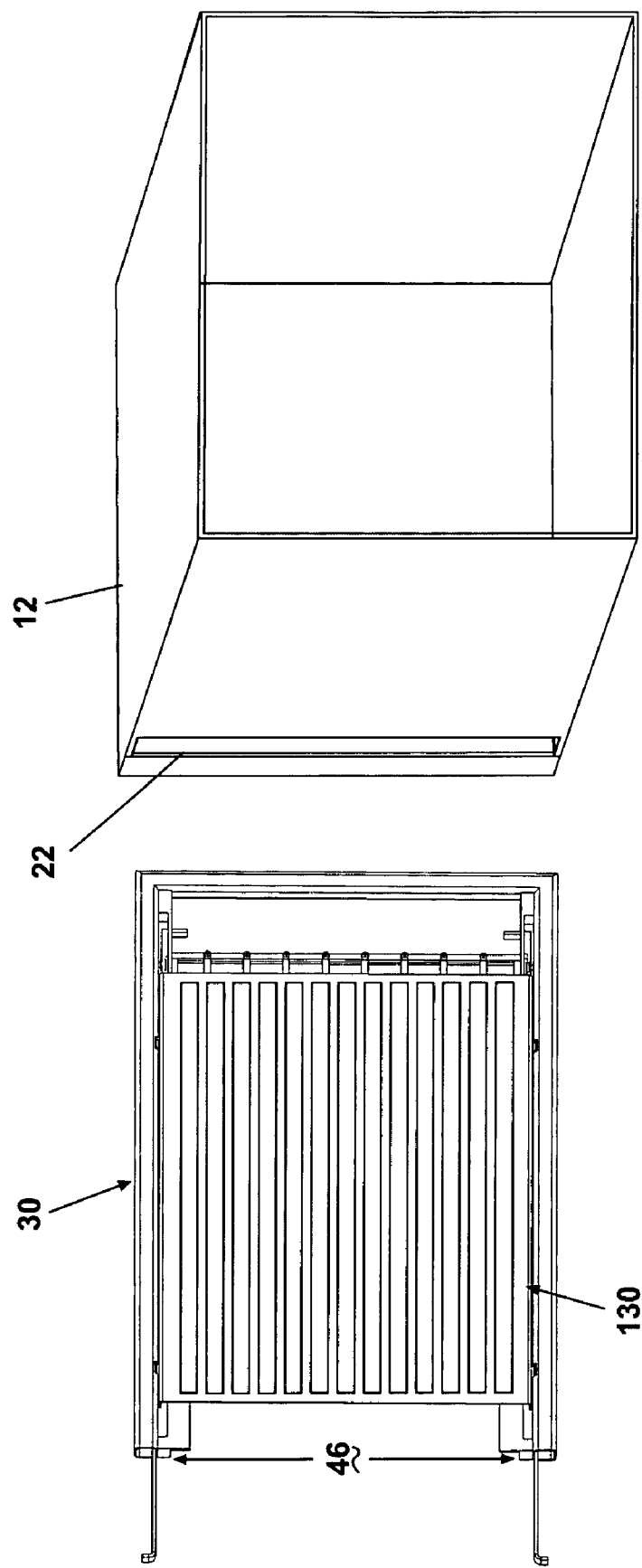
FIG. 7 is a perspective view of the expandable air cleaner frame and air conditioning element in FIG. 3 and the return duct in FIG. 1, wherein the expandable air cleaner frame is in the collapsed condition and positioned near the opening of the return duct.
Figure 8:
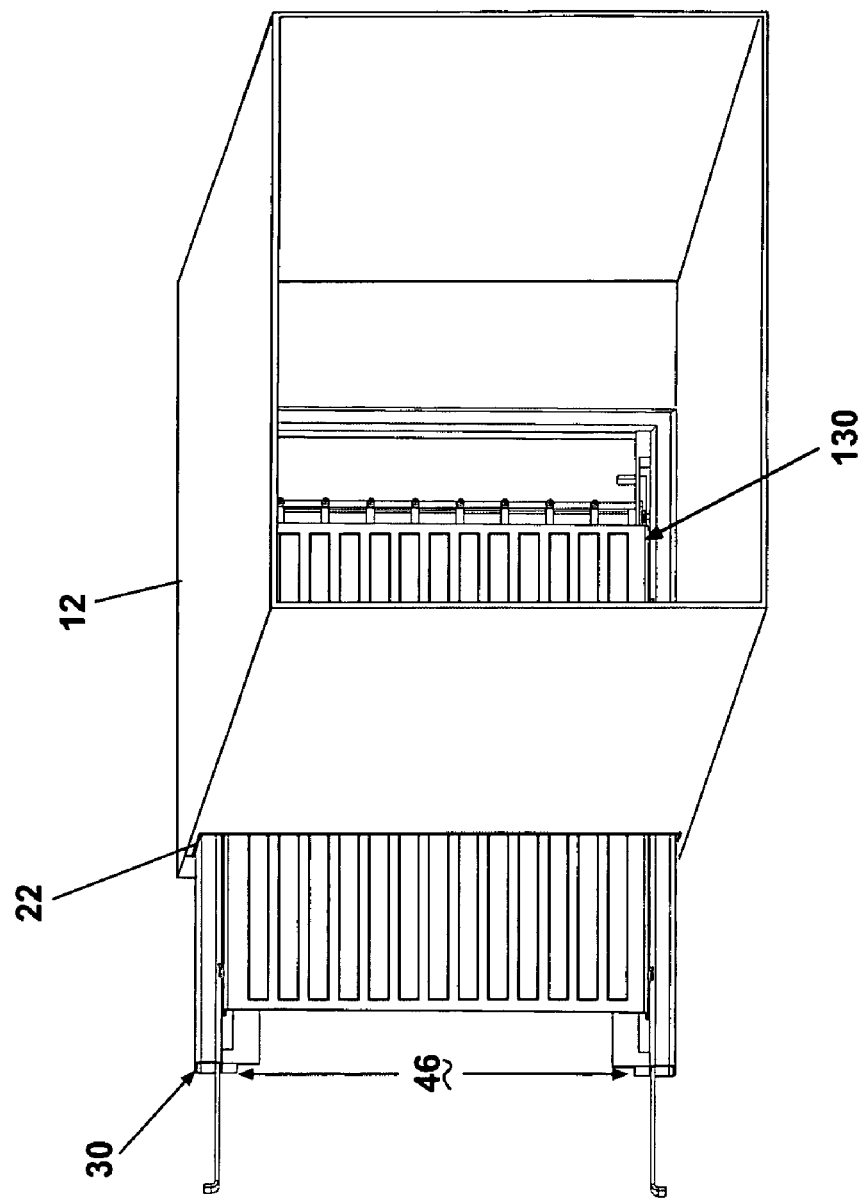
FIG. 8 is a perspective view of the expandable air cleaner frame and air conditioning element and return duct from FIG. 7, wherein the expandable air cleaner frame is partially inserted into the return duct through the opening.
Figure 9:
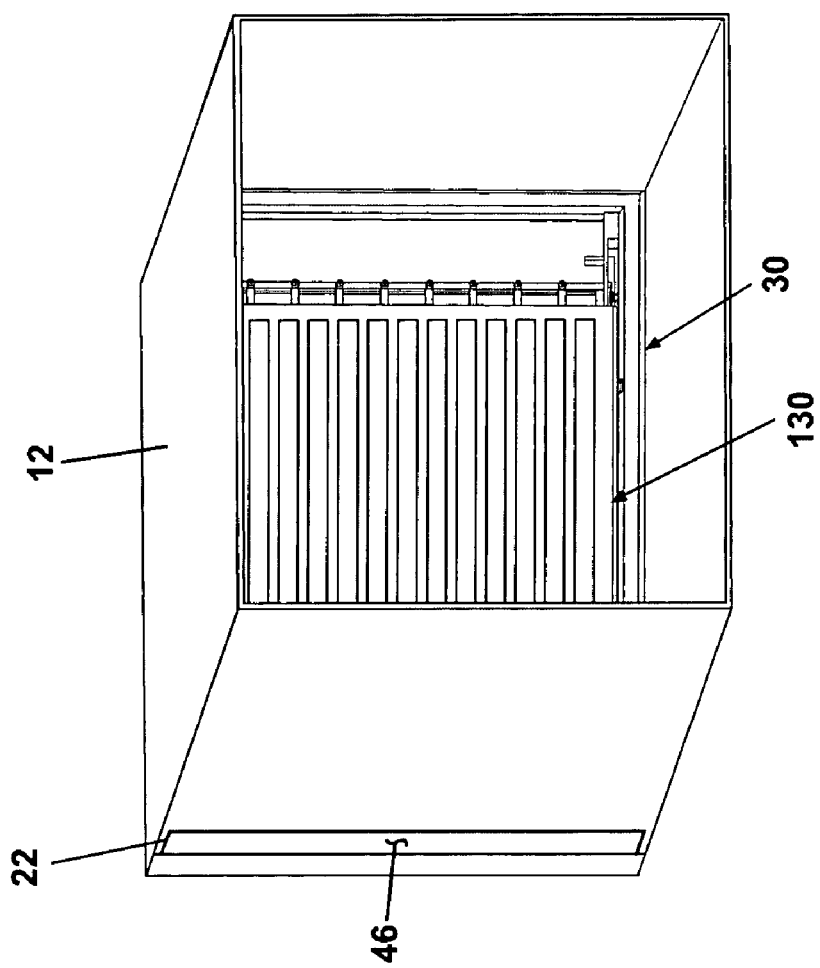
FIG. 9 is a perspective view of the expandable air cleaner frame and air conditioning element and return duct from FIG. 8, wherein the expandable air cleaner frame is completely disposed in the return duct.
Figure 10:
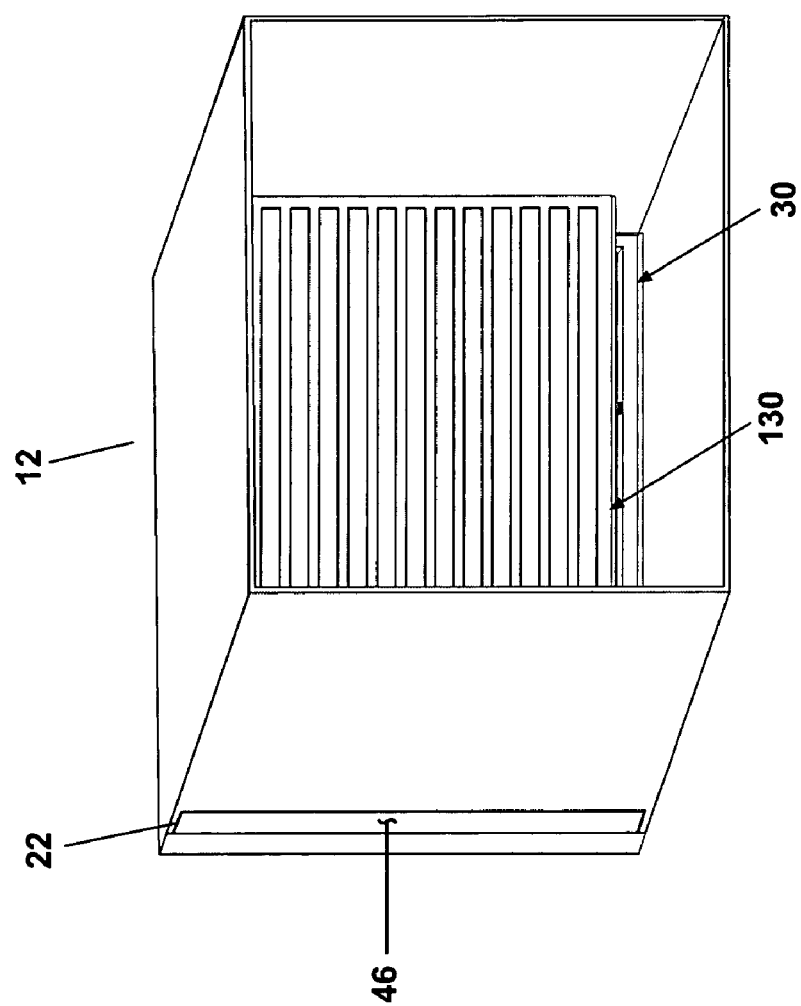
FIG. 10 is a perspective view of the expandable air cleaner frame and air conditioning element and return duct from FIG. 9, wherein the expandable air cleaner frame has been moved to the expanded condition to displace the air conditioning element within the return duct.

The operation of this embodiment of the air cleaner 24 will now be described with reference to FIGS. 7-12. As illustrated in FIG. 7, a user aligns the expandable air cleaner frame 30, which is in the collapsed condition and has a collective thickness less than the width of the opening 22, with the opening 22 in the return duct 12. Next, the user inserts the expandable air cleaner frame 30 through the opening 22, as shown in FIG. 8, and slides the expandable air cleaner frame 30 into the return duct 12 until it is completely received therein. In this state, the aperture 46 of the peripheral frame 62 is substantially coincident with the opening 22, as depicted in FIG. 9. Once the expandable air cleaner frame 30 is positioned within the return duct 12, the user pushes on the finger tabs 114 to displace the actuating arms 110 and thereby move the expandable air cleaner frame 30 from the collapsed condition to the expanded position as described above. It is apparent in FIG. 10 that when the expandable air cleaner frame 30 is in the expanded condition, the earth plane 132 and the ionization grid 136 project into the airflow passageway in the return duct 12 and away from the opening 22.

Figure 11:
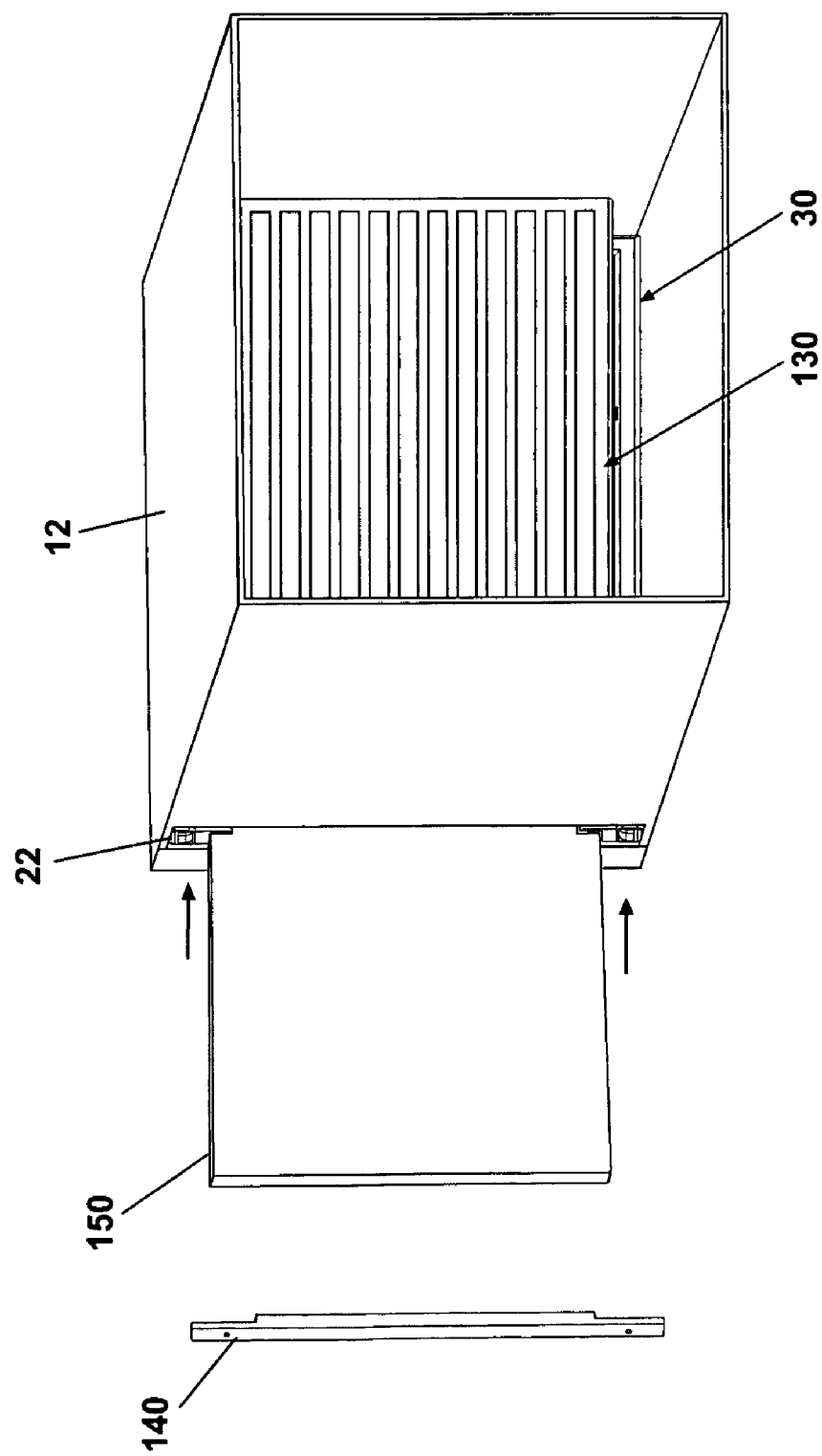
FIG. 11 is a perspective view of the expandable air cleaner frame and air conditioning element and return duct from FIG. 10, wherein the collector is partially inserted into the expandable air cleaner frame.
Figure 12:
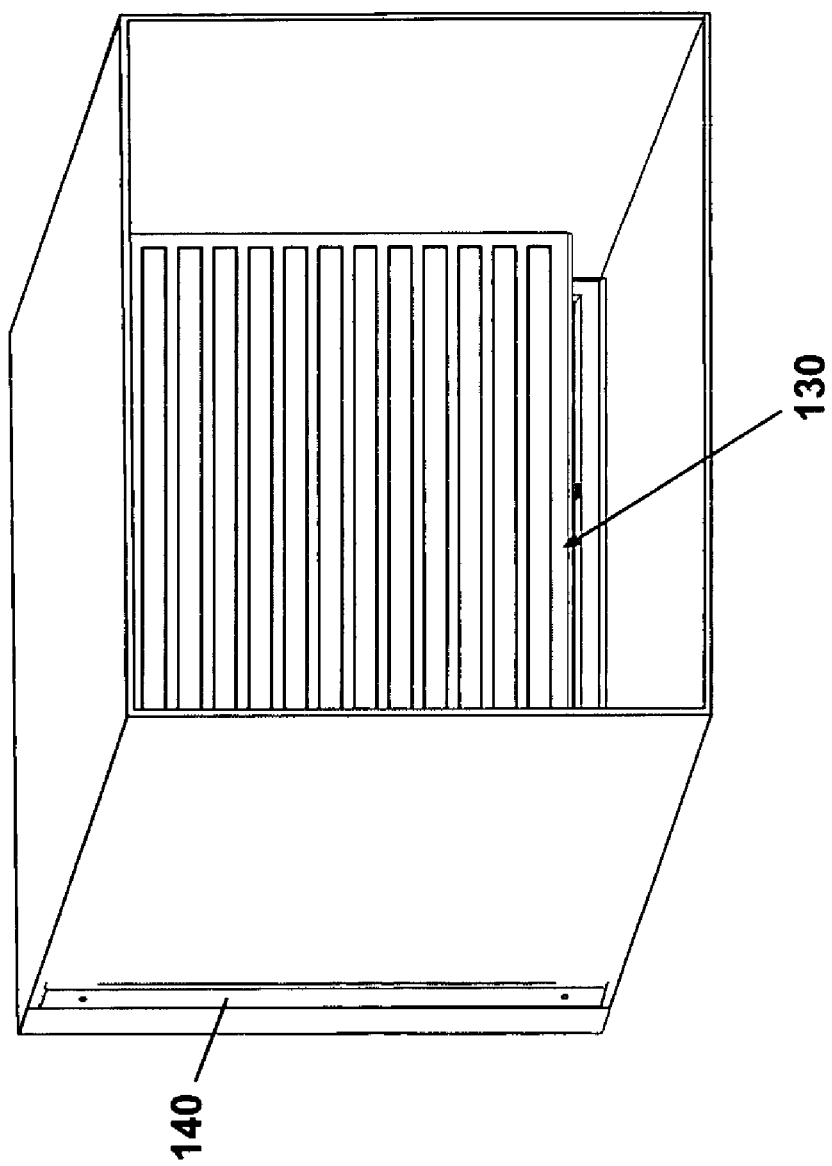
FIG. 12 is a perspective view of the expandable air cleaner frame and air conditioning element and return duct from FIG. 1, wherein the collector is completely disposed in the expandable air cleaner frame to form the air cleaner from FIG. 2, and showing an arrow to depict the direction of airflow within the return duct and through the air cleaner.

The user can optionally insert the collector 150 by introducing the collector 150 into the opening 22 of the return duct 12 and, therefore, the aperture 46 of the peripheral frame 62, as depicted in FIG. 11. The filter guides 89 and the spring tabs 76 direct and secure the collector 150 as explained above. After the collector 150 is completely disposed within the expandable air cleaner frame 30, the end cap 140 is positioned over the aperture 46 and mounted to the actuating arms 110, as illustrated in FIG. 12. Alternatively, the step of inserting the collector 150 can occur during any portion of the operation process, such as while the expandable air cleaner frame 30 is in the collapsed condition, as described earlier.

As air flows through the return duct 12, as indicated by the arrow in FIG. 12, the expandable air cleaner frame 30, equipped with the air conditioning element 130 and the collector 150, efficiently removes dust and other particulate matter. When the air conditioning element 130 comprises the earth plane 132 and the ionization grid 136, the earth plane 132 directs air through the cutouts 134 and toward the ionization grid 136, which releases ions that interact with the dust and particulate matter to form ionized particles. The air and ionized particles continue to flow through the collector 150, where dust, the ionized particles, and other particulate matter are captured. Purified air, which undergoes only a relatively low pressure drop, then exits the expandable air cleaner frame 30, flows through the central unit 14, and is distributed throughout the home. If the collector 150 requires replacement or cleaning while the expandable air cleaner frame 30 is disposed in the duct 12, the end cap 140 is removed, the dirty collector 150 is easily pulled out of the expandable air cleaner frame 30, and a cleaned or new collector 150 is inserted therein as described above.

To remove the expandable air cleaner frame 30 from the return duct 12 to, for example, clean the air conditioning element 130, the end cap 140 is removed, the collector 150 is drawn through the opening 22, and the finger tabs 114 are pulled to move the expandable air cleaner frame 30 from the expanded condition to the collapsed condition. Once the expandable air cleaner frame 30 is collapsed, it is pulled through the opening 22 until it is completely removed from the return duct 12. Alternatively, the step of removing the collector 150 can occur during any portion of the removal process, such as while the expandable air cleaner frame 30 is in the collapsed condition, as described earlier.

Figure 13:
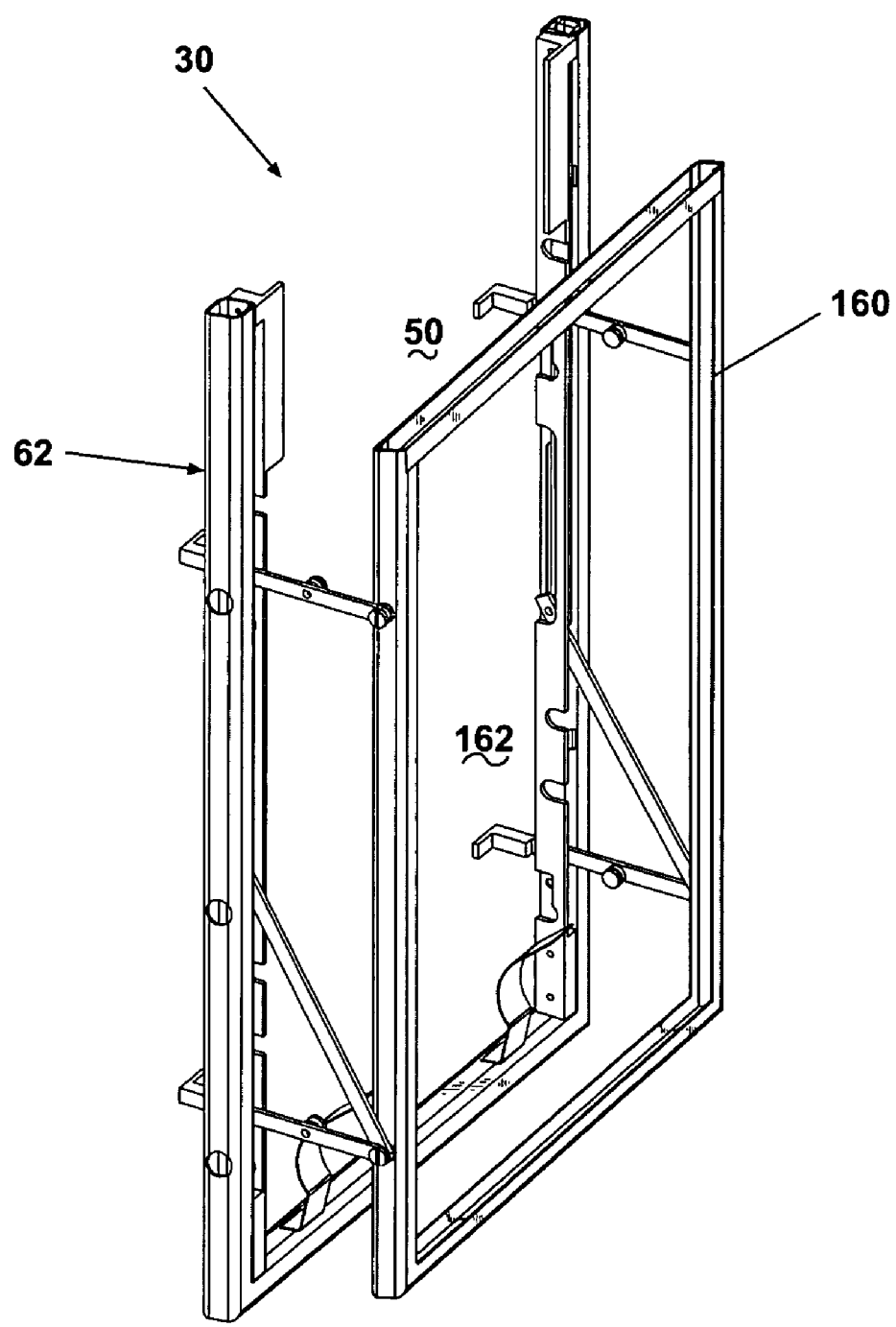
FIG. 13 is a perspective view of a second embodiment of an expandable air cleaner frame according to the invention comprising an auxiliary peripheral frame, wherein the expandable air cleaner frame is the expanded condition.

A second embodiment of an expandable air cleaner frame 30 according to the invention is illustrated in FIG. 13, where elements similar to those of the first embodiment are identified with the same reference numerals. The second embodiment is identical to the first embodiment, except that the second comprises an auxiliary peripheral frame 160 as the air conditioning element carrier. The auxiliary peripheral frame 160 can be of any desired structure and can also be considered part of an expander because movement of the auxiliary peripheral frame 160 relative to the peripheral frame 62 effectively expands the width of the expandable air cleaner frame 30. As illustrated, the auxiliary peripheral frame 160 is formed by U-shaped channel members, which collectively form an open-sided recess 162 in which a collector or air conditioning element can be received. Any suitable collector or air conditioning element, such as a reusable or replaceable filter, a conventional panel filter, a pleated filter, an electrostatically charged pleated filter, and the like can be inserted into the open-sided recess.

The operation of the second embodiment of the invention is similar to that of the first. The collector is preferably inserted into the auxiliary peripheral frame 160 prior to inserting the expandable air cleaner frame 30 into the opening 22. When the auxiliary peripheral frame 160 is collapsed within the recess 50 formed by the peripheral frame 62, the auxiliary peripheral frame 160 is in an insert position, and when the auxiliary peripheral frame 160 expands to a position exterior of the recess 50, the auxiliary peripheral frame 160 is in an installed position. When the auxiliary peripheral frame 160 is in the insert position, the collective thickness of the peripheral frame 62 and the auxiliary peripheral frame 160 is less than the width of the opening 22 so that the expandable air cleaner frame 30 can fit within the return duct 12. Conversely, when the auxiliary peripheral frame 160 is in the installed position, the collective thickness of the peripheral frame 62 and the auxiliary peripheral frame 160 is greater than the width of the opening 22.

The benefit of the second embodiment over the first embodiment is that the auxiliary peripheral frame 160 functions as the carrier and is not integrated with the air conditioning element. Thus, the user is provided with the convenience of easily selecting or changing the type of air collector or air conditioning element used. The user has the ability to mix and match collectors and air conditioning elements as desired. The second embodiment can also include multiple auxiliary peripheral frames 160 if desired.

Figure 14:
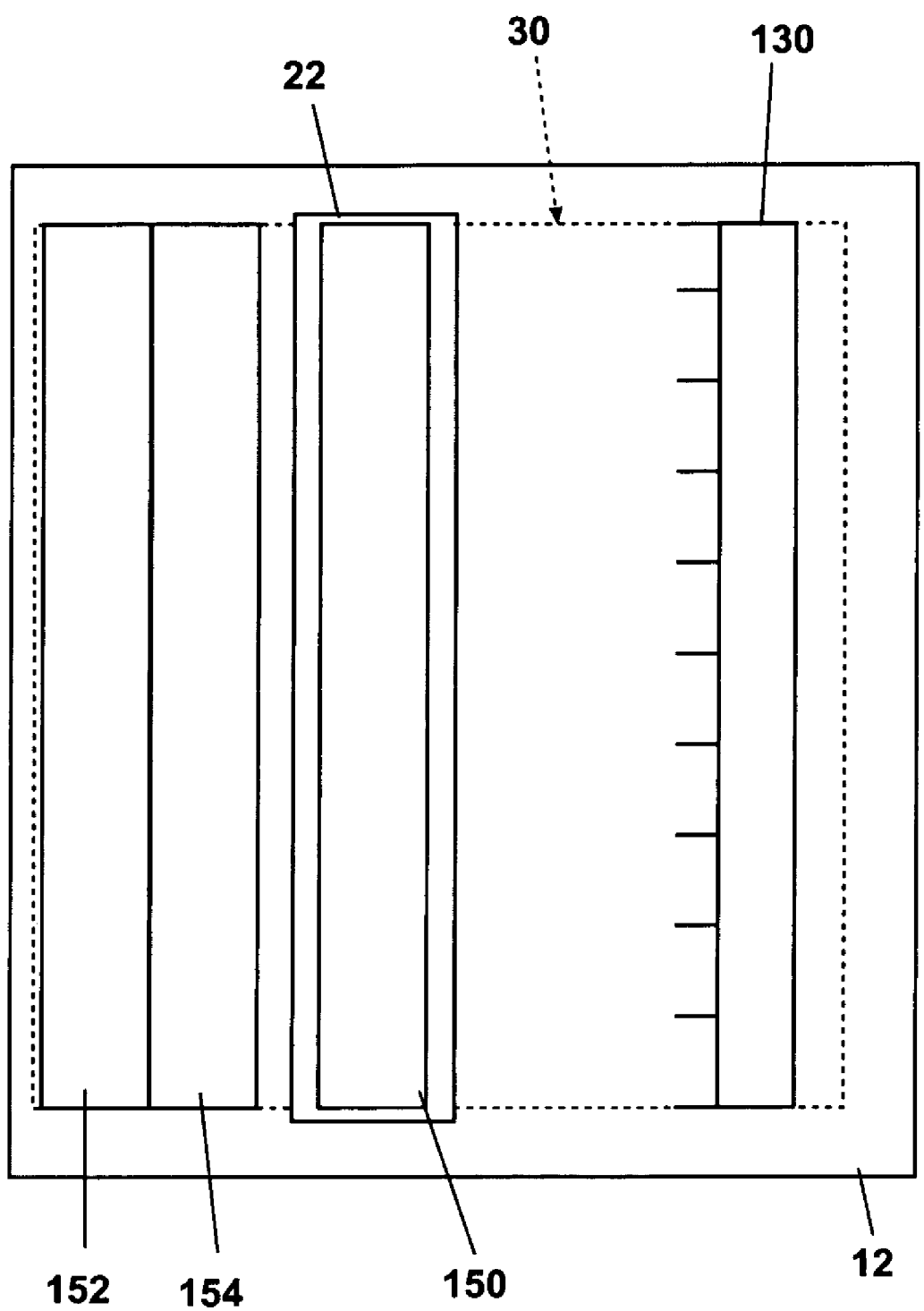
FIG. 14 is a schematic view of a third embodiment of an expandable air cleaner frame according to the invention comprising a filter loading mechanism for moving loaded collectors along the length of the return duct.

A third embodiment of an expandable air cleaner frame 30 according to the invention is illustrated schematically in FIG. 14, where elements similar to those of the previous embodiments are identified with the same reference numerals. The third embodiment is an expandable air cleaner frame 30 and an air conditioning element 130 identical to the first embodiment and further includes a loading mechanism for loading or shifting individual air conditioning elements or collectors, in singular or modular form, within the duct 12. One example of a simple loading mechanism is the spring tabs 76 of the first embodiment. The spring tabs 76 shift the individual collectors or collector modules downstream. The loading mechanism can be any device to load and shift air conditioning elements or collectors within the duct; it can comprise mechanical, electrical, pneumatic, hydraulic, or any other suitable loading and shifting means. As a result, several types of air conditioning elements or collectors can be installed through the expandable air cleaner frame 30, and a user can create customized air filtration to accommodate specific needs.

In operation, the expandable air cleaner frame 30 is inserted into a return duct 12 and expanded therein as described for the first embodiment. Once the expandable air cleaner frame 30 is in the expanded condition, the user inserts a first collector, for example an odor elimination module 152, through the furnace opening 22 and into the expandable air cleaner frame 30. Next, the collector loading mechanism shifts the odor elimination module 152 within the duct 12 so that a second collector, for example an electrostatically charged pleated filter 154, can be inserted through the furnace opening 22 and into the expandable air cleaner frame 30. The inserting and shifting process continues until the last collector, for example a conventional panel filter 150, is inserted through the furnace opening 22 and into the expandable air cleaner frame 30.

Figure 15:
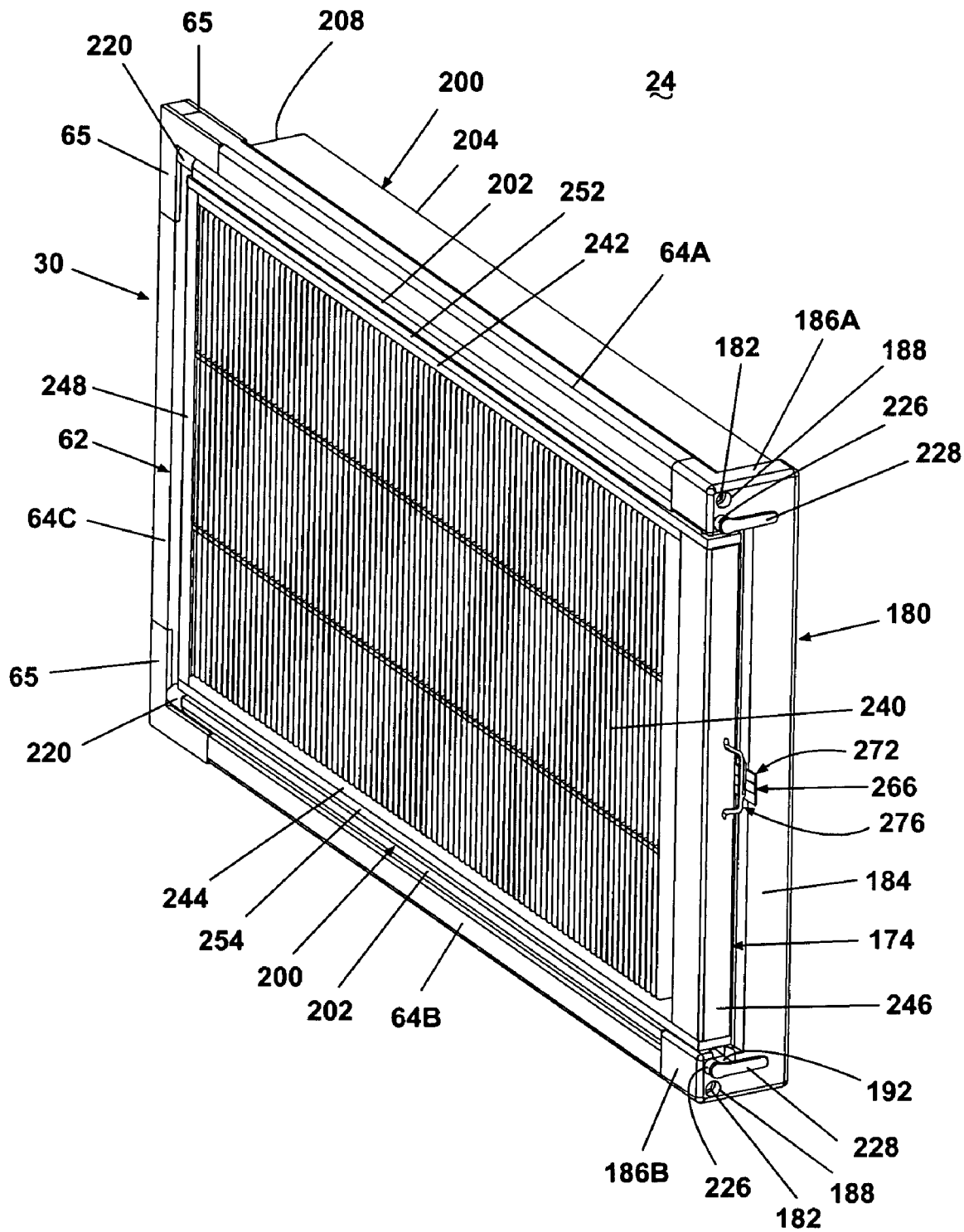
FIG. 15 is a rear perspective view of a fourth embodiment of an air cleaner according to the invention comprising multiple filter elements and an expandable air cleaner frame including a guide support.
Figure 16:
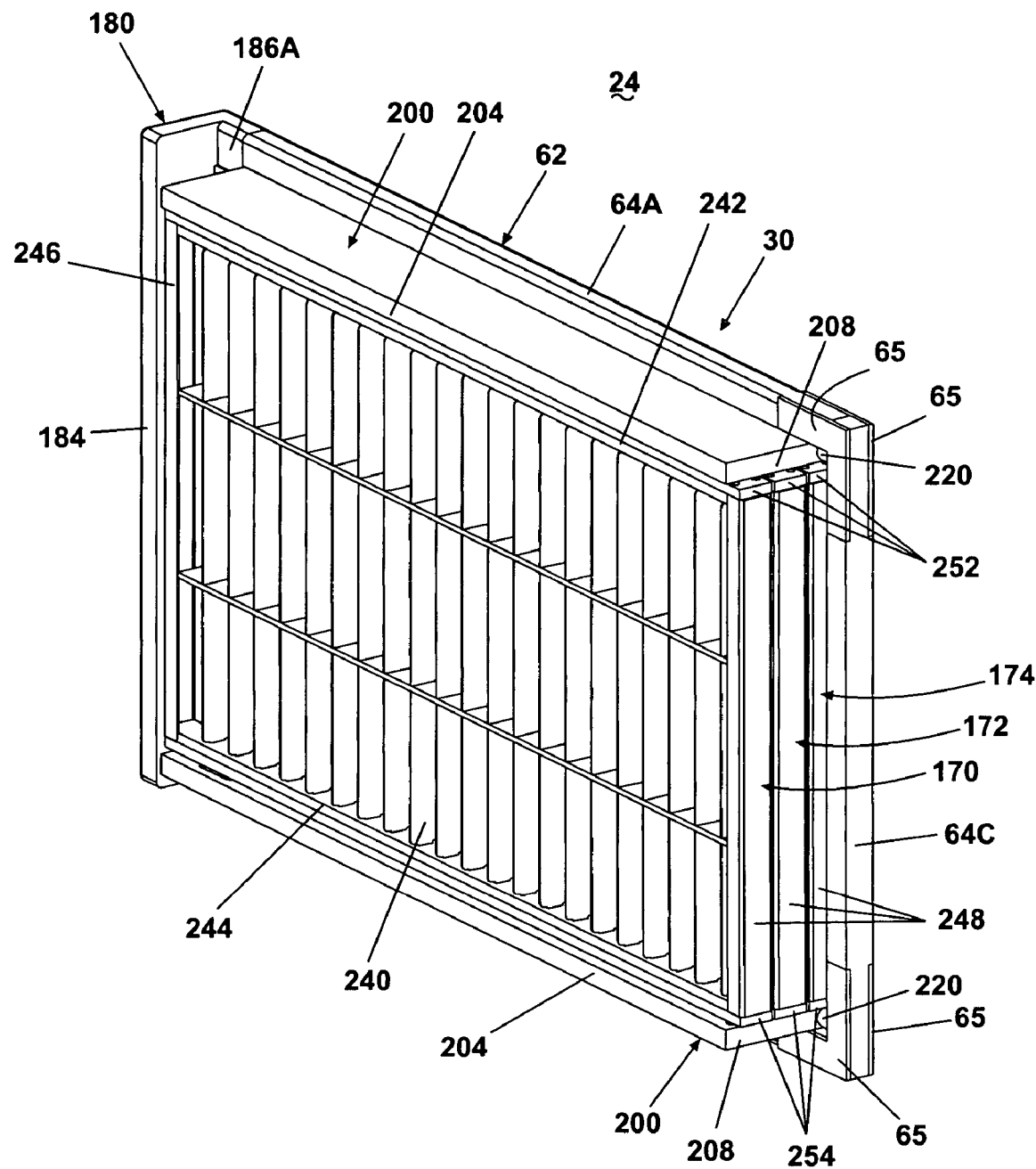
FIG. 16 is a front perspective view of the air cleaner from FIG. 15.
Figure 17:
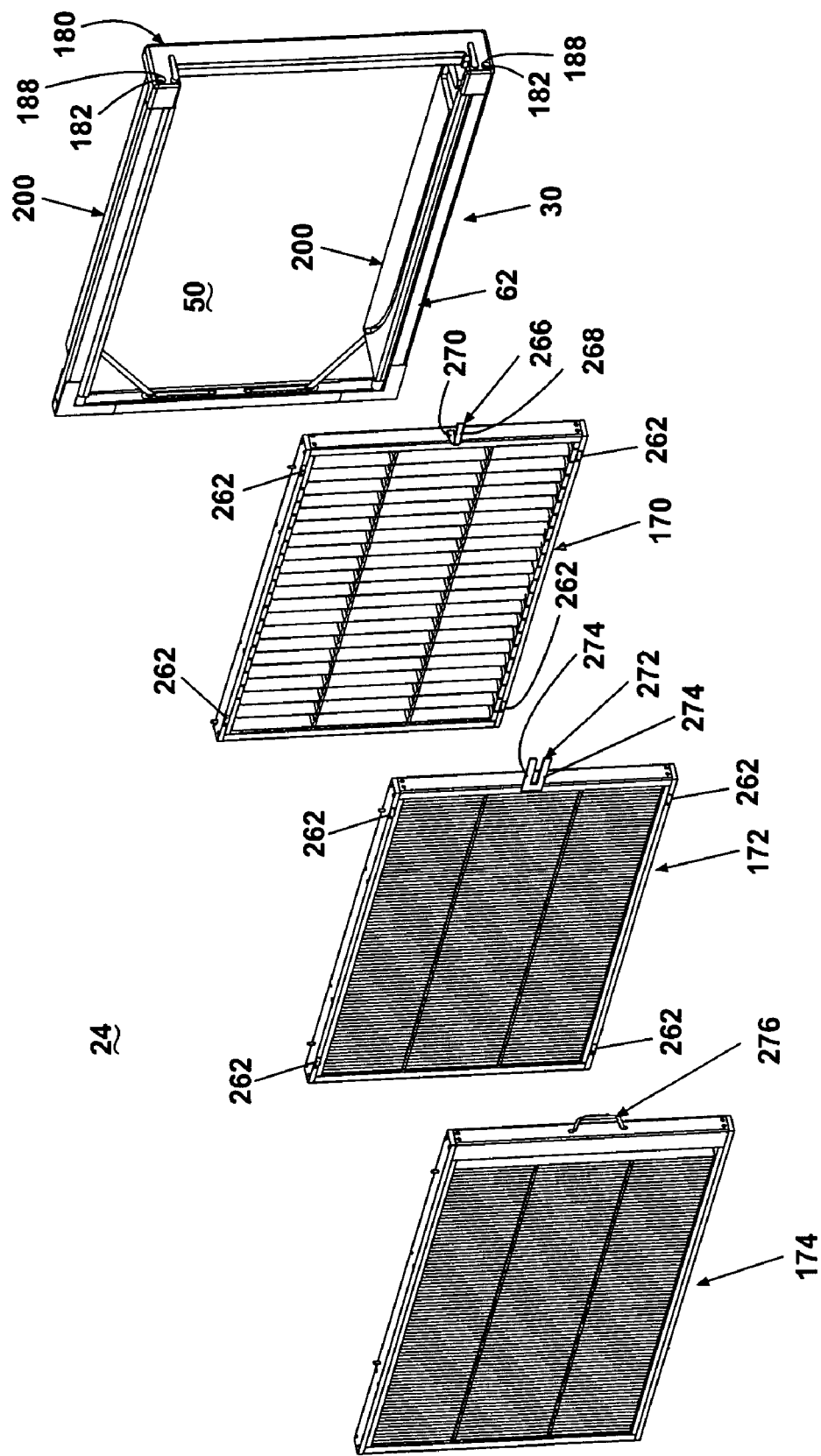
FIG. 17 is an exploded view of the air cleaner from FIG. 15.

An alternative embodiment of an air cleaner 24 with an expandable air cleaner frame 30 according to the invention is illustrated in FIGS. 15-17, where elements similar to those of the previous embodiments are identified with the same reference numerals. The expandable air cleaner frame 30 comprises a filter loading mechanism, as in the embodiment of FIG. 14, to load and support multiple filter elements inserted through the furnace opening 22. This embodiment of the air cleaner 24 is shown and described as comprising a first filter element 170, a second filter element 172, and a third filter element 174; however, it is within the scope of the invention for the air cleaner 24 to comprise less or more filter elements, as will be described in further detail below.

Figure 18:
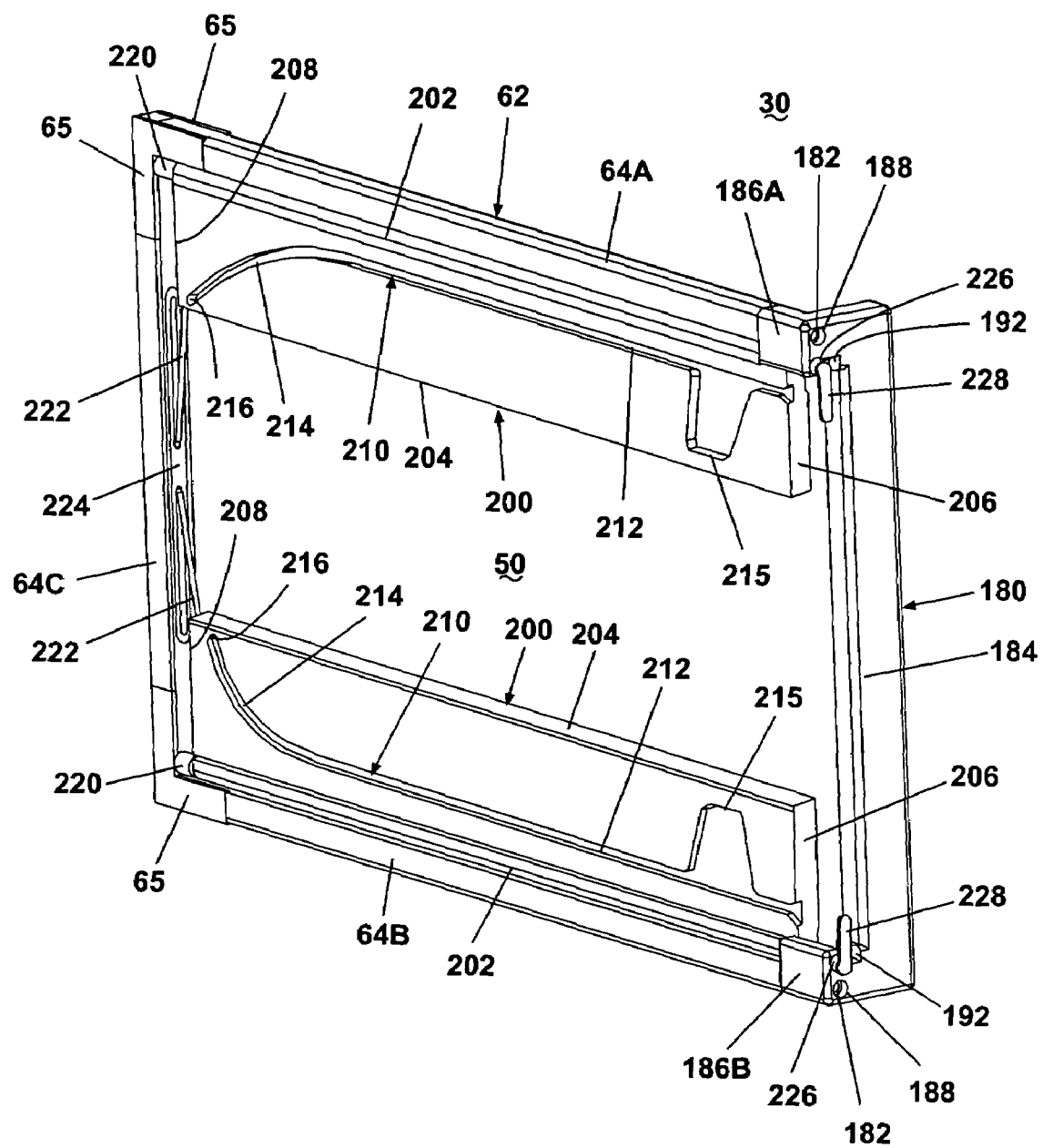
FIG. 18 is a perspective view of the expandable air cleaner frame from FIG. 15, wherein the guide support is shown in a collapsed condition.
Figure 19:
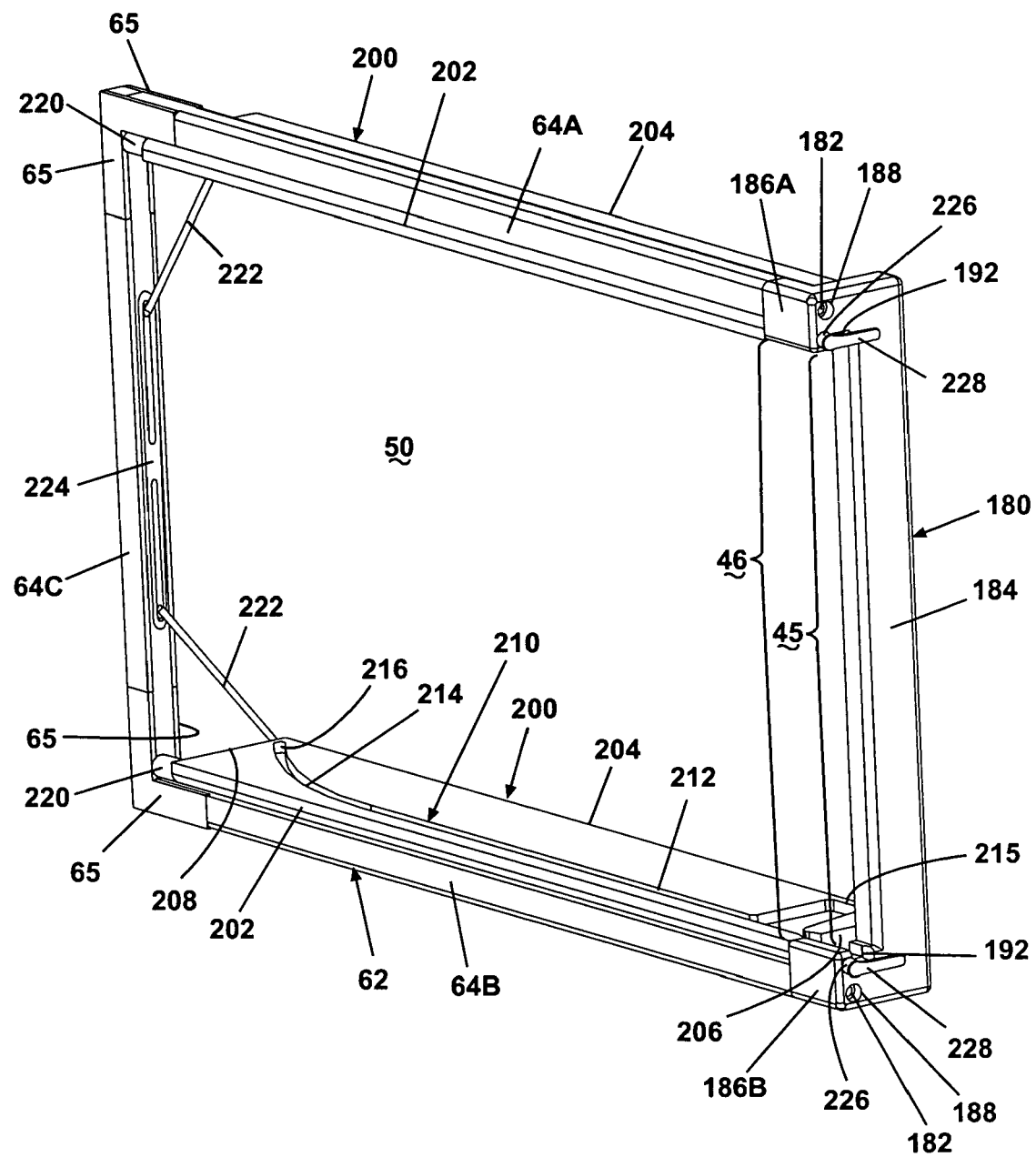
FIG. 19 is a perspective view similar to FIG. 18, wherein the guide support is shown in an expanded condition.
Figure 20:
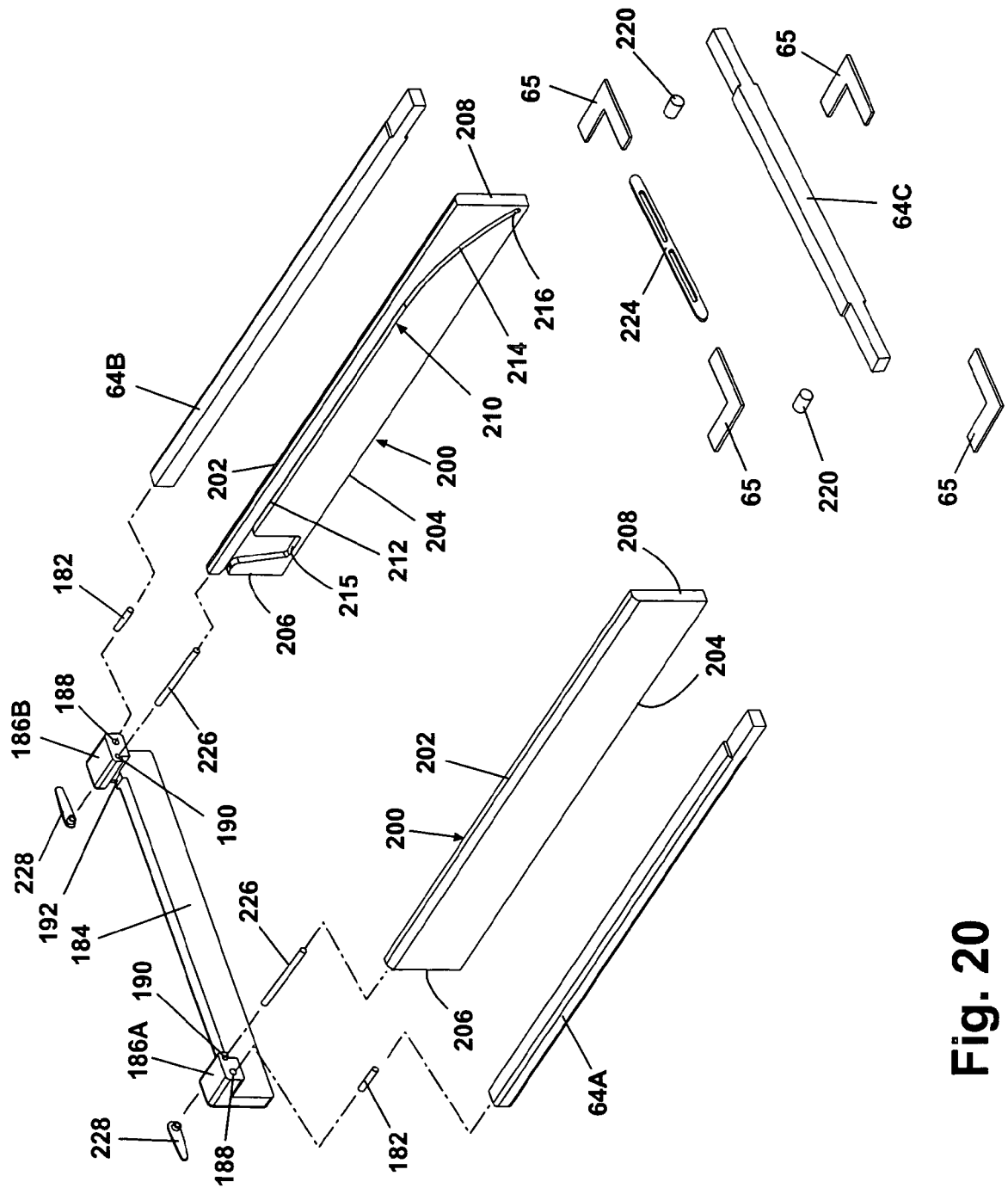
FIG. 20 is an exploded view of the expandable air cleaner frame from FIG. 15.

Referring additionally to FIGS. 18-20, the expandable air cleaner frame 30 comprises a peripheral frame 62 formed by upper and lower bars 64A, 64B mounted at one end to a side bar 64C by pairs of corner brackets 65 to form an open-sided recess 50 with an elongated aperture 46 that functions as an insert opening at the open side between the upper and lower bars 64A, 64B. The aperture 46 is sized to receive a conventional, standard panel filter, and the peripheral frame 62 is sized to be inserted into the return duct 12 through the opening 22. The ends of the upper and lower bars 64A, 64B opposite the side bar 64C are mounted to a frame support 180 by fasteners 182. The frame support 180 is generally U-shaped and has an elongated handle portion 184 flanked by upper and lower mounts 186A, 186B. Each of the upper and lower mounts 186A, 186B includes a first aperture 188 that receives one of the fasteners 182 to mount the upper and lower bars 64A, 64B to the upper and lower mounts 186A, 186B, respectively. Further, each of the upper and lower mounts 186A, 186B includes a second aperture 190 (FIG. 20) adjacent the first aperture 188 and a channel 192 adjacent the second aperture 190. The channels 192 on the upper and lower mounts 186A, 186B are oriented such that they are vertically aligned and face one another. An opening 45 between the channels 192 is aligned with the aperture 46 of the peripheral frame 62, and the aperture 46 and the opening 45 are sized to receive one of the filter elements 170, 172, 174 for insertion into the recess 50.

The expandable air cleaner frame 30 further comprises a pair of guide supports 200 moveably mounted to the peripheral frame 62 and the frame support 180 and movable between a collapsed condition, as shown in FIG. 18, wherein the guide supports 200 are received within the recess 50, and an expanded condition, as illustrated in FIG. 19, wherein the guide supports 200 project laterally from the recess 50. Each guide support 200 is in the form of a generally rectangular panel with an inside edge 202 and an outside edge 204 joined by a proximal edge 206 and a distal edge 208. Additionally, each guide support 200 comprises a guide 210 in the form of a groove in the panel. The guide 210 has a generally straight portion 212 that begins at the proximal edge 206 and extends parallel to and near the inside edge 202 and an arcuate portion 214 that is continuous with the straight portion 212 and curves away from the inside edge 202 and toward the outside edge 204. The arcuate portion 214 terminates at a stop 216 near the intersection of the outside edge 204 and the distal edge 208. The guide 210 further includes a positioning branch 215 that is continuous with the straight portion 212 of the guide 210. The positioning branch 215 extends from the straight portion 212 towards the outside edge 204 of the guide support 200. When the guide supports 200 are in the expanded condition, the guides 210 face one another.

Each of the guide supports 200 is pivotally mounted at the distal edge 208 to the side bar 64C of the peripheral frame 62. In particular, a pin 220 located on the distal edge 208 and near the inside edge 202 and a sliding brace 222 located on the distal edge 208 and near the outside edge 204 mount the guide support 200 to the side bar 64C. The pin 220 is fixedly secured to the guide support 200 and rotatably mounted to the side bar 64C, while the brace 222 is rotatably mounted to the guide support 200 and slidably mounted within a brace receiver 224 secured to the side bar 64C. The other end of each of the guide supports 200, the proximal edge 206, abuts the respective upper and lower mount 186A, 186B of the frame support 180 and is pivotally mounted thereto by a shaft 226 that extends through the proximal edge 206 and the second aperture 190. The shaft 226 is fixed to the guide support 200, rotatable relative to the frame support 180, and horizontally aligned with the pin 220 to form a pivot axis for the guide support 200. The shaft 226 terminates in a lever 228 sized to be grasped by a user's hand, and rotation of the lever 228 pivots the guide support 200 between the collapsed and expanded conditions about the pivot axis formed by the pin 220 and the shaft 226. The pin 220, the shaft 226, and the guide support 200 are positioned on the expandable air cleaner frame 30 so that the straight portion 212 of the guide 210 aligns with the channel 192 in the frame support 180 when the guide support 200 is in the expanded condition, as seen in FIG. 19.

Figure 21:
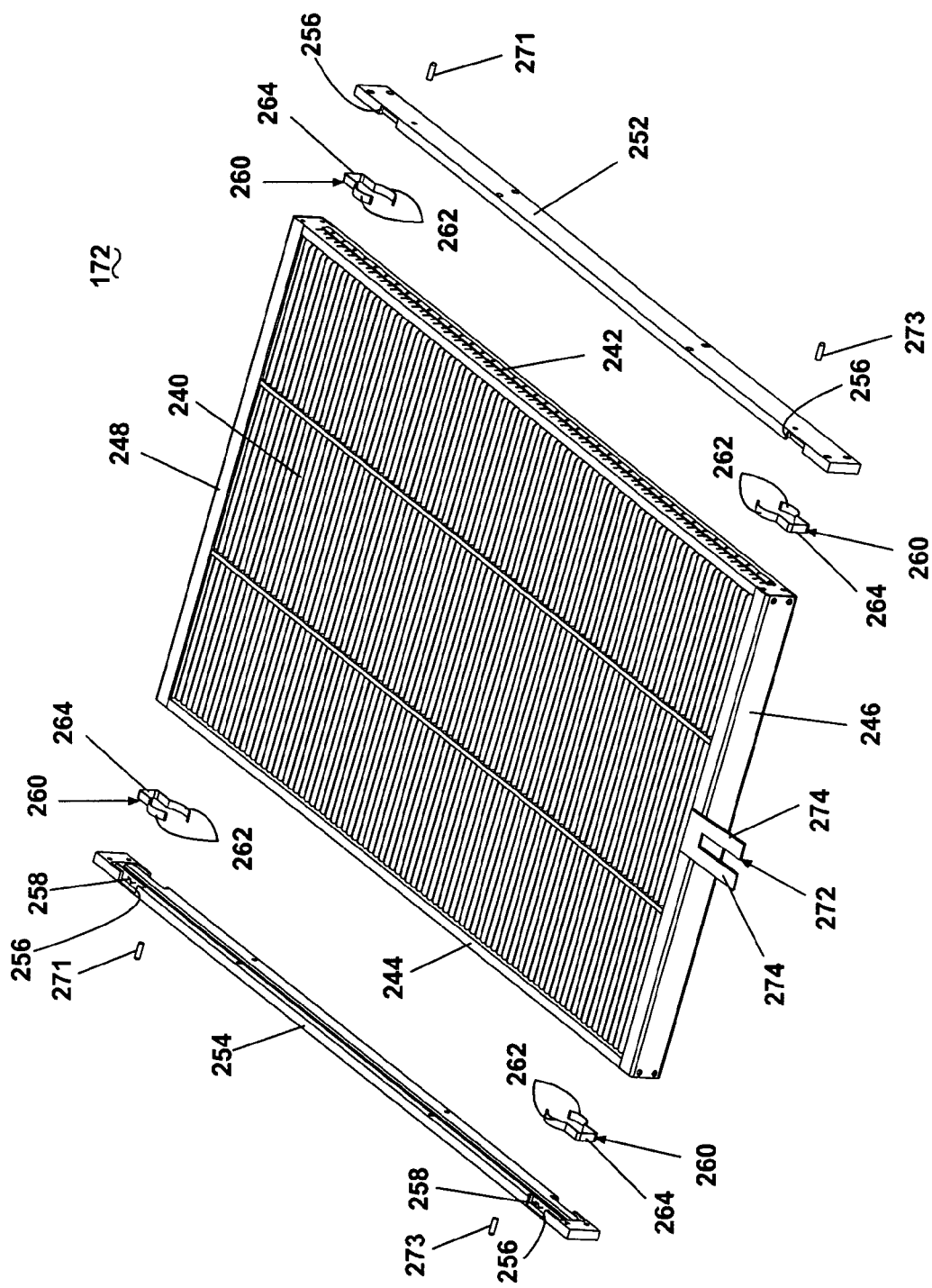
FIG. 21 is an exploded view of a second filter element of the multiple filter elements from FIG. 15.

The first, second, and third filter elements 170, 172, 174 can be any suitable air conditioning element or carrier as described above with respect to the previous embodiments. Regardless of the type of filter element, the first, second, and third filter elements 170, 172, 174 have common structural components, which will be described with respect to the second filter element 172 illustrated in FIG. 21. The second filter element 172 comprises a filter element body 240 held within a peripheral frame having upper and lower rails 242, 244 joined by proximal and distal rails 246, 248. Additionally, the second filter element 172 has upper and lower caps 252, 254 mounted to the upper and lower rails 242, 244, respectively. Each of the upper and lower caps 252, 254 includes a plurality of spring clip apertures 256 arranged in pairs, and each pair of the spring clip apertures 256 are joined by a spring clip recess 258 formed in the upper and lower caps 252, 254 on a side facing the filter element body 240. The spring clip recesses 258 are shaped and sized to receive a spring clip 260 having opposing arcuate spring arms 262 joined by a generally rectangular bight portion 264. When the spring clip recesses 258 receive the spring clips 260, a portion of the spring arms 262 projects through the spring clip apertures 256, as seen in FIG. 17. The second filter element 172 comprises a handle 272 that is fixedly mounted to the proximal rail 246 and includes a pair of spaced arms 274 that project away from the proximal rail 246. Finally, the second filter element 172 comprises guide followers in the form of a pair of leading pins 271 and a pair of trailing pins 273, wherein one of each pair is mounted to the upper and lower caps 252, 254. The leading pins 271 are spaced from the distal rail 248 the same distance so that they are vertically aligned, and the trailing pains are similarly vertically aligned. Further, the leading pins 271 and the trailing pins 273 are sized such that they can be slidingly received in the guides 210 on the guide supports 200 to mount the second filter element 172 to the guide supports 200.

Together, the guides 210 and the leading pins 271 function as a carrier to mount the second filter element 172 to the expandable air cleaner frame 30. The guides 210 and the leading pins 271 can also be referred to as a positioning coupler because they couple the second filter element 172 to the expandable air cleaner frame 30, and the interaction between the guides 210 and the leading pins 271 position the second filter element 172 relative to the expandable air cleaner frame 30, as will be described in further detail below. Another term for the guides 210 and the leading pins 271 is an expander because movement of the second filter element 172 and the leading pins 271 relative to the guides 210 effectively expands the width of the air cleaner 24, as will also be described in further detail below.

Referring again to FIG. 17, the first and third filter elements 170, 174 are similar to the second filter element 172 in that they include a filter element body 240, a peripheral frame for the filter element body 240, upper and lower caps 252, 254, and spring clips 256. The primary differences between the first, second, and third filter elements 170, 172, 174 lie in the handle 272, the distance between the proximal and distal rails 246, 248, the location of the leading pins 271 on the upper and lower caps 252, 254, the spring clips 260 and the corresponding spring clip apertures 256, and the type of the filter element body 240.

Figure 25:
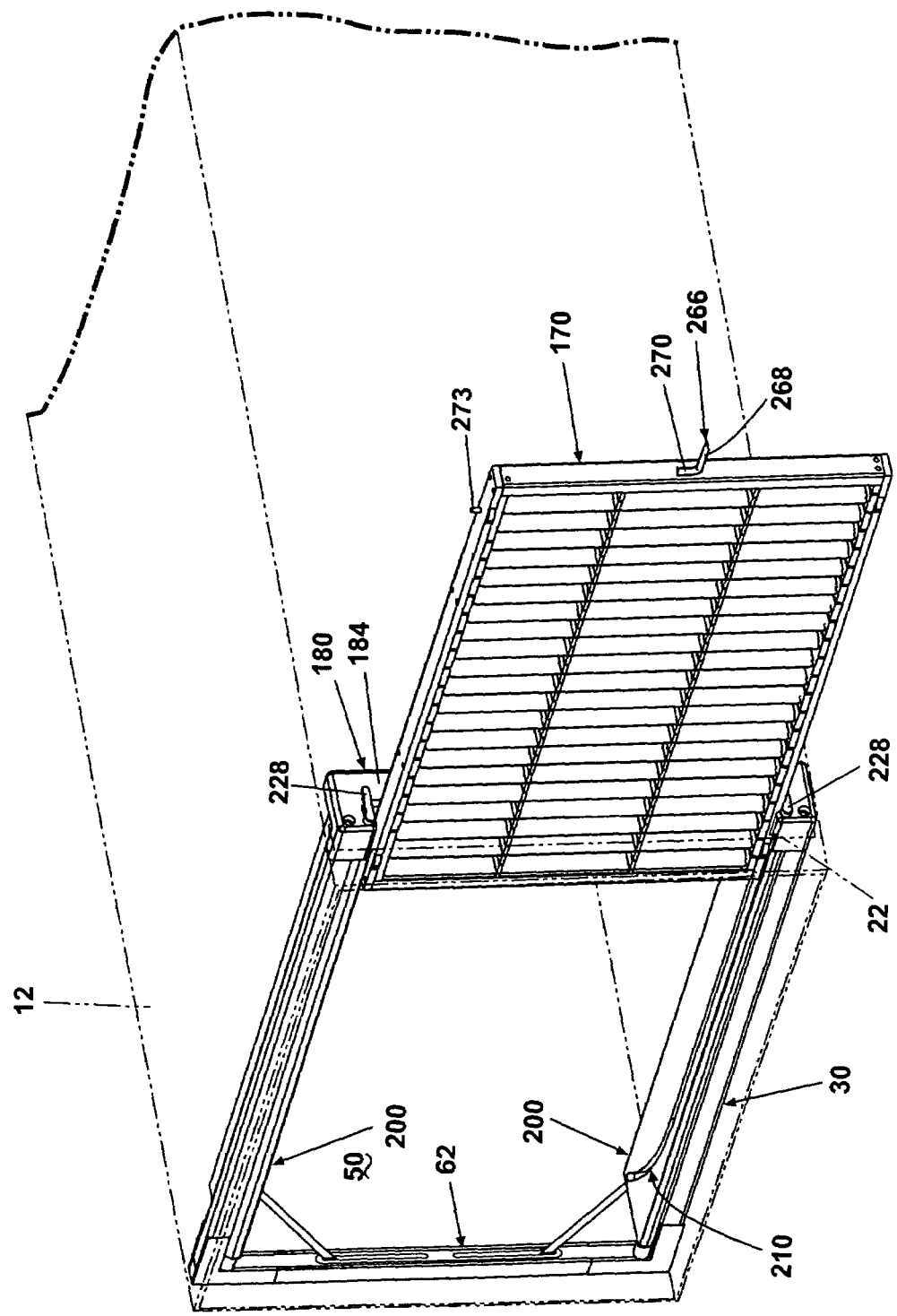
FIG. 25 is a perspective view similar to FIG. 24, wherein a first filter element of the multiple filter elements is partially inserted into the expandable air cleaner frame.
Figure 26:
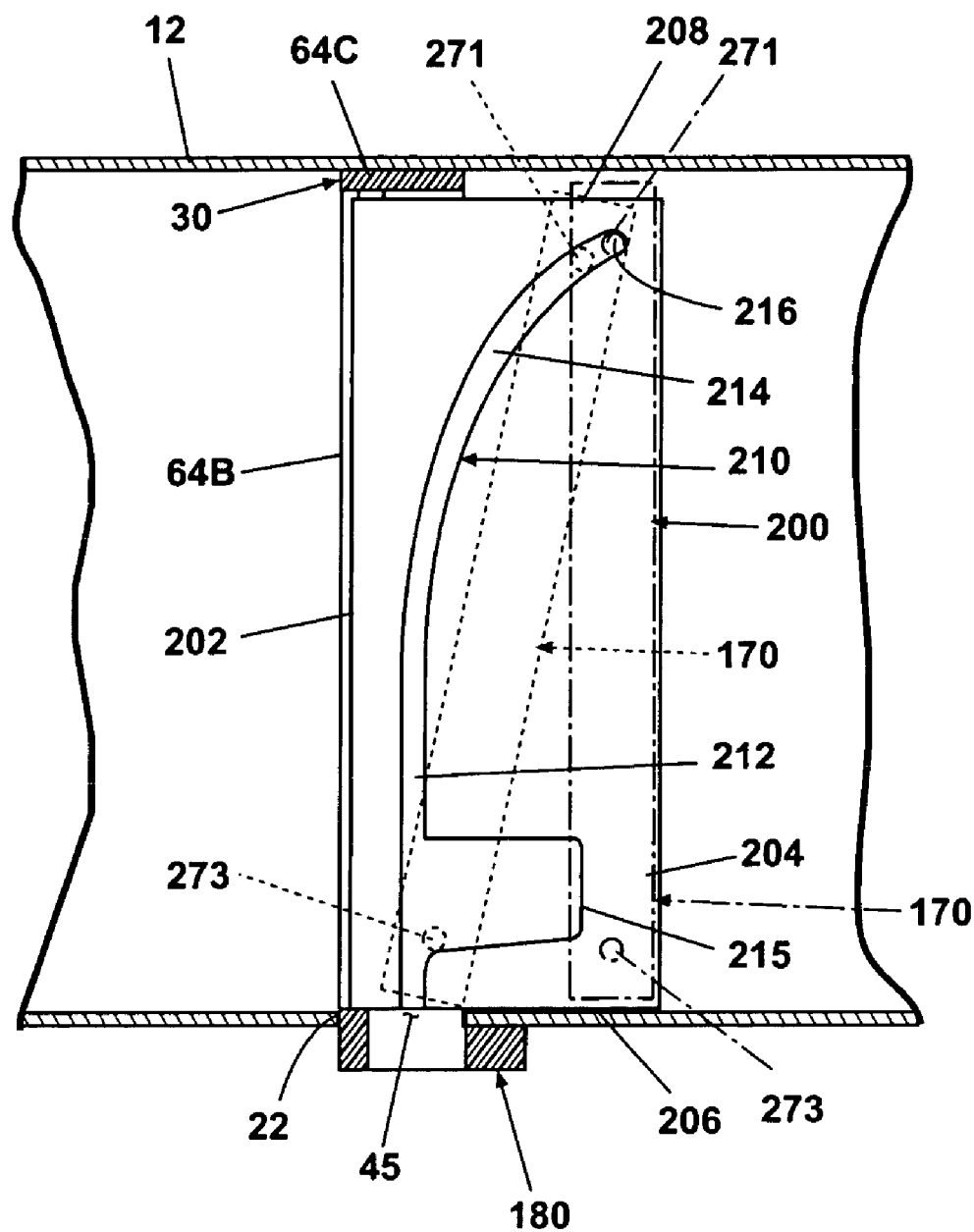
FIG. 26 is a schematic view of the return duct, the expandable air cleaner frame, and the first filter element from FIG. 25, wherein the first filter element is further inserted into the expandable air cleaner frame.

The first filter element 170 comprises a handle 266 rotatably mounted to the proximal rail 246. The handle 266, which is generally L-shaped, is formed by a grip portion 268 and a mount portion 270. A projection (not shown) on the mount portion 270 rotatably mounts the handle 266 to the proximal rail 246. The handle 266 is movable between an insert position, as shown in FIG. 25, wherein the mount portion 270 is generally parallel to the proximal rail 246, and an installed position, wherein the mount portion 270 is generally perpendicular to the proximal rail 246, as shown in FIG. 17. The third filter element 174 comprises a generally U-shaped handle 276 fixedly secured to the proximal rail 246.

The distance between the proximal and distal rails 246, 248 is greater for the third filter element 174 than for the first and second filter elements 170, 172. The distance between the proximal and distal rails 246, 248 for the first and second filter elements 170, 172 is generally equal to the distance between the proximal and distal edges 206, 208 of the guide support 200, while the distance between the proximal and distal rails 246, 248 for the third filter element 174 is slightly greater. Additionally, the leading pins 271 on the upper and lower caps 252, 254 are spaced progressively farther from the distal rail 248 on the first, second, and third filter elements 170, 172, 174, for reasons that are explained below in the description of the assembly and operation of the air cleaner 24.

As seen in FIG. 17, the spring clips 260 for the first and third filter elements 170, 174 comprise only one spring arm 262, and correspondingly, the spring clip apertures 256 are present on only one side of the upper and lower caps 252, 254. The purpose of the spring arms 262 is to maintain suitable spacing between the multiple filter elements; therefore, the spring arms 262 need only project from sides of the filter element that abut an adjacent filter element.

The filter element body 240 can be any suitable collector or air conditioning element, such as the collectors and air conditioning elements described above with respect to the previous embodiments of the invention. The filter element bodies 240 of the first, second, and third filter elements 170, 172, 174 can be the same type of filter element body 240 or different types of filter element bodies 240. When the air cleaner 24 comprises filter elements that have different types of filter element bodies 240, the combination of the different types of filter element bodies 240 forms a hybrid air cleaner. However, the type of filter element body 240 is not critical to the invention. For illustrative purposes, the air cleaner 24 of the present embodiment has filter elements with different types of filter element bodies. The first filter element 170 comprises an ionizer as the filter element body 240 to impart a charge to particles in the air, while the second and third filter elements 172, 174 comprise a charged pleated filter as the filter element body 240 to collect the charged particles.

Figure 22:
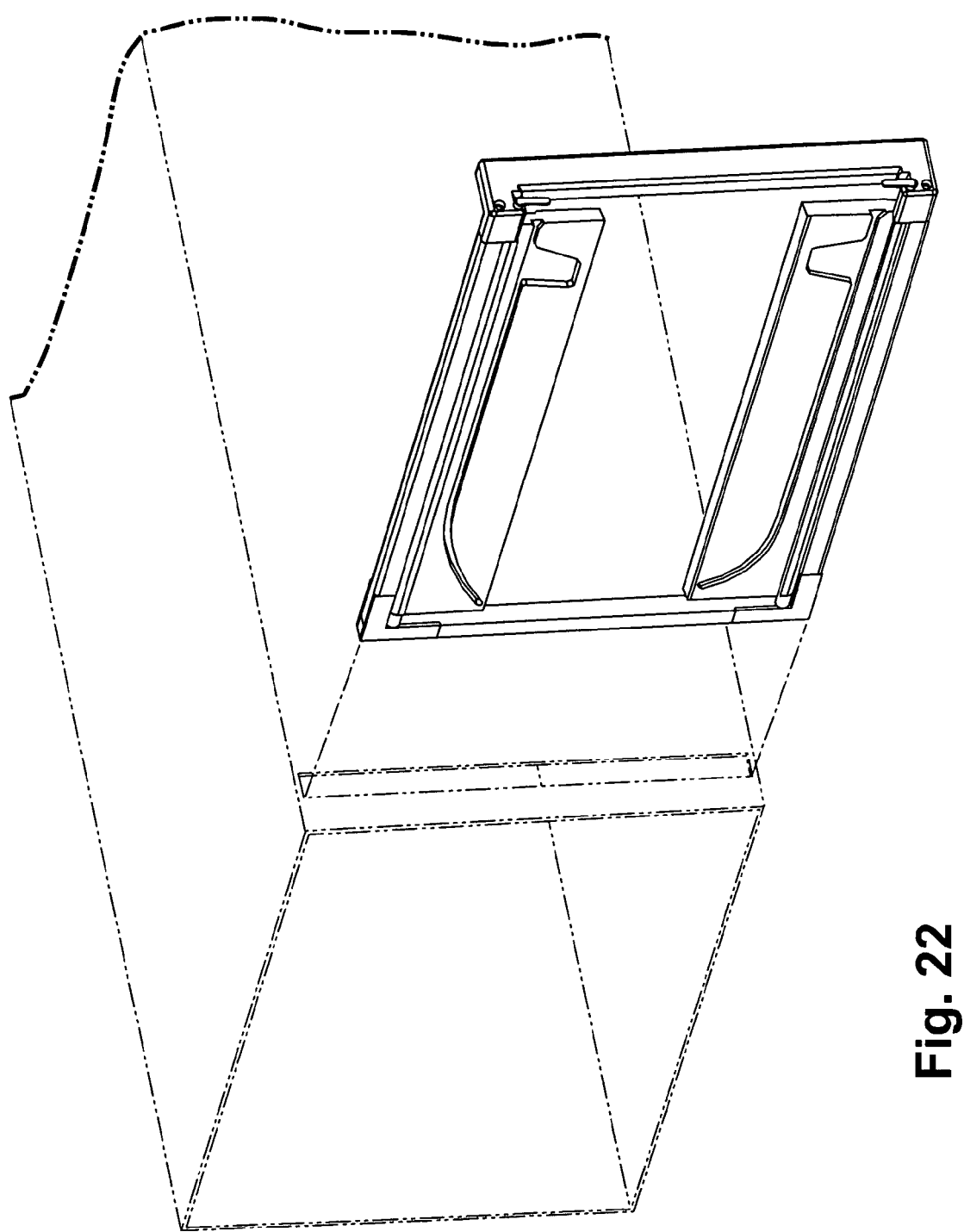
FIG. 22 is a perspective view of the expandable air cleaner frame from FIG. 15 and the return duct from FIG. 1, wherein the guide supports are in the collapsed condition and the expandable air cleaner frame is positioned near the opening of the return duct.
Figure 23:
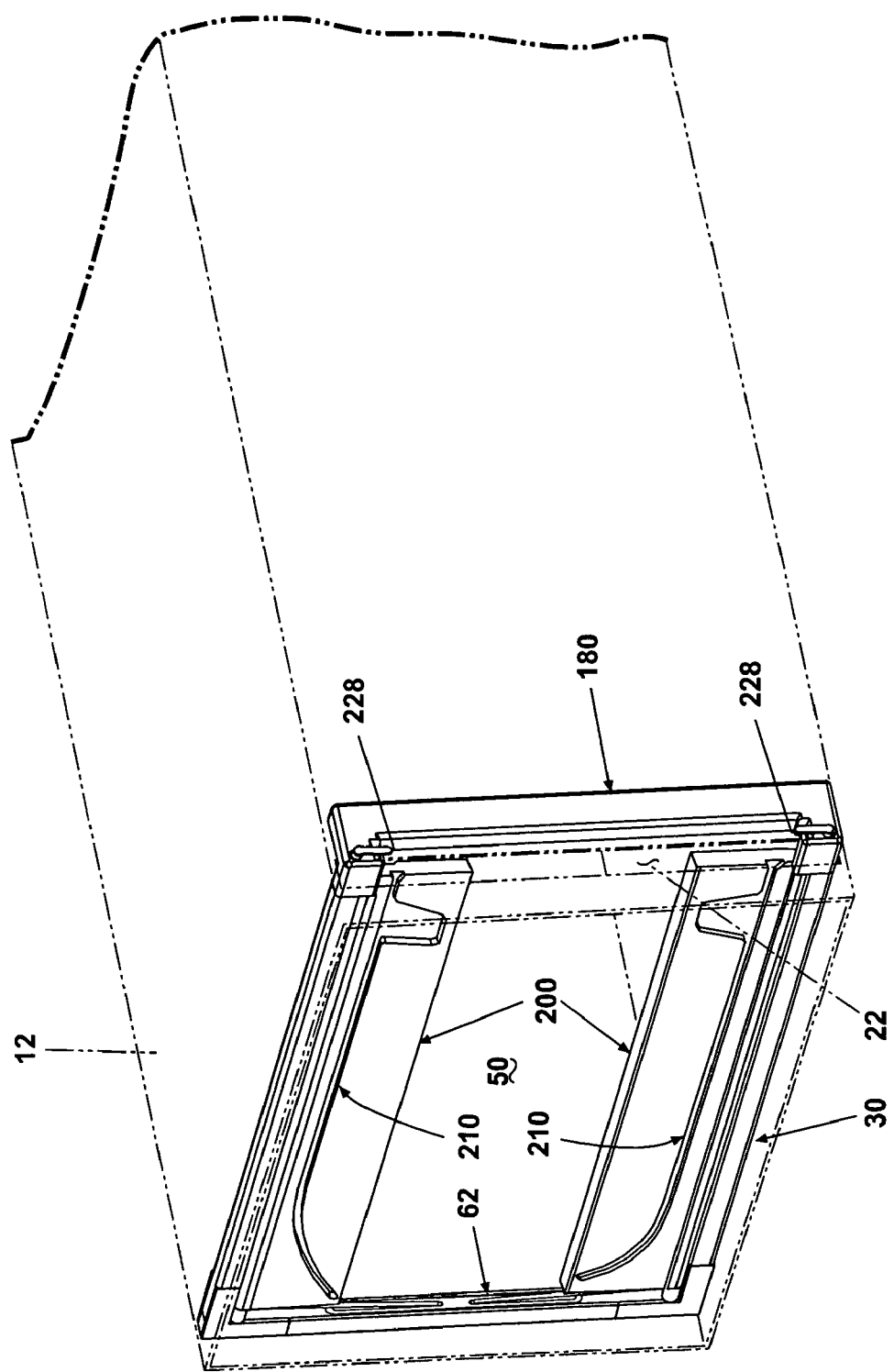
FIG. 23 is a perspective view similar to FIG. 22, wherein the expandable air cleaner frame is inserted into the return duct through the opening, and the guide supports remain in the collapsed condition.
Figure 24:
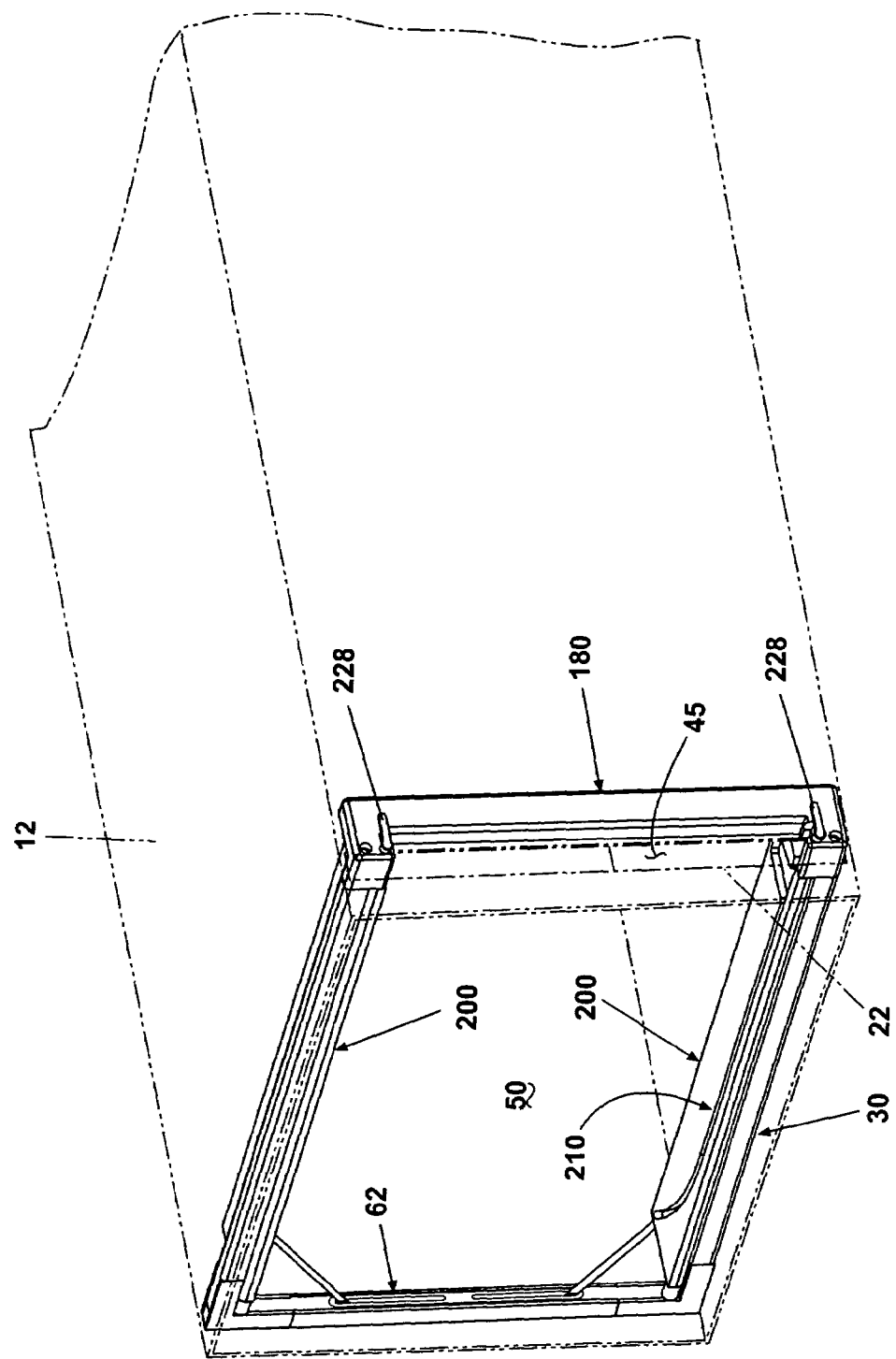
FIG. 24 is a perspective view similar to FIG. 23, wherein the guide supports have been moved to the expanded condition.

The assembly and operation of the air cleaner 24 of FIGS. 15-21 follows with reference to FIGS. 22-31. As illustrated in FIG. 22, a user grasps the handle portion 184 of the frame support 180 and aligns the expandable air cleaner frame 30, with the guide supports 200 in the collapsed condition, with the opening 22 in the return duct 12. When the guide supports 200 are in the collapsed condition, the expandable air cleaner frame 30 and the guide portion of the carrier has a collective thickness less than the width of the opening 22 in the return duct 12. Next, the user inserts the expandable air cleaner frame 30 through the opening 22 and slides the peripheral frame 62 into the return duct 12 until it is completely received therein, as shown in FIG. 23. In this state, the aperture 46 of the peripheral frame 62 and the opening 45 of the frame support 180 are aligned with the opening 22 in the return duct 12. Once the expandable air cleaner frame 30 is positioned within the return duct 12, the user rotates the levers 228 to thereby move the guide supports 200 from the collapsed condition to the expanded position as described above and shown in FIG. 24. It is apparent in FIG. 24 that when the guide portion of the carrier is in the expanded condition, the guide supports 200 project into the airflow passageway in the return duct 12, and the collective thickness of the expandable air cleaner frame 30 and the guide portion of the carrier is greater than the width of the opening 22.

Figure 27:
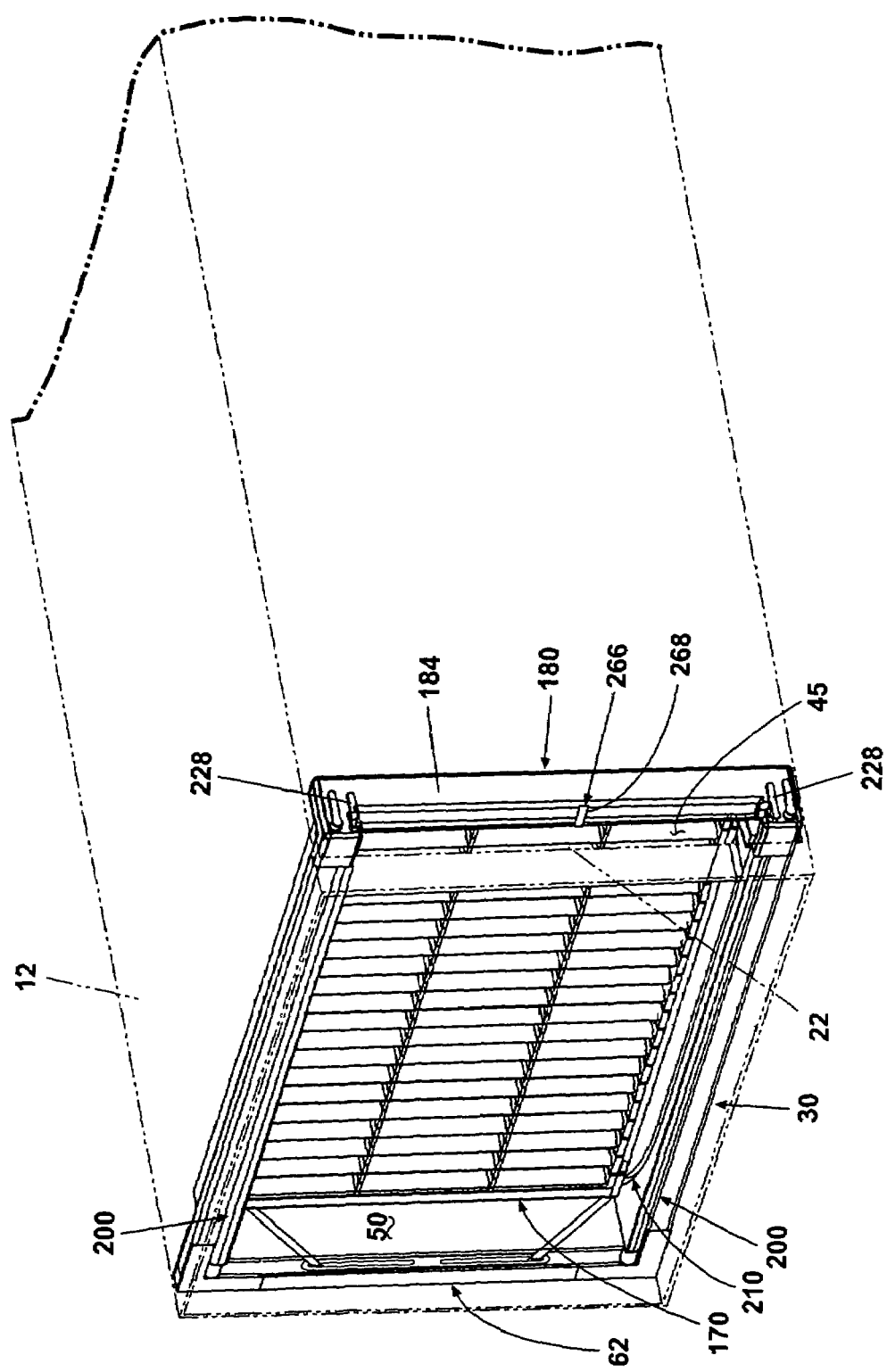
FIG. 27 is a perspective view similar to FIG. 25, wherein the first filter element is fully inserted into the expandable air cleaner frame.

With the expandable air cleaner frame 30 inserted into the return duct 12 and the guide portion of the carrier in the expanded condition, the multiple filter elements can be inserted into expandable air cleaner frame 30 through the opening 22. To insert the first filter element 170, the user aligns the leading pins 271 with the channels 192 of the frame support 180 and inserts the first filter element 170, with the handle 266 in the insert position, into the opening 45 between the channels 192. As the user inserts the first filter element 170 through the opening 45 and the aperture 46, the leading pins 271 pass through the channels 192 and enter the straight portion 212 of the guides 210 on the guide supports 200. When the first filter element 170 is in this position, as shown in FIG. 25, the positioning coupler/expander is said to be in an insert position. As the user continues to insert the first filter element 170 through the aperture 46 and into the recess 50, the leading pins 271 ride along the straight portion 212 of the guides 210. When the leading pins 271 reach the arcuate portion 214 of the guides 210, the guides 210 direct the leading pins 271 toward the guide support outside edge 204, which is exterior of the recess 50. Consequently, the distal rail 248 of the first filter element 170 moves to a position exterior of the recess 50 as the first filter element 170 is inserted into the expandable air cleaner frame 30. Additionally, when the first filter element 170 is inserted into the expandable air cleaner frame 30 a sufficient amount, the trailing pins 273 pass through the channels 192 and enter the straight portions 212 of the guides 210. Once the leading pins 271 reaches the stops 216 at the end of the guides 210, the first filter element 170 is positioned such that the distal rail 248 is exterior of the recess 50, the proximal rail 246 is in the recess 50, and the trailing pins 273 are adjacent the positioning branches 215 of the guides 210, as shown schematically by the dashed line in FIG. 26. Next, the user rotates the handle 266 to the installed position, as shown in FIG. 27, and slides the proximal rail 246 toward the outside edge 204 of the guide supports 200. As a result, the trailing pins 273 ride along the positioning branches 215 towards the outside edges 204 of the guide supports 200, and the first filter element 170 moves to an installed position, wherein the first filter element 170 is generally parallel to the peripheral frame 62 of the expandable air cleaner frame 30, as shown schematically by the dash-dot-dash line in FIG. 26. In this position, the first filter element 170 is entirely exterior of the recess 50, and the leading pins 271 and the guides 210 that form the positioning coupler/expander are said to be in an installed condition.

Figure 28:
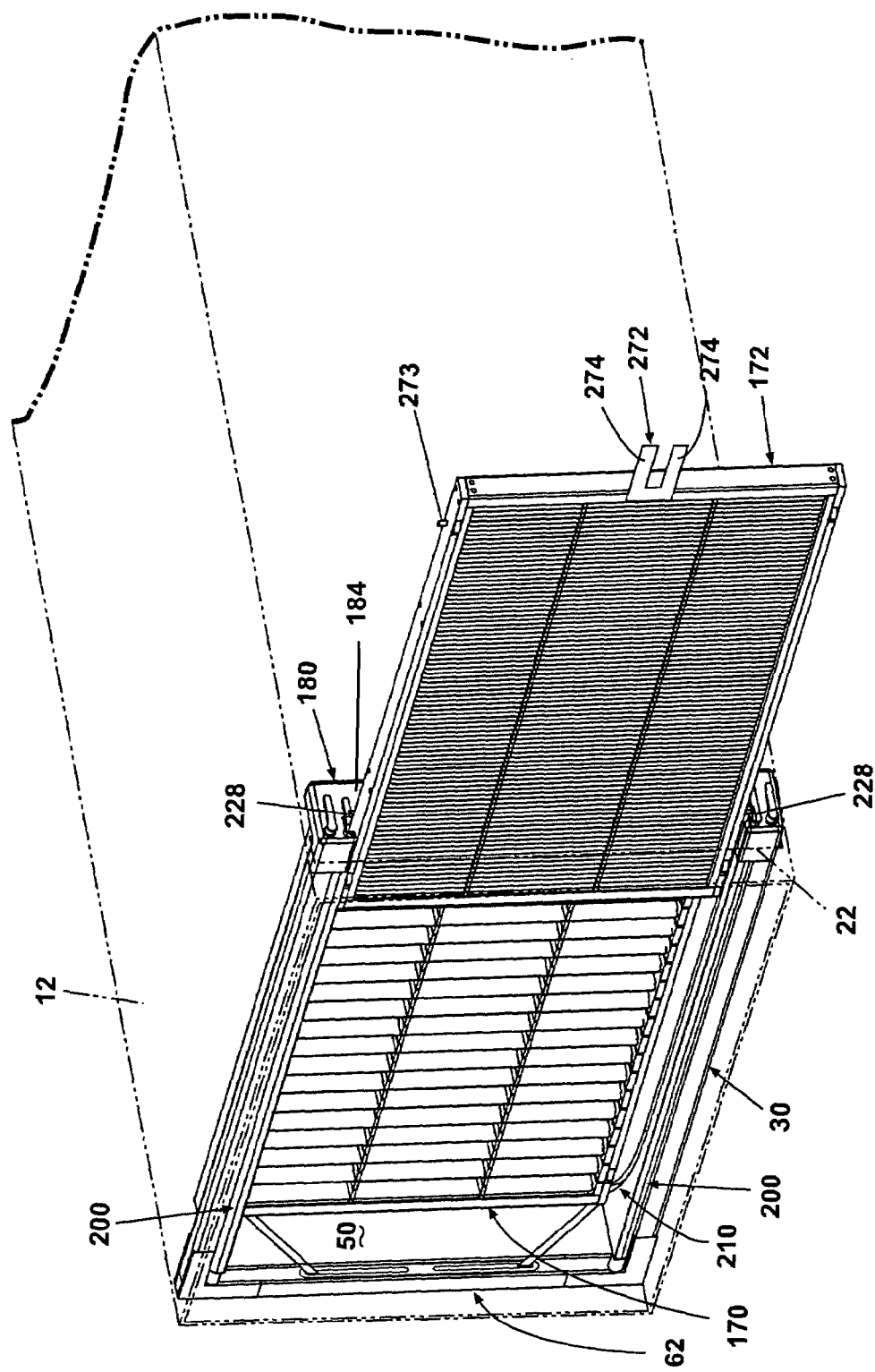
FIG. 28 is a perspective view similar to FIG. 27, wherein the second filter element is partially inserted into the expandable air cleaner frame.
Figure 29:
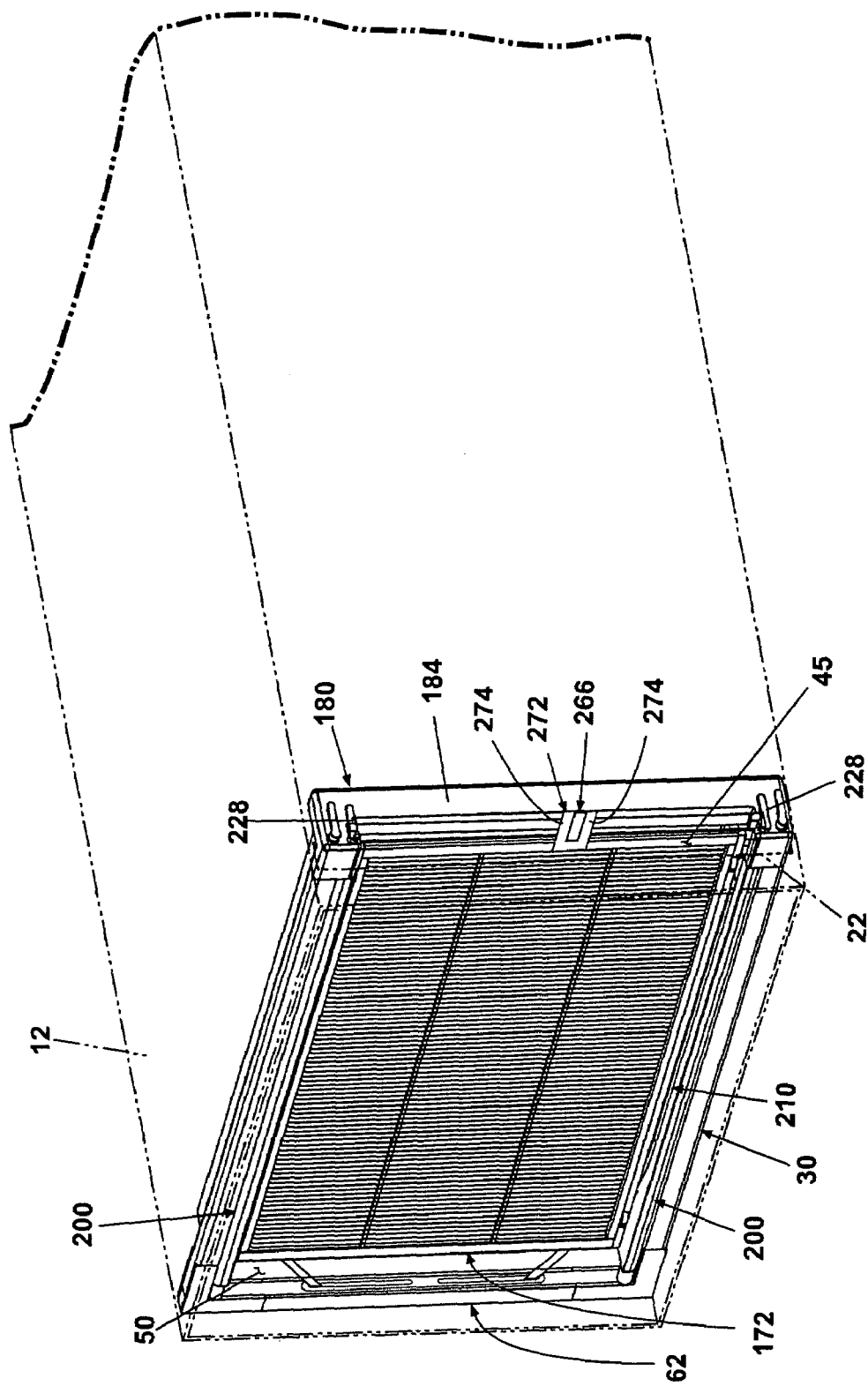
FIG. 29 is a perspective view similar to FIG. 28, wherein the second filter element is fully inserted into the expandable air cleaner frame.

After the first filter element 170 is installed, the user can insert the second filter element 172 into the opening 22 of the return duct 12 in a similar manner. The user aligns the leading pins 271 with the channels 192 of the frame support 180 and inserts the second filter element 172 into the opening 45 between the channels 192, as illustrated in FIG. 28. As the user inserts the second filter element 172 through the opening 45 and the aperture 46, the leading pins 271 pass through the channels 192 and enter the straight portion 212 of the guides 210 on the guide supports 200 to place the positioning coupler/expander in the insert position. As the user continues to insert the second filter element 172 through the aperture 46 and into the recess 50, the leading pins 271 ride along the straight portion 212 of the guides 210. When the leading pins 271 reach the arcuate portion 214 of the guides 210, the guides 210 direct the leading pins 271 toward the guide support outside edge 204. Consequently, the distal rail 248 of the second filter element 172 moves to a position exterior of the recess 50 and adjacent the first filter element 170 as the second filter element 172 is inserted into the expandable air cleaner frame 30. Additionally, when the second filter element 172 is inserted into the expandable air cleaner frame 30 a sufficient amount, the trailing pins 273 pass through the channels 192 and enter the straight portions 212 of the guides 210. Movement of the second filter element 172 into the return duct 12 ceases when the distal rail 248 reaches the distal edge 208 of the guide supports 200. As described above, the leading pins 271 are spaced from the distal rail 248 a larger distance than for the first filter element 170, and this distance corresponds to the relative positioning of the filter elements 170, 172, 174 on the guide supports 200. The closer the filter element is to the inside edge 202 of the guide support 200, the farther the leading pins 271 are from the distal rail 248. Finally, the user slides the proximal rail 246 toward the first filter element 170 so that the trailing pins 273 ride in the positioning branches 215 to position the second filter element 172 in the installed position, wherein the second filter element 172 is generally parallel to the peripheral frame 62 of the expandable air cleaner frame 30 and to the first filter element 170, as shown in FIG. 29. In this position, the second filter element 172 is entirely exterior of the recess 50, and the leading pins 271 and the guides 210 that form the positioning coupler/expander are in the installed condition. Further, the arms 274 on the handle 272 receive the grip portion 268 of the handle 266 of the first filter element 170 therebetween.

Figure 30:
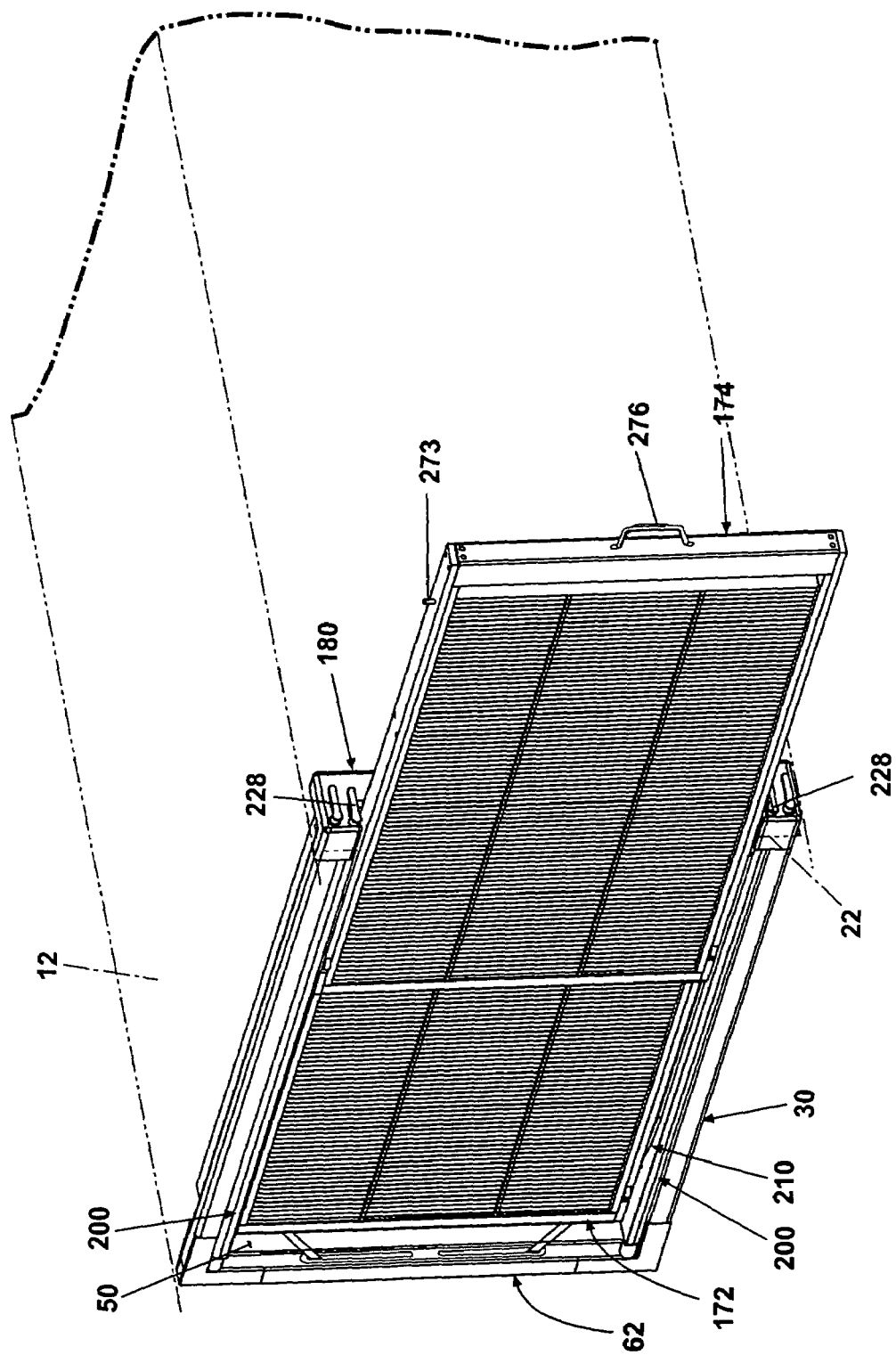
FIG. 30 is a perspective view similar to FIG. 29, wherein a third filter element of the multiple filter elements is partially inserted into the expandable air cleaner frame.
Figure 31:
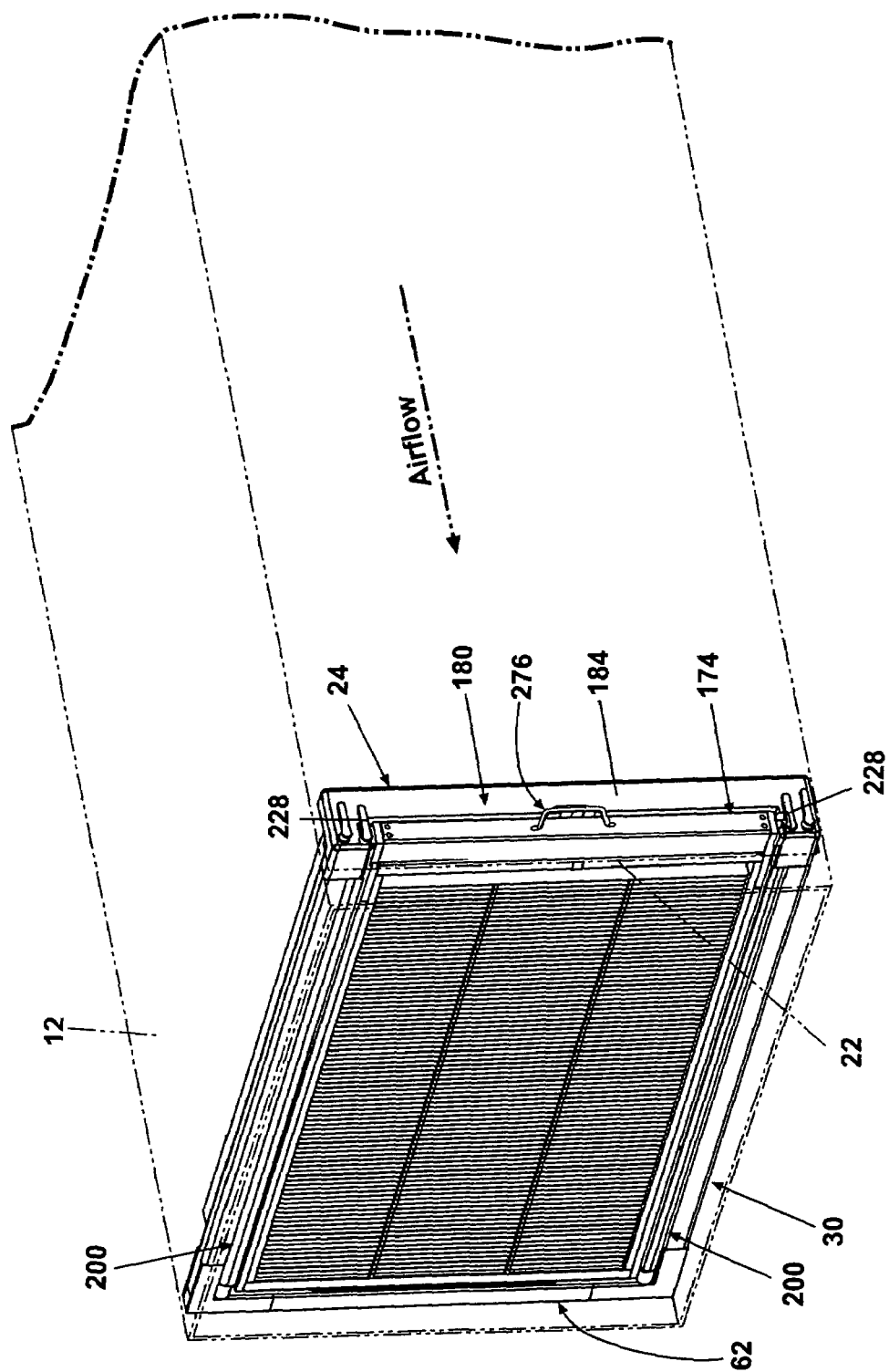
FIG. 31 is a perspective view similar to FIG. 30, wherein the third filter element of the multiple filter elements is fully inserted into the expandable air cleaner frame, and, therefore, the entire air cleaner from FIG. 15 is mounted inside the return duct.

After the second filter element 172 is installed, the user can insert the third filter element 174 into the opening 22 of the return duct 12 in a similar manner. The user aligns the leading pins 271 with the channels 192 of the frame support 180 and inserts the third filter element 174 into the opening 45 between the channels 192, as illustrated in FIG. 30. As the user inserts the third filter element 174 through the opening 45 and the aperture 46, the leading pins 271 pass through the channels 192 and enter the straight portion 212 of the guides 210 on the guide supports 200 to place the positioning coupler/expander in the insert position. As the user continues to insert the third filter element 174 through the aperture 46 and into the recess 50, the leading pins 271 ride along the straight portion 212 of the guides 210, and when the first filter element 170 is inserted into the expandable air cleaner frame 30 a sufficient amount, the trailing pins 273 pass through the channels 192 and also enter the straight portions 212 of the guides 210. The leading pins 271 are spaced a sufficient distance from distal rail 248 so that they do not reach the arcuate portion 214 of the guides 210. As a result, the third filter element 174 remains in the recess 50 as it is inserted into the expandable air cleaner frame 30. When the distal rail 248 of the third filter element 174 reaches the distal edge 208 of the guide supports 200, as shown in FIG. 31, the positioning coupler/expander are in the installed position, and the entire third filter element 174 is received in the recess 50, except for the proximal rail 246, which resides in the opening 45 between the channels 192 of the frame support 180.

After the third filter element 174 is installed in the expandable air cleaner frame 30, the entire air cleaner 24 is installed in the return duct 12 and ready for operation. The spring arms 262 that protrude through the spring clip apertures 256 of the multiple filter elements 170, 172, 174 abut one another to help maintain the positioning of the multiple filter elements 170, 172, 174 relative to one another. As air flows through the return duct 12, as indicated by the arrow in FIG. 31, the air cleaner 24 efficiently removes dust and other particulate matter. If any of the multiple filter elements 170, 172, 174 requires replacement or cleaning while the expandable air cleaner frame 30 is disposed in the duct 12, the multiple filter elements 170, 172, 174 can be removed by performing the above assembly process in reverse.

The embodiment of the air cleaner 24 of FIGS. 15-31 can be designed to support any suitable number of filter elements, and the air cleaner 24 can be used with or without a filter element in the recess 50. The guide supports 200 on the expandable air cleaner frame 30 can be arranged to position the first and second filter elements 170, 172 either upstream or downstream of the recess 50. Additionally, the expandable air cleaner frame 30 can be modified to include two sets of guide supports 200 that expand upstream and downstream of the recess 50 so that the filter elements can be positioned both upstream and downstream of the recess 50.

Figure 32:
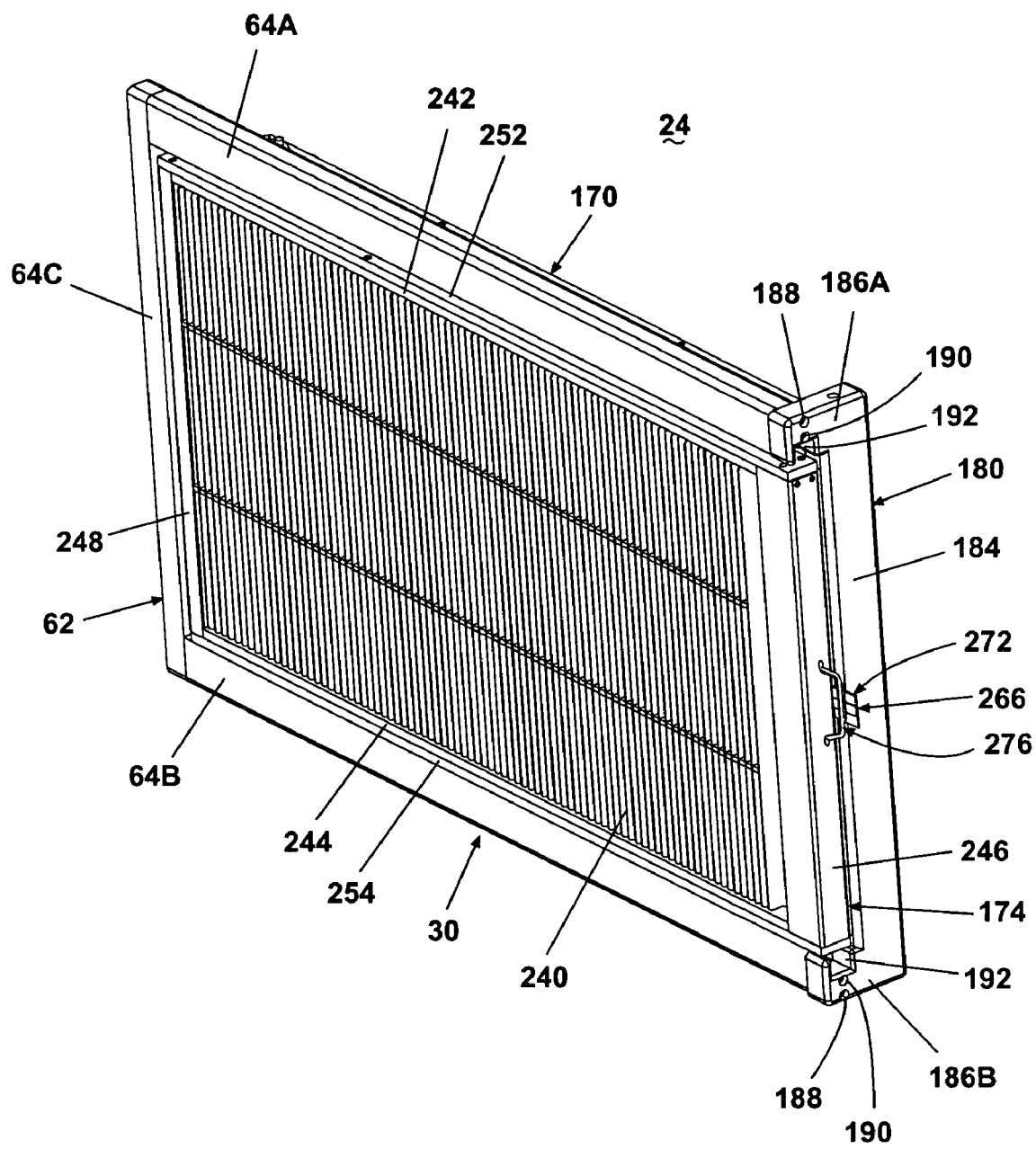
FIG. 32 is a rear perspective view of a fifth embodiment of an air cleaner according to the invention comprising multiple filter elements and an air cleaner frame.
Figure 33:
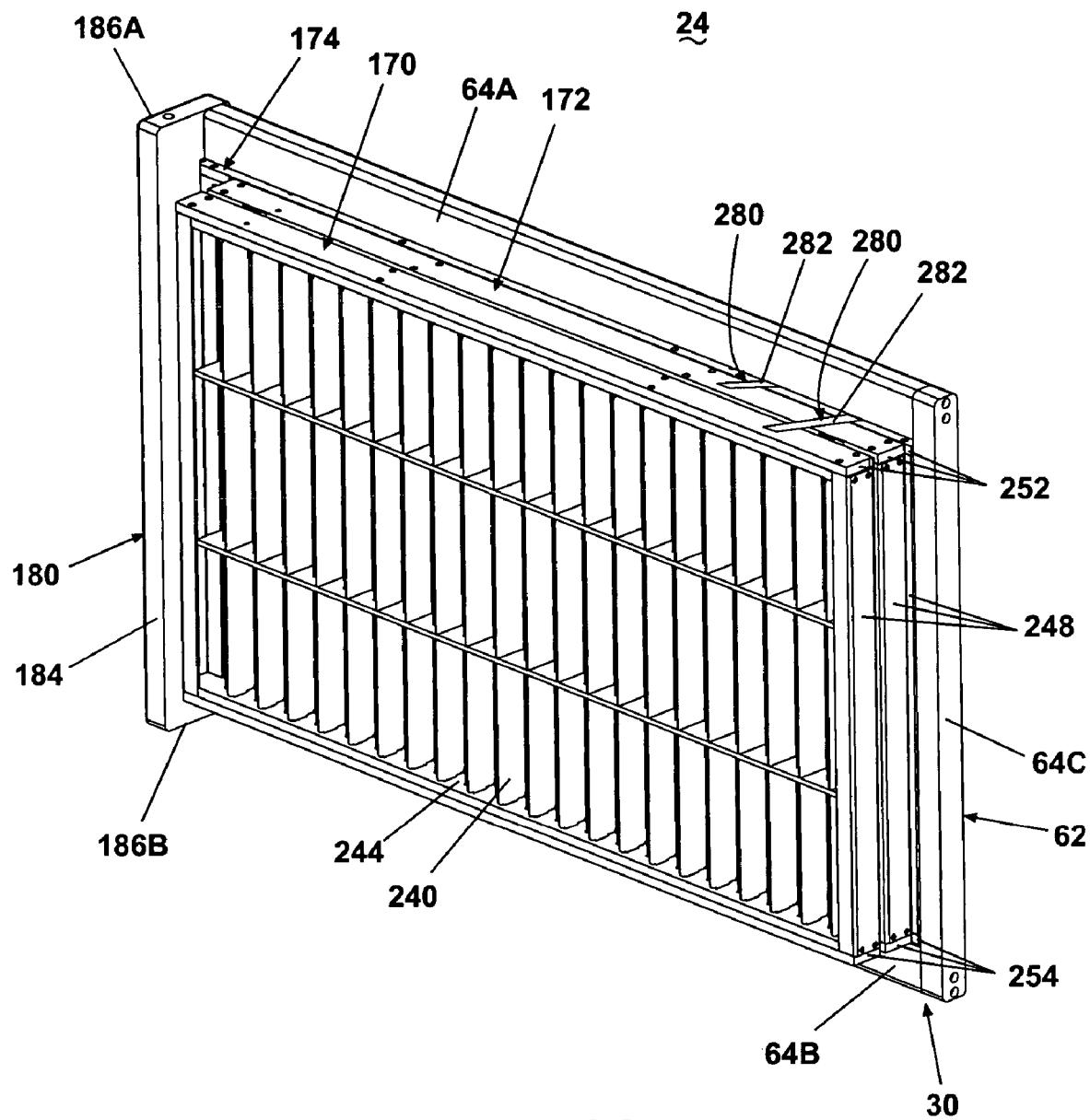
FIG. 33 is a front perspective view of the air cleaner from FIG. 32.
Figure 34:
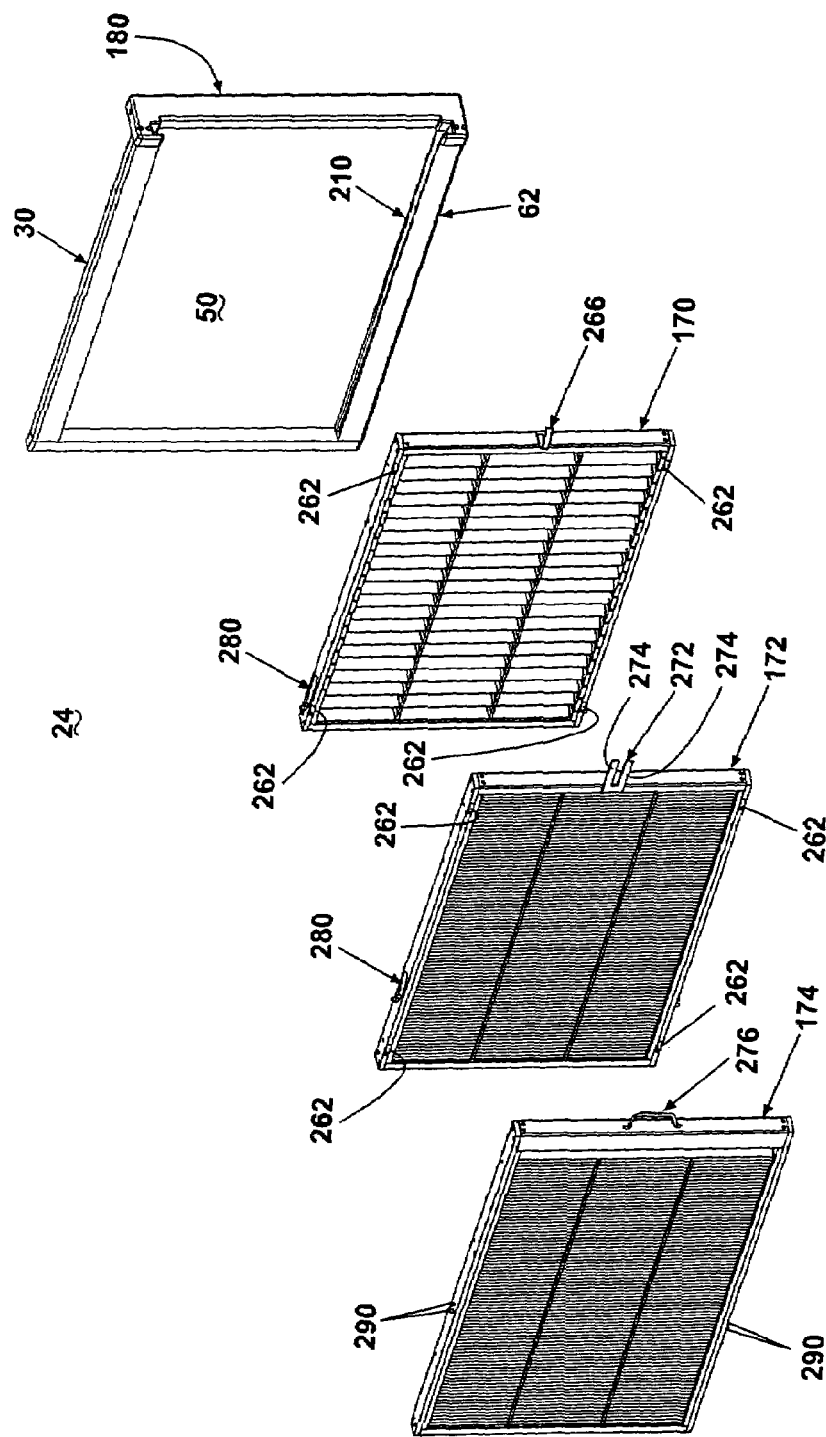
FIG. 34 is an exploded view of the air cleaner from FIG. 32.

Another alternative embodiment of an air cleaner 24 with an air cleaner frame 30 according to the invention is illustrated in FIGS. 32-34, where elements similar to those of the previous embodiments are identified with the same reference numerals. The air cleaner frame 30 comprises a filter loading mechanism, as in the embodiments of FIG. 14 and 15, to load and support multiple filter elements inserted through the furnace opening 22. This embodiment of the air cleaner 24 is shown and described as comprising a first filter element 170, a second filter element 172, and a third filter element 174; however, it is within the scope of the invention for the air cleaner 24 to comprise less or more filter elements, as will be described in further detail below.

Figure 35:
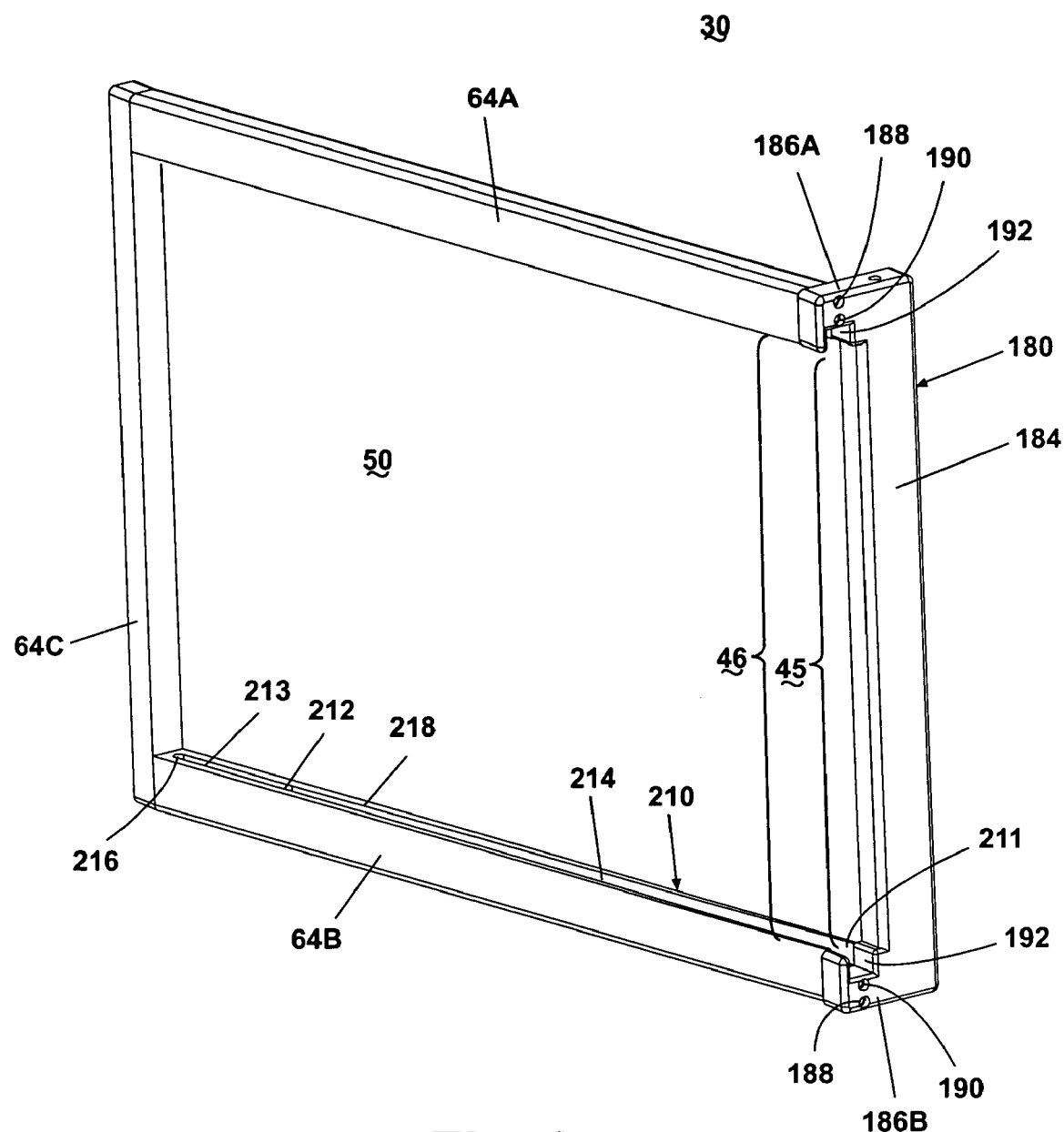
FIG. 35 is a perspective view of the air cleaner frame from FIG. 32.
Figure 36:
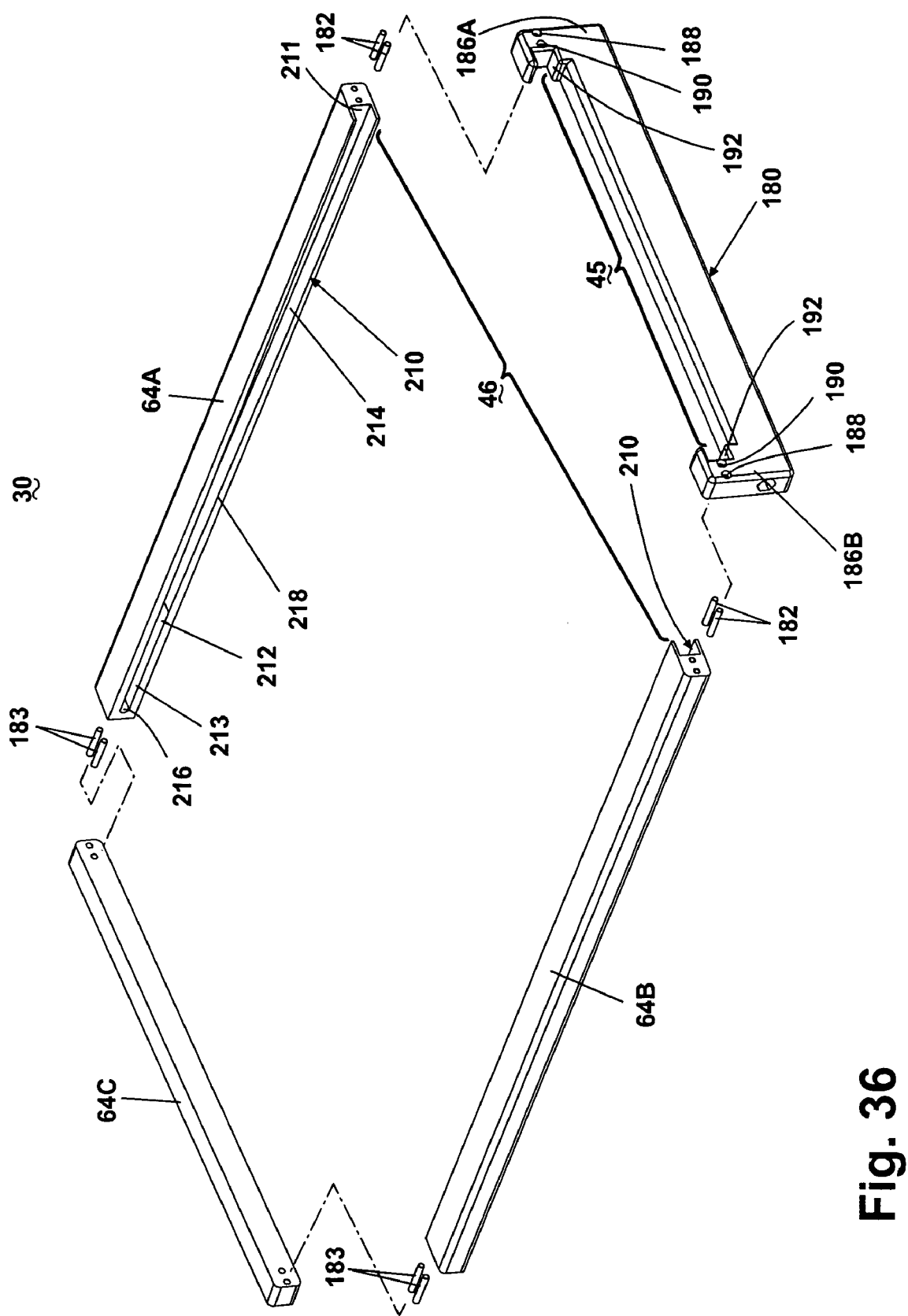
FIG. 36 is an exploded view of the air cleaner frame from FIG. 32.

Referring additionally to FIGS. 35-36, the air cleaner frame 30 comprises a peripheral frame 62 formed by upper and lower bars 64A, 64B mounted at one end to a side bar 64C by fasteners 183 to form an open-sided recess 50 with an elongated aperture 46 that functions as an insert opening at the open side between the upper and lower bars 64A, 64B. The aperture 46 is sized to receive a conventional, standard panel filter, and the peripheral frame 62 is sized to be inserted into the return duct 12 through the opening 22. The ends of the upper and lower bars 64A, 64B opposite the side bar 64C are mounted to a frame support 180 by fasteners 182. The frame support 180 is generally U-shaped and has an elongated handle portion 184 flanked by upper and lower mounts 186A, 186B. Each of the upper and lower mounts 186A, 186B includes first and second apertures 188, 190 that receive fasteners 182 to mount the upper and lower bars 64A, 64B to the upper and lower mounts 186A, 186B, respectively. Further, each of the upper and lower mounts 186A, 186B includes a channel 192 adjacent the second aperture 190. The channels 192 on the upper and lower mounts 186A, 186B are oriented such that they are vertically aligned and face one another. An opening 45 between the channels 192 is aligned with the aperture 46 of the peripheral frame 62, and the aperture 46 and the opening 45 are sized to receive one of the filter elements 170, 172, 174 for insertion into the recess 50.

The upper and lower bars 64A, 64B of the air cleaner frame 30 also function as guide supports. Each of the upper and lower bars 64A, 64B comprises a guide 210 in the form of a groove, and the guides 210 are located on the upper and lower bars 64A, 64B such that they face the recess 50 and one another. The guide 210 extends between a proximal end 211 and a distal end 213 and has a tapered portion 214 that begins at the proximal end 211 and a generally straight portion 212 that terminates at a stop 216 at the distal end 213. The tapered portion 214 and the straight portion 212 meet at a transition 218 located between the proximal and distal ends 211, 213. The upper and lower bars 64A, 64B and the guide 210 are positioned relative to the frame support 180 so that the proximal end 211 of the guide 210 aligns with the channel 192 in the frame support 180.

Figure 37:
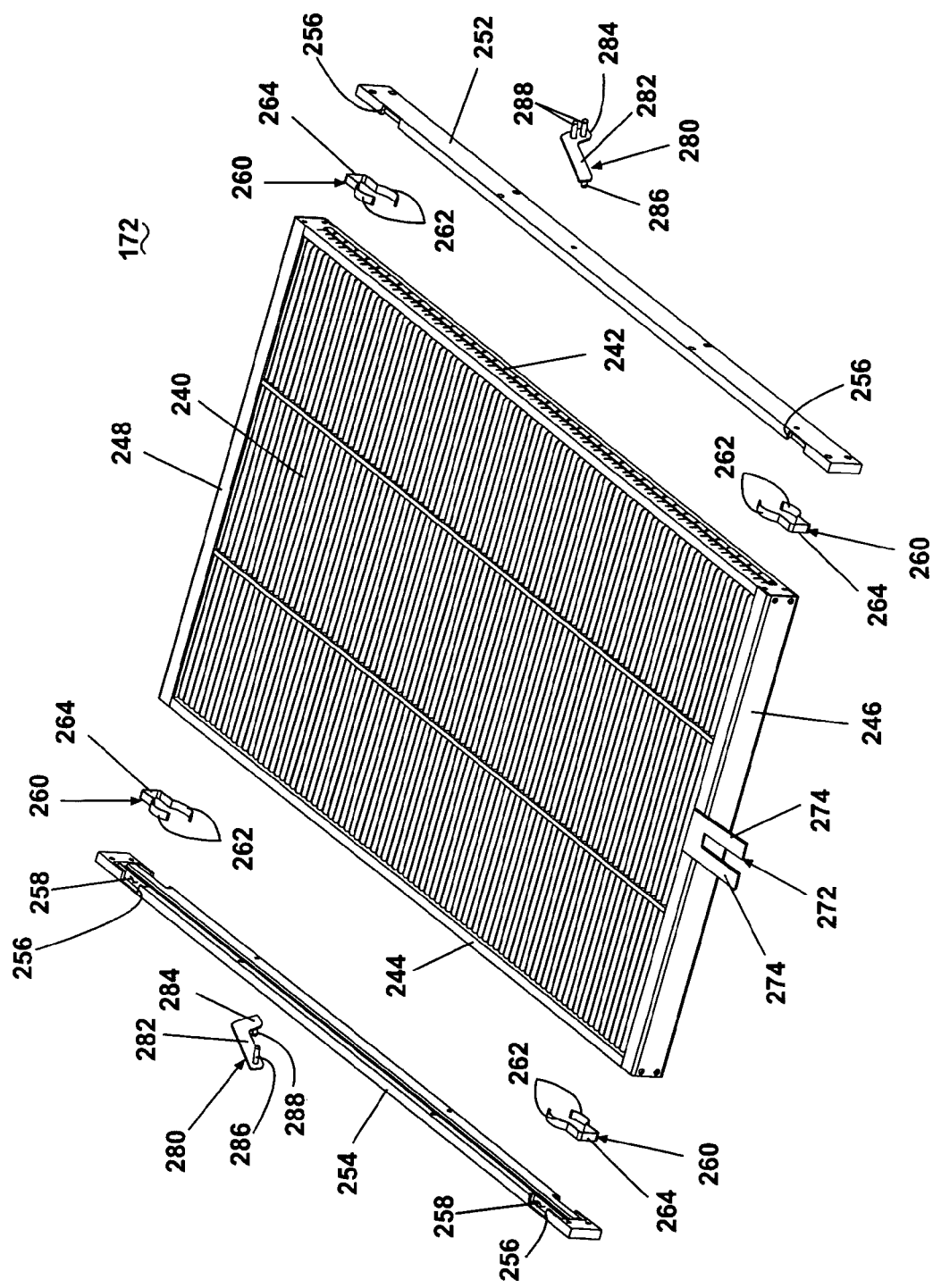
FIG. 37 is an exploded view of a second filter element of the multiple filter elements from FIG. 32.

The first, second, and third filter elements 170, 172, 174 can be any suitable air conditioning element or carrier as described above with respect to the previous embodiments. Regardless of the type of filter element, the first, second, and third filter elements 170, 172, 174 have common structural components, which will be described with respect to the second filter element 172 illustrated in FIG. 37. The second filter element 172 is essentially identical to the second filter element shown with respect to the embodiment of FIGS. 15-31, except that the guide followers of the second filter element are a pair of swing arms 280 rather than the leading pins 271. As with the leading pins 271, the swing arms 280 are mounted to the upper and lower caps 252, 254 on the sides facing away from the filter element body 240 and are equidistant from the distal rail 248. Each swing arm 280 comprises a first arm 282 and an integral and shorter second arm 284 oriented at an obtuse angle relative to the first arm 282. A projection 286 fixed to a lower side of the first arm 282 is rotatably mounted to the respective upper and lower cap 252, 254 to rotatably mount the swing arm 280 to the respective upper and lower cap 252, 254. Further, the swing arm 280 includes a pair of cam projections 288 fixed to an upper side of the second arm 284. The cam projections 288 are sized such that they can be slidingly received in the guides 210 to mount the second filter element 172 to the upper and lower bars 64A, 64B.

Together, the guides 210 and the swing arms 280 function as a carrier to mount the second filter element 172 to the air cleaner frame 30. The guides 210 and the swing arms 280 can also be referred to as a positioning coupler because they couple the second filter element 172 to the air cleaner frame 30, and the interaction between the guides 210 and the swing arms 280 position the second filter element 172 relative to the air cleaner frame 30, as will be described in further detail below. Another term for the guides 210 and the swing arms 280 is an expander because movement of the second filter element 172 and the swing arms 280 relative to the guide supports 200 effectively expands the width of the air cleaner 24, as will also be described in further detail below.

Referring again to FIG. 34, the first and third filter elements 170, 174 are similar to the second filter element 172, and the primary differences between the first, second, and third filter elements 170, 172, 174 are substantially the same as the differences described above with respect to the embodiment of FIGS. 15-31. The differences unique to the first, second, and third filter elements 170, 172, 174 of the present embodiment lie in the swing arms 280. The spring arm 280 on the first filter element 170 is identical to the spring arm 280 on the second filter element 170, except that the first arm 282 for the first filter element 170 is longer than the first arm 282 for the second filter element 172. Additionally, the projections 286 of the swing arms 280 are mounted to the respective upper and lower caps 252, 254 of the first filter element 170 in a position closer to the distal rail 248 compared to the second filter element 172, as seen in FIG. 34, for reasons that are explained below in the description of the assembly and operation of the air cleaner 24. The third filter element 172 does not include the pair of swing arms 280; rather, the third filter element comprises pairs of pins 290 mounted to the upper and lower caps 252, 254. The pairs of pins 290 are located farther from the distal rail 248 than the projections 286 on the swing arms 280 of the second filter element 172.

Figure 38:
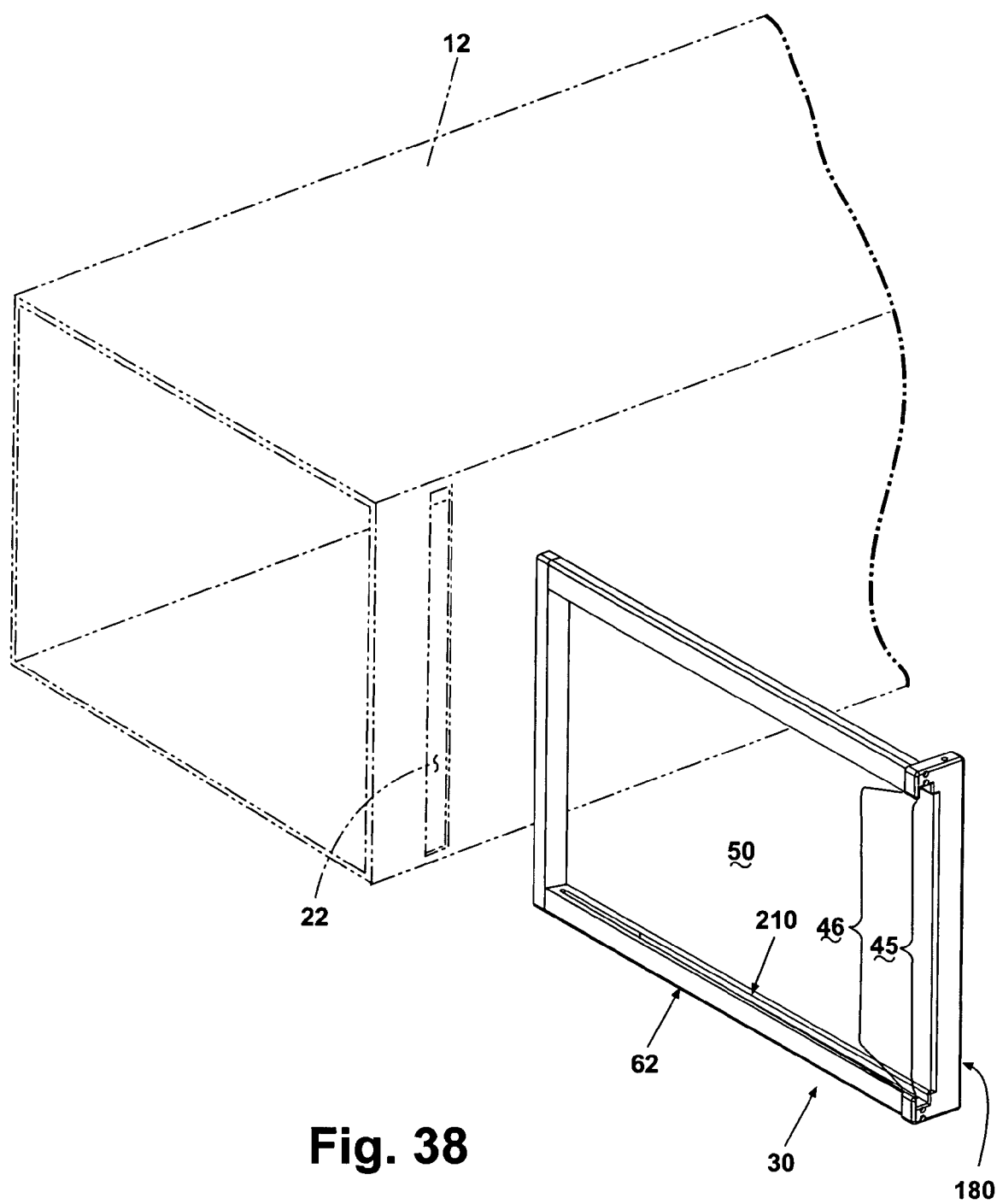
FIG. 38 is a perspective view of the air cleaner frame from FIG. 32 and the return duct from FIG. 1, wherein the air cleaner frame is positioned near the opening of the return duct.
Figure 39:
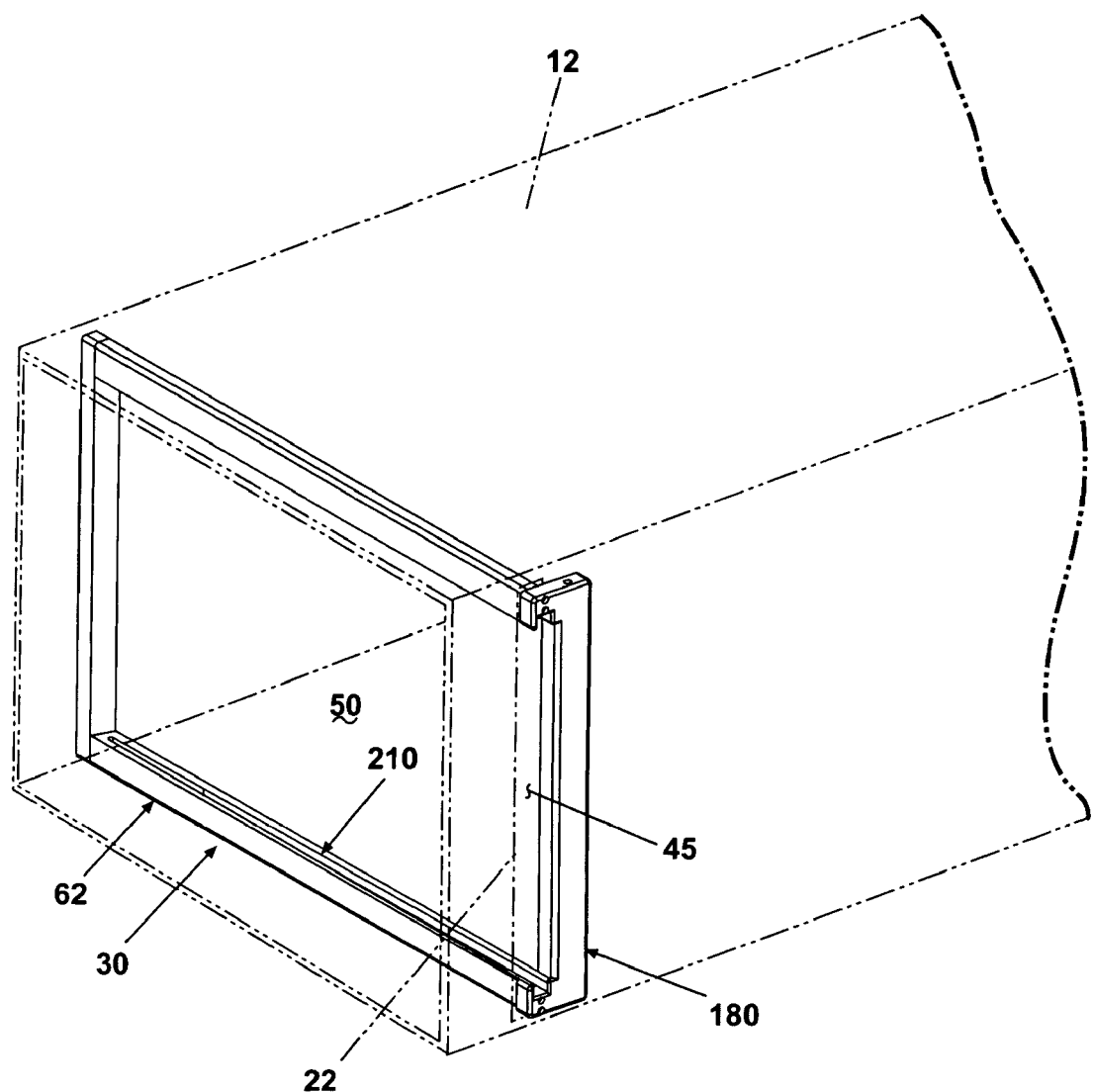
FIG. 39 is a perspective view similar to FIG. 38, wherein the air cleaner frame is inserted into the return duct through the opening.

The assembly and operation of the air cleaner 24 of FIGS. 32-37 follows with reference to FIGS. 38-45. As illustrated in FIG. 38, a user grasps the handle portion 184 of the frame support 180 and aligns the air cleaner frame 30 with the opening 22 in the return duct 12. In this condition, the air cleaner frame 30 and the guide portion of the carrier has a collective thickness less than the width of the opening 22 in the return duct 12. Next, the user inserts the air cleaner frame 30 through the opening 22 and slides the peripheral frame 62 into the return duct 12 until it is completely received therein, as shown in FIG. 39. In this state, the aperture 46 of the peripheral frame 62 and the opening 45 of the frame support 180 are aligned with the opening 22 in the return duct 12.

Figure 40:
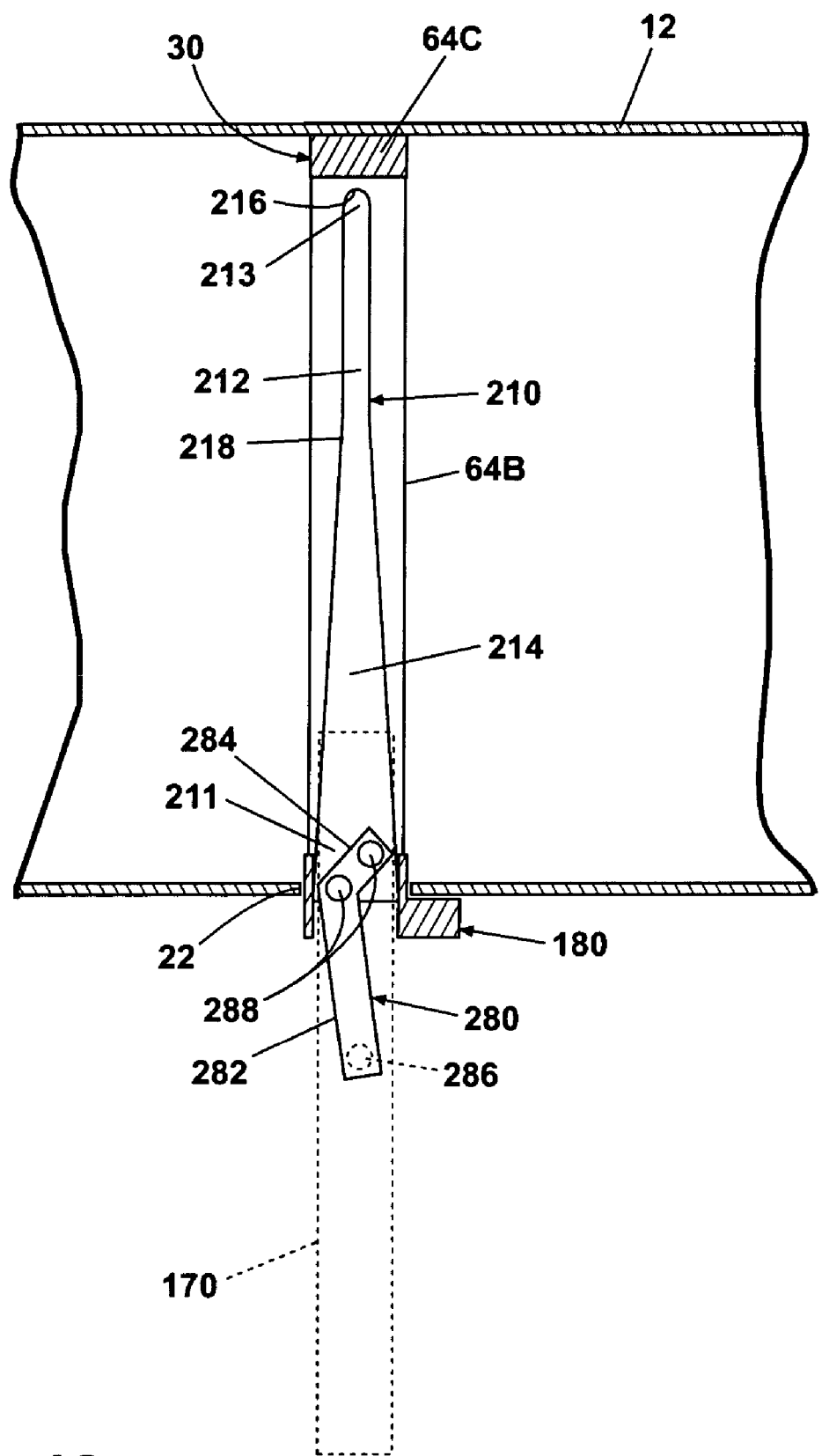
FIG. 40 is a schematic view of a first filter element of the multiple filter elements being initially inserted into the air cleaner frame.
Figure 41:
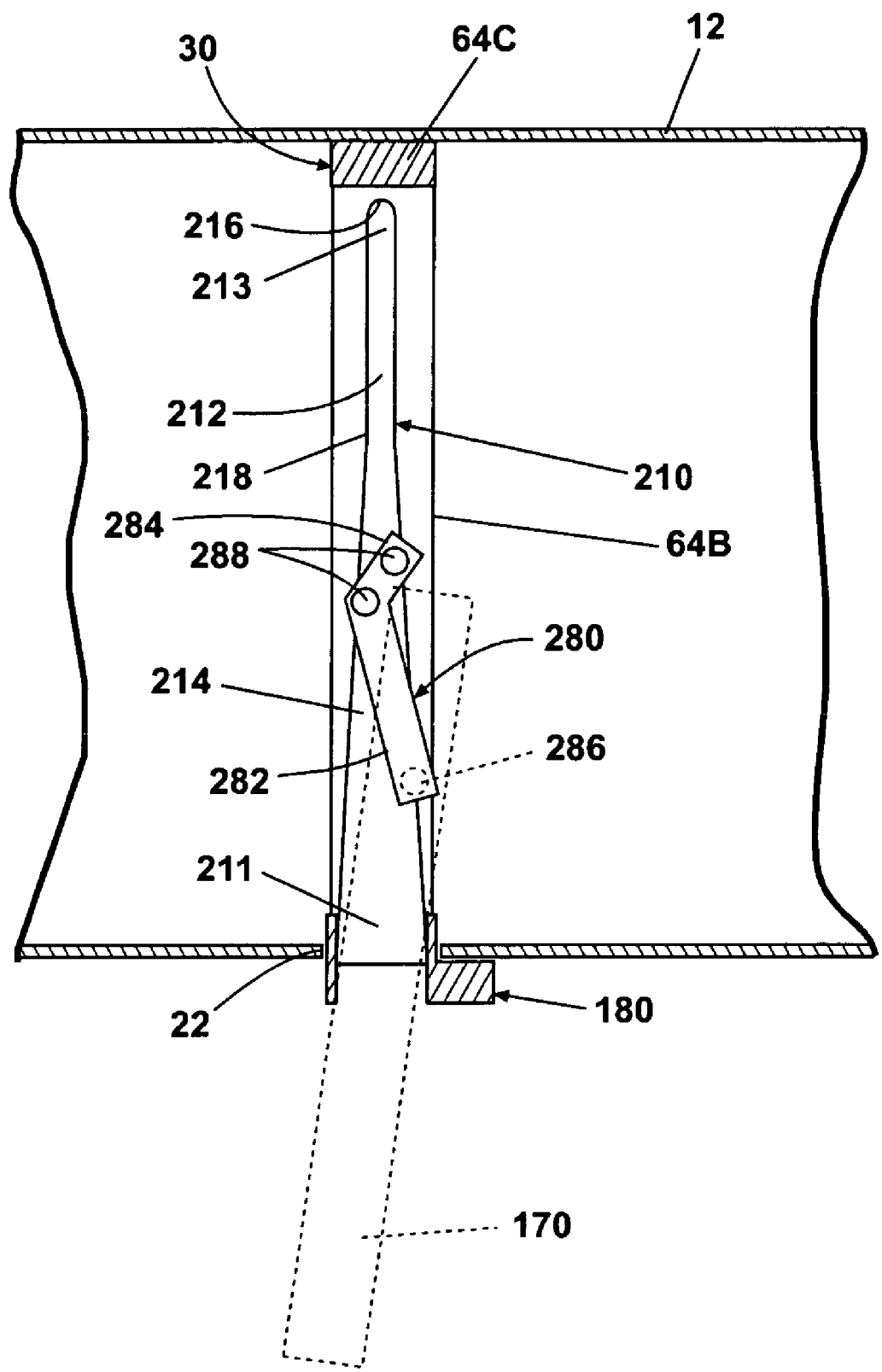
FIG. 41 is a schematic view similar to FIG. 40, wherein the first filter element is partially inserted into the air cleaner frame.
Figure 42:
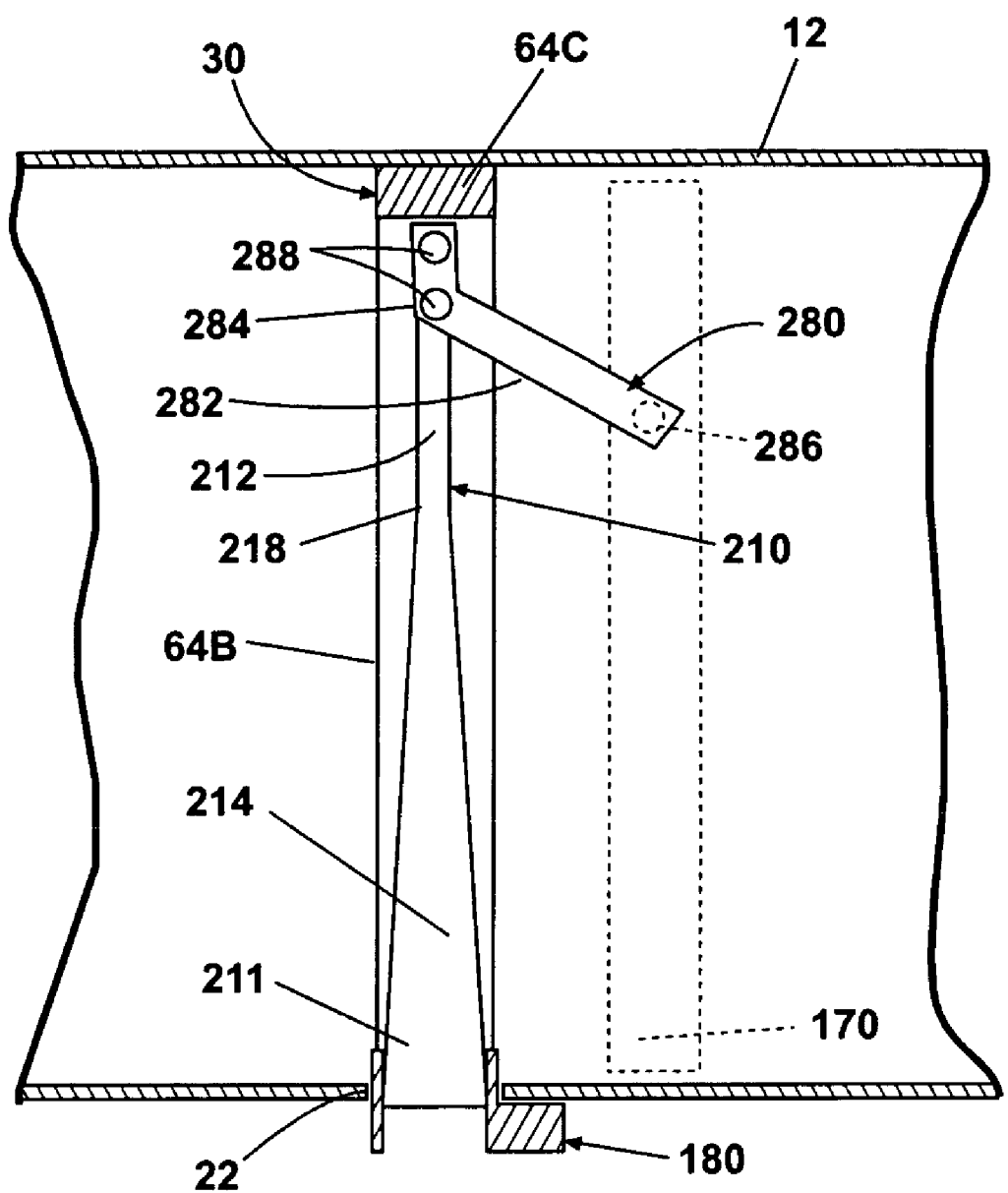
FIG. 42 is a schematic view similar to FIG. 41, wherein the first filter element is fully inserted into the air cleaner frame.

With the air cleaner frame 30 inserted into the return duct 12, the multiple filter elements can be inserted into air cleaner frame 30 through the opening 22. The progression of inserting the first filter element 170 into the air cleaner frame 30 is schematically illustrated in FIGS. 40-42. To insert the first filter element 170, the user aligns the cam projections 288 on the upper and lower caps 252, 254 with the channels 192 of the frame support 180 and inserts the first filter element 170, with the handle 266 in the insert position, into the opening 45 between the channels 192. As the user inserts the first filter element 170 through the opening 45 and the aperture 46, the cam projections 288 pass through the channels 192 and enter the proximal ends 211 of the guides 210, as shown in FIG. 40. The swing arms 280 are oriented such that the cam projections 288 are horizontally spaced across the width of the proximal ends 211 of the guides 210. When the first filter element 170 is in this position, the positioning coupler/expander is said to be in an insert position. As the user continues to insert the first filter element 170 through the aperture 46 and into the recess 50, the cam projections 288 ride along the tapered portions 214 of the guides 210, and the tapered portions 214 gradually force the cam projections 288 to become less horizontally spaced, whereby the swing arms 280 begin to rotate and force the first filter element 170 towards a position exterior of the recess 50, as shown in FIG. 41. When the cam projections 288 pass through the transition 218 between the tapered portion 214 and the straight portion 212 and enter the straight portion 212, the cam projections 288 become aligned within the straight portion 212, as shown in FIG. 42. Consequently, the cam projections 288 force the swing arms 280 to fully rotate and thereby move the first filter element 170 to a position exterior of the recess 50. As the first filter element 170 moves out of the recess 50, the user rotates the handle 266 to the installed position to aid in positioning the first filter element 170 relative to the air cleaner frame 30. Once the cam projections 288 abut the stops 216 at the end of the guides 210, the first filter element 170 is in an installed position, wherein the first filter element 170 is generally parallel to the peripheral frame 62 of the air cleaner frame 30, as shown in FIG. 42. In this position, the first filter element 170 is entirely exterior of the recess 50, and the swing arms 280 and the guides 210 that form the positioning coupler/expander are said to be in an installed condition.

Figure 43:
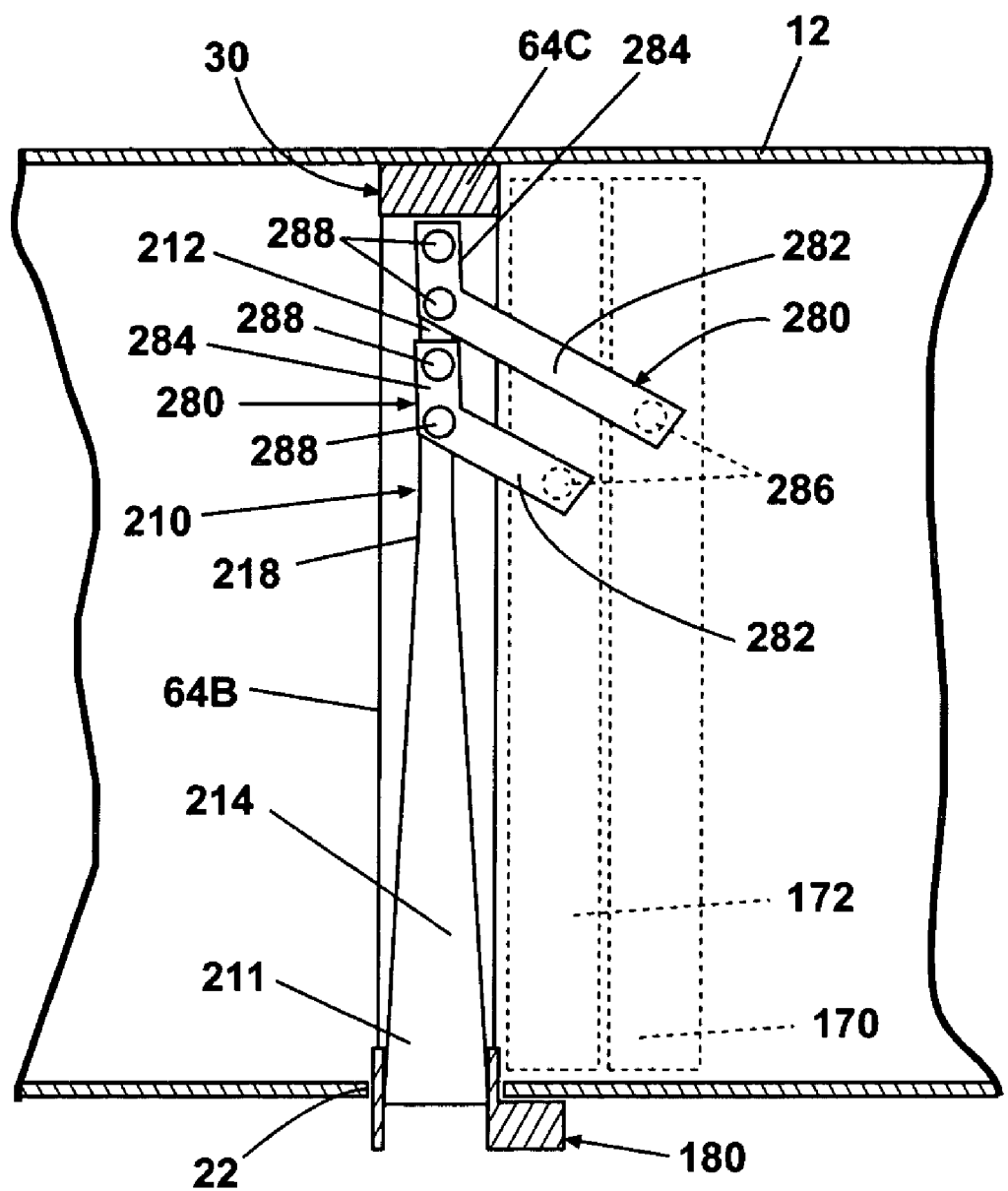
FIG. 43 is a schematic view similar to FIG. 42 with the second filter element of the multiple filter elements fully inserted into the air cleaner frame.

After the first filter element 170 is installed, the user can insert the second filter element 172 into the opening 22 of the return duct 12 in a similar manner. The user aligns the cam projections 288 with the channels 192 of the frame support 180 and inserts the second filter element 172 into the opening 45 between the channels 192. As the user inserts the second filter element 172 through the opening 45 and the aperture 46, the cam projections 288 pass through the channels 192 and enter the proximal ends 211 of the guides 210 to place the positioning coupler/expander in the insert position. As the user continues to insert the second filter element 172 through the aperture 46 and into the recess 50, the cam projections 288 ride along the guides 210, which induce rotation of the swing arms 280 and force the second filter element 172 to a position exterior of the recess 50 and adjacent the first filter element 170, as shown in FIG. 43. Movement of the second filter element 172 into the return duct 12 ceases when the cam projections 288 reach the cam projections 288 of the first filter element 170. As described above, the swing arms 280 are spaced from the distal rail 248 a larger distance than the swing arms 280 of the first filter element 170, and this distance corresponds to the order in which the filter elements 170, 172, 174 are inserted into the air cleaner frame 30. Further, the first arms 282 of the swing arms 280 for the second filter element 172 are shorter than for the first filter element 170 because the second filter element 172 is closer to the peripheral frame 62 when installed into the air cleaner frame 30. In other words, the length of the first arms 282 is proportional to the distance of the filter element from the peripheral frame 62. Finally, the user slides the proximal rail 246 of the second filter element 172 toward the first filter element 170 so that the second filter element 172 is in the installed position, wherein the second filter element 172 is generally parallel to the peripheral frame 62 of the air cleaner frame 30 and to the first filter element 170, as shown in FIG. 43. When the second filter element 172 is installed, the second filter element 172 is exterior of the recess 50, and the cam projections 288 and the guides 210 that form the positioning coupler/expander are in the installed condition. Further, the arms 274 on the handle 272 receive the grip portion 268 of the handle 266 of the first filter element 170 therebetween.

Figure 44:
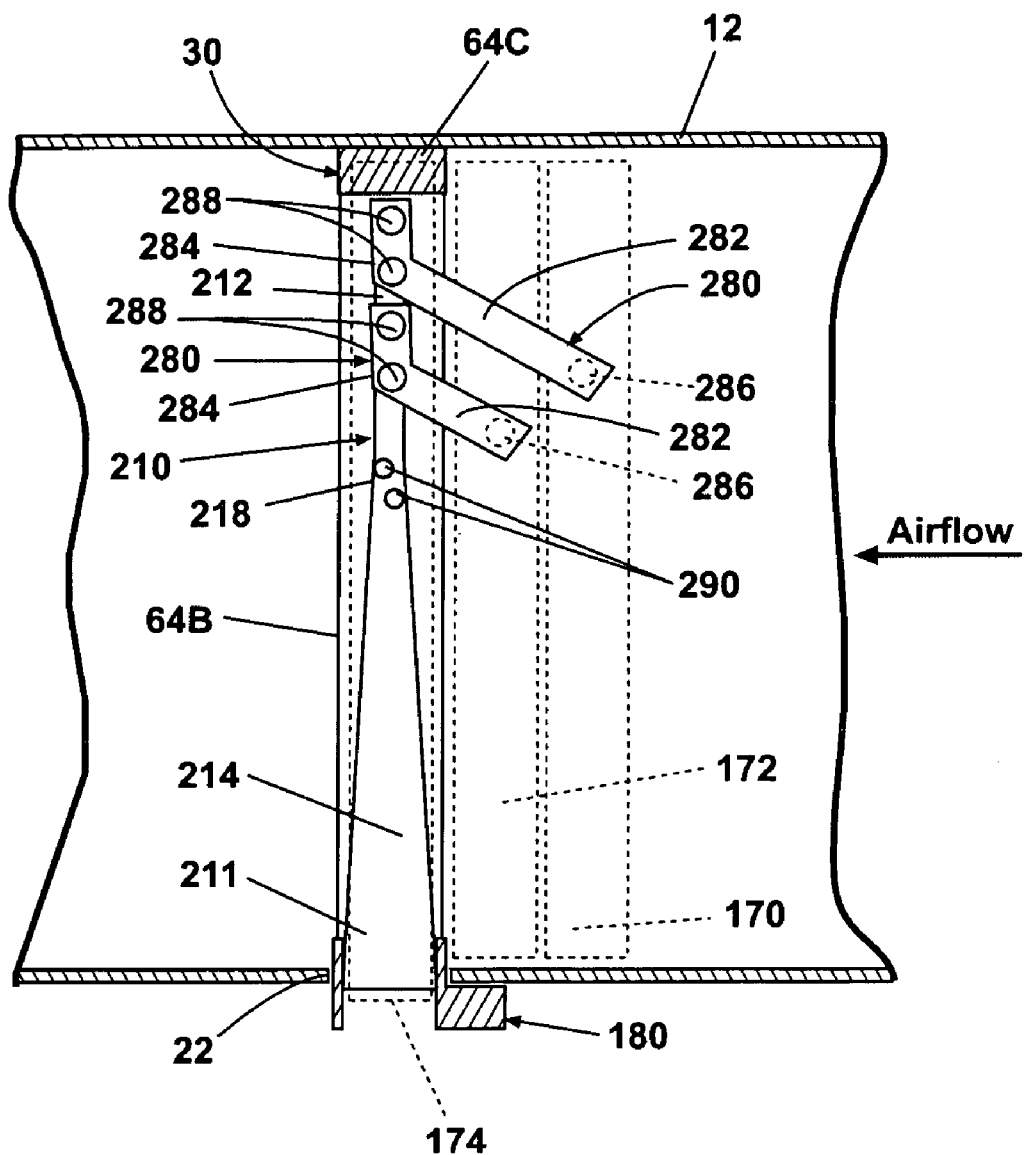
FIG. 44 is a schematic view similar to FIG. 43 with a third filter element of the multiple filter elements fully inserted into the air cleaner frame.

After the second filter element 172 is installed, the user can insert the third filter element 174 into the opening 22 of the return duct 12. The user aligns the pairs of pins 290 with the channels 192 of the frame support 180 and inserts the third filter element 174 into the opening 45 between the channels 192. As the user inserts the third filter element 174 through the opening 45 and the aperture 46, the pairs of pins 290 pass through the channels 192 and enter the proximal ends 211 of the guides 210 to place the positioning coupler/ expander in the insert position. As the user continues to insert the third filter element 174 through the aperture 46 and into the recess 50, the pairs of pins 290 ride along the guides 210. Because the third filter element 174 does not have the swing arms 280, the third filter element 174 remains in the recess 50 as it is inserted into the expandable air cleaner frame 30. When the pairs of pins 290 reach the cam projections 288 of the second filter element 172, as shown in FIG. 44, the positioning coupler/expander are in the installed position, and the entire third filter element 174 is received in the recess 50, except for the proximal rail 246, which resides in the opening 45 between the channels 192 of the frame support 180.

Figure 45:
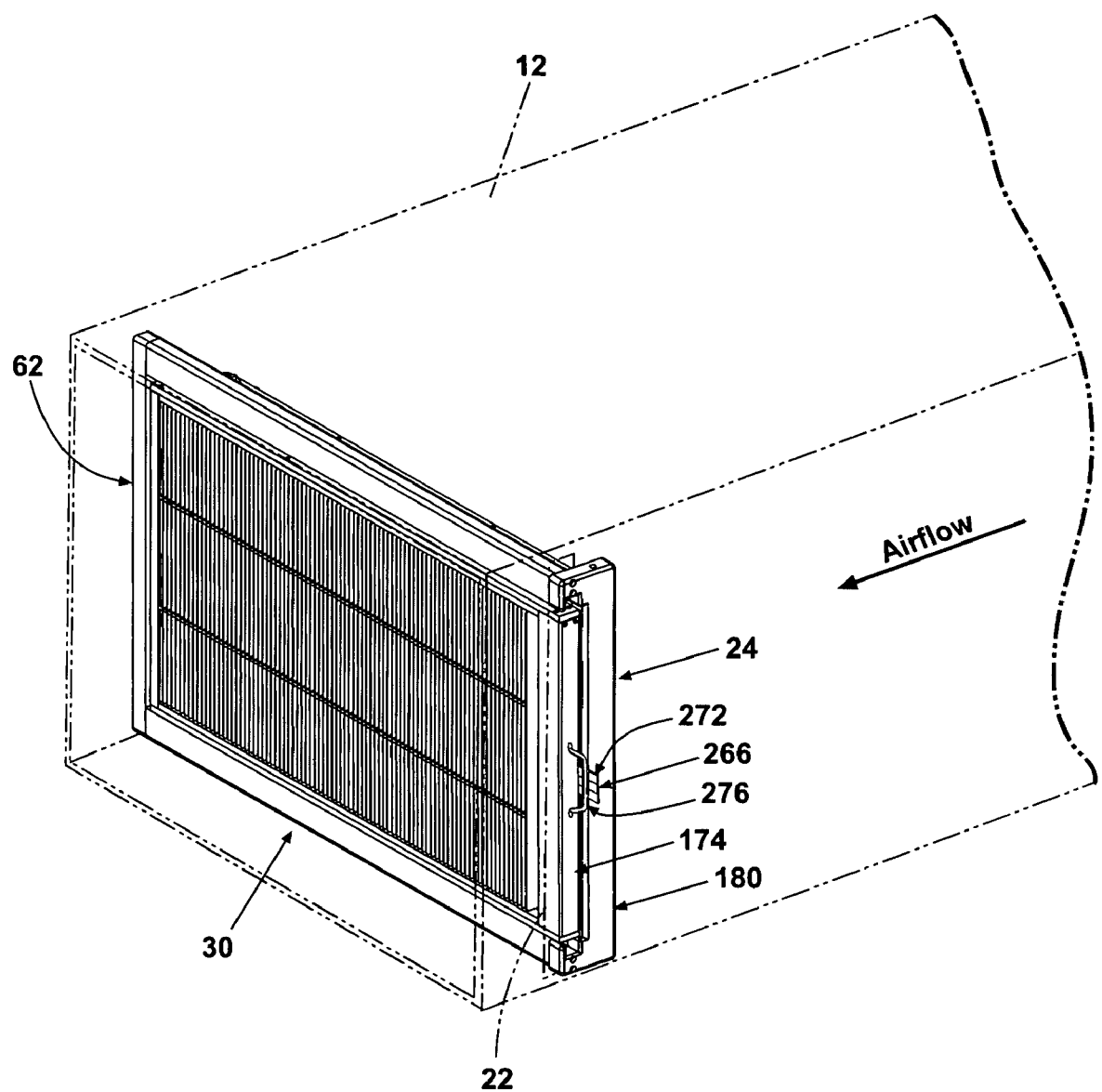
FIG. 45 is a perspective view similar to FIG. 39, wherein the entire air cleaner is mounted inside the return duct.

After the third filter element 174 is installed in the air cleaner frame 30, the entire air cleaner 24 is installed in the return duct 12, as illustrated in FIG. 45, and ready for operation. The spring arms 262 that protrude through the spring clip apertures 256 of the multiple filter elements 170, 172, 174 abut one another to help maintain the positioning of the multiple filter elements 170, 172, 174 relative to one another. As air flows through the return duct 12, as indicated by the arrow in FIGS. 44 and 45, the air cleaner 24 efficiently removes dust and other particulate matter. If any of the multiple filter elements 170, 172, 174 requires replacement or cleaning while the air cleaner frame 30 is disposed in the duct 12, the multiple filter elements 170, 172, 174 can be removed by performing the above assembly process in reverse.

Figure 46:
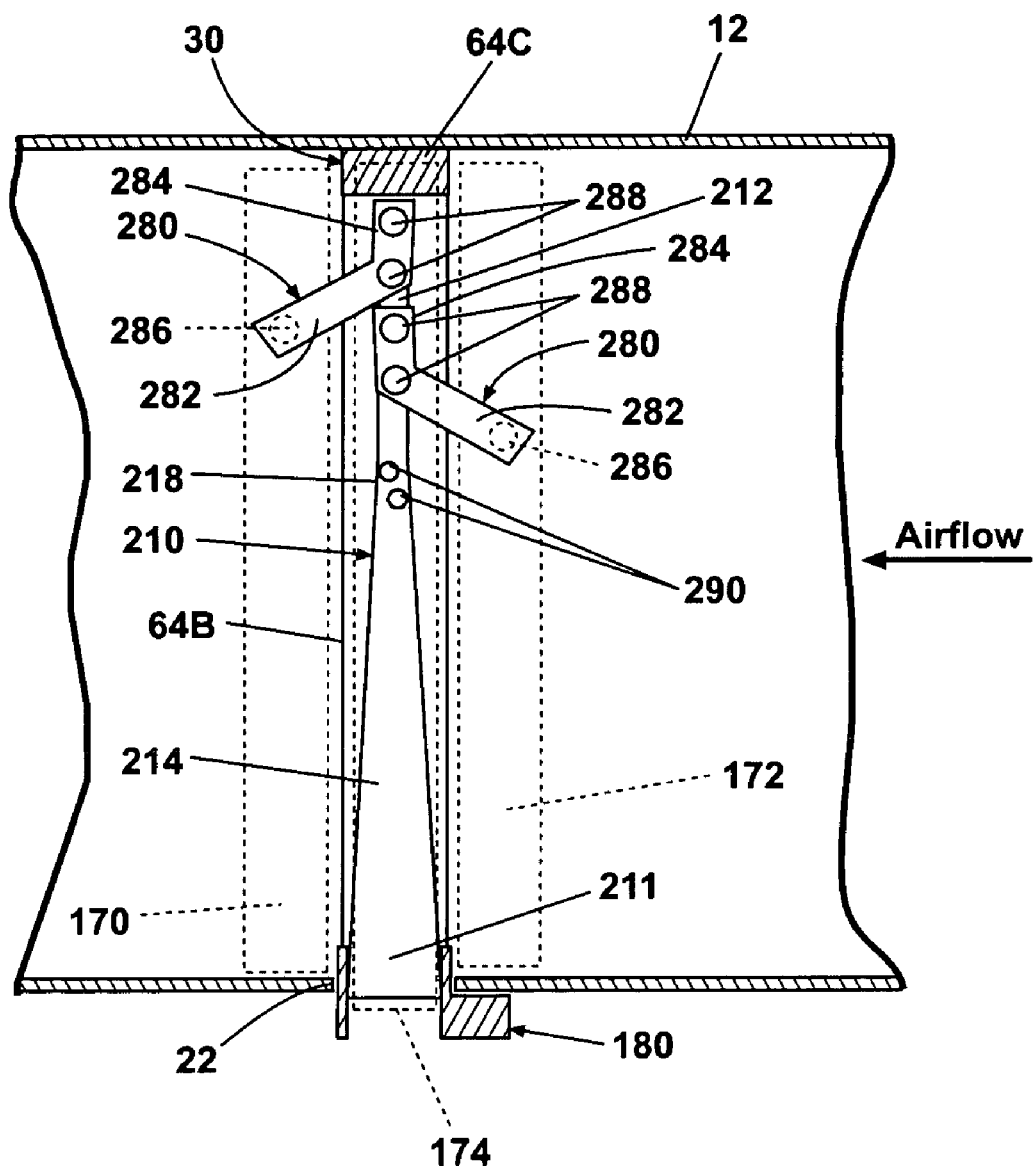
FIG. 46 is a schematic view similar to FIG. 44 with an alternative arrangement of the first, second, and third filter elements relative to the air cleaner frame.

The embodiment of the air cleaner 24 shown in FIGS. 32-45 can be configured to install the second filter element 172 on an opposite side of the recess from the first filter element 170, as schematically illustrated in FIG. 46. To achieve this configuration, the first arm 282 of the swing arms 280 of the second filter element 172 extend from the second arm 284 in a direction opposite of the first arm 282 of the swing arms 280 of the first filter element 170. As a result, the swing arms 280 of the second filter element 172 direct the second filter element 172 to the side of the recess 50 opposite the first filter element 170. The multiple filter elements associated with the air cleaner 24 of FIGS. 32-45 can be arranged in any suitable manner relative to the air cleaner frame 30. For example, the multiple filter elements can be located upstream of the recess 50, downstream of the recess 50, or both upstream and downstream of the recess 50. Further, any suitable quantity of filter elements can be used with the air cleaner 24 of FIGS. 32-45, and the air cleaner 24 can be used with or without a filter element located in the recess 50.

Optionally, the embodiments of the air cleaner 24 shown in FIGS. 32-46 can include a biasing member 300 to bias the swing arms 280 to a ready position wherein the second arm 284 and the cam projections 299 are aligned with the upper and lower rails 242, 244 so that the user does not have to manually align the cam projections 288 with the channels 192 when inserting the filter element into the air cleaner frame 30. The biasing member 300 can be any suitable component or device for biasing the swing arm 280 to the ready position, and exemplary biasing members 300 are illustrated in FIGS. 47-50. To simplify the description of the exemplary biasing members 300, the description will be limited to the swing arm 280 on the upper rail 242 with it understood that the biasing member 300 can be utilized on the swing arm 280 on the lower rail 244 also.

Figure 47:
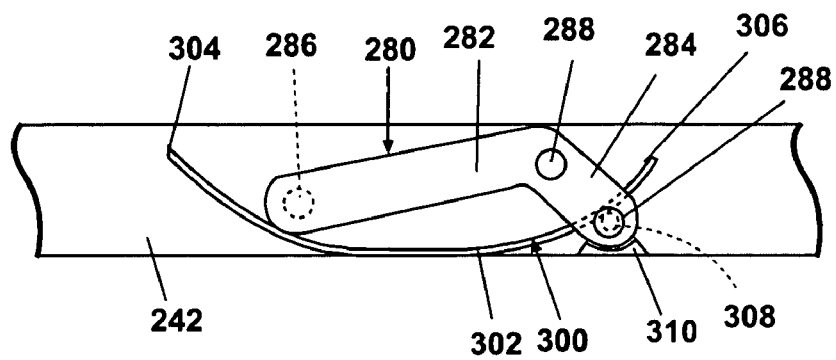
FIG. 47 is a schematic view of one of the multiple filter elements with a swing arm and a leaf spring biasing element for the swing arm, wherein the swing arm is in a ready position.
Figure 48:
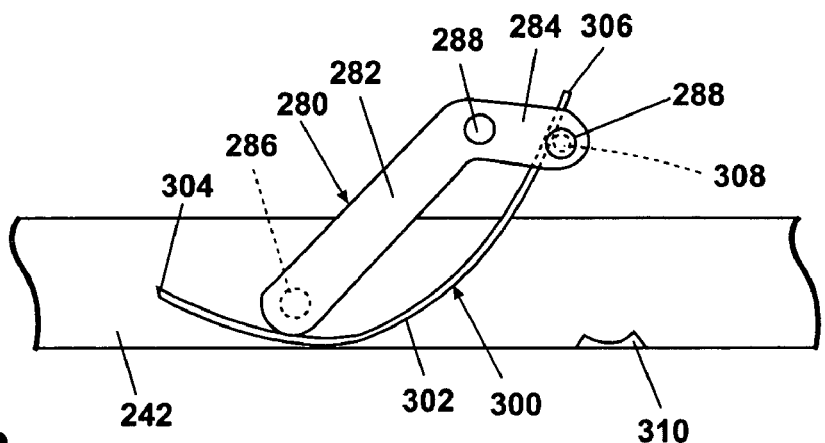
FIG. 48 is a schematic view similar to FIG. 47 with the swing arm moved out of the ready position.

As shown in FIGS. 47 and 48, the biasing member 300 can be in the form of a cantilevered leaf spring 302 with a proximal end 304 fixed to the upper rail 242 and a distal end 306 that slidingly abuts a stem 308 that extends from the second arm 284 of the swing arm 280 on a side opposite the cam projections 288. In this embodiment, the upper rail 242 supports a stop 310 that receives the second arm 284 when the swing arm 280 is in the ready position, as shown in FIG. 47. The leaf spring 302 is positioned such that it curves around the same side of the projection 286 as the second arm 284 and applies a biasing force to the stem 308 and, therefore, the swing arm 280 to bias the swing arm 280 to the ready position so that the cam projections 288 are properly oriented for insertion through the channels 192 of the air cleaner frame 30. When the filter element is inserted into the air cleaner frame 30, the cam projections 288 enter the guide 210 as described above. As the cam projections 288 move along the guide 210, the swing arm 280 rotates to move the filter element out of the recess 50, and the spring leaf 302 bends and slides relative to the stem 308 to accommodate movement of the swing arm 280 and the filter element, as shown in FIG. 48. When the filter element is removed from the air cleaner frame 30, the spring leaf 302 biases the swing arm 280 back to the ready position shown in FIG. 47. Movement of the swing arm 280 past the ready position is prevented by the stop 310 on the upper rail 242.

Figure 49:
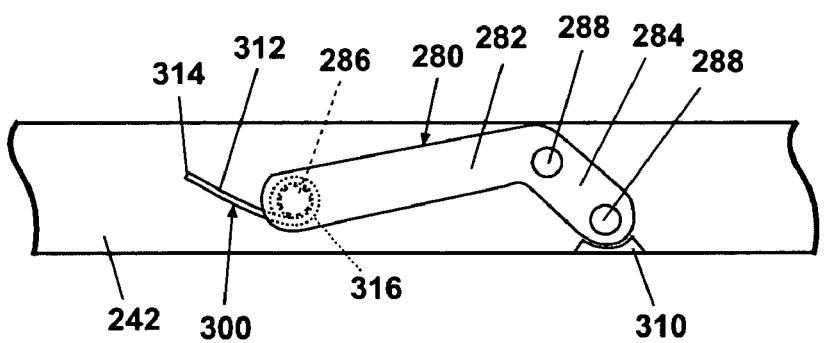
FIG. 49 is a schematic view of one of the multiple filter elements with a swing arm and a torsion spring biasing element for the swing arm, wherein the swing arm is in a ready position.
Figure 50:
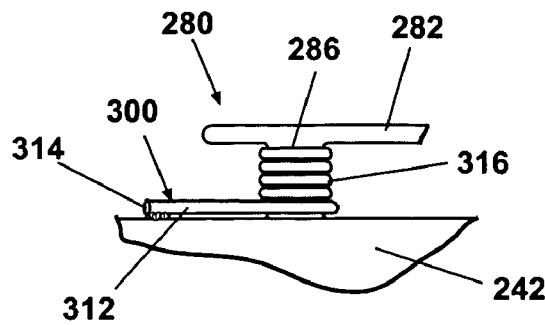
FIG. 50 is a side view of the swing arm and torsion spring biasing element from FIG. 49.

Referring now to FIGS. 49 and 50, the biasing element 300 can be in the form of a torsion spring 312 with a proximal end 312 fixed to the upper rail 242 and a coiled section 316 that surrounds the projection 286 and terminates at a distal end (not shown) fixed to the projection 286. As with the embodiment shown in FIGS. 47 and 48, the upper rail 244 supports a stop 310 that receives the second arm 284 when the swing arm 280 is in the ready position, as shown in FIG. 49. The torsion spring 312 biases the projection 286 so that the swing arm 280 is in the ready position and resists rotation of the projection 286 and, therefore, the swing arm 280 away from the stop 310. However, when the filter element is inserted into the air cleaner frame 30 with the cam projections 288 moving along the guide 210, as described above, rotation of the swing arm 280 forces the torsion spring 312 to further wind around the projection 286 to accommodate movement of the swing arm 280 and the filter element out of the recess 50. When the filter element is removed from the air cleaner frame 30, the torsion spring 312 unwinds and biases the swing arm 280 back to the ready position shown in FIG. 49. Movement of the swing arm 280 past the ready position is prevented by the stop 310 on the upper rail 242.

The air cleaner 24 according to the invention can comprise a filter loading mechanism other than those shown in the figures and described above. For example, the air cleaner frame can comprise a biasing member in the form of a spring that exerts a biasing force in the direction of the airflow within the return duct 12. As a first filter element is inserted into the air cleaner frame, the spring compresses along the direction of the biasing force. A second filter element can be inserted in front of the first filter element whereby the spring is further compressed. This process can be repeated until a desired number of filter elements is inserted into the air cleaner frame. Another exemplary filter loading mechanism can comprise a guide on the air cleaner frame that receives a rotatable cam assembly on the filter element. After the user inserts the filter element into the air cleaner frame, the user rotates the cam assembly to shift the filter element upstream or downstream of the recess. This process can be repeated until a desired number of filter elements is inserted into the air cleaner frame.

The invention can utilize various types of air conditioning elements 130 and collectors 150 that require a power source for operation. Although the power source is not shown in any of the illustrated embodiments, one can easily be coupled with any of the expandable air cleaner frames, air conditioning elements, and collectors to provide power thereto.

The multiple embodiments of air cleaners have been described above and shown in the figures as mounted in the return duct of the air conditioning system. However, it is within the scope of the invention for the air cleaner to be mounted in or to any structure or portion of the air conditioning system through which air flows. For example, the air cleaner can be mounted to the central unit, wherein the air cleaner can be accessed through a side, top, or bottom panel of the central unit. Further, some air conditioning systems can incorporate a separate section between the return duct and the central unit for mounting the air cleaner. In most cases, the separate section essentially forms an extension of the duct to the central unit. For purposes of this invention, any structure thorough which air flows can be generally referred to as a duct.

The air cleaners according to the invention are affordable devices for incorporating advanced filter systems into conventional furnace ducts. Because the air cleaner frame can be introduced and removed through a typical opening in a furnace, air conditioning elements, such as in electrostatic precipitators, ionizers, and the like, can be employed without requiring expensive and labor intensive professional installation. Additionally, a plurality of collectors or collector modules, such as conventional panel filters, pleated filters, electrostatically charged filters, charged plates, odor elimination modules, ultraviolet light modules, and the like, can be used to alone or in conjunction with the air conditioning elements to complement the filtering capabilities of the air conditioning elements and to create customized air filtering that does not significantly reduce the pressure of the airflow therethrough.

While the invention has been specifically described in connection with certain specific embodiments thereof, it is to be understood that this is by way of illustration and not of limitation, and the scope of the appended claims should be construed as broadly as the prior art will permit.

What is claimed is:

1. An air cleaner assembly for an air conditioning system having a duct with an opening having a predetermined size and defining an airflow path, the air cleaner assembly comprising:
   a peripheral frame sized to be slidably received within the opening in the duct, and the peripheral frame forming a recess with an insert opening;
   a filter element mountable to the peripheral frame in an installed position, where at least a portion of the filter element is upstream or downstream of the recess, by inserting the filter element through the insert opening; and
   a positioning coupler operably coupling the filter element and the peripheral frame and guiding the filter element to the installed position as the filter element is inserted through the insert opening.

2. The air cleaner assembly according to claim 1 wherein the positioning coupler comprises a guide support mounted to the peripheral frame for moving the filter element upstream or downstream of the recess.

3. The air cleaner assembly according to claim 2, wherein the guide support is movable from a collapsed condition, where the peripheral frame and the guide support can be inserted through the opening in the duct, to an expanded condition, where at least a portion of the guide support extends upstream or downstream of the recess.

4. The air cleaner assembly according to claim 3, wherein the guide support comprises an actuator to permit the movement of the guide support from the collapsed condition to the expanded condition after the peripheral frame is inserted into the duct.

5. The air cleaner assembly according to claim 2, wherein the guide support comprises a guide that directs the filter element upstream or downstream of the recess as the filter element is inserted into the insert opening.

6. The air cleaner assembly according to claim 5, wherein the positioning coupler further comprises a guide follower mounted on the filter element and operably coupled to the guide for directing the filter element upstream or downstream of the recess.

7. The air cleaner assembly according to claim 6, wherein the guide comprises a groove, and the guide follower comprises a projection sized for receipt within the groove.

8. The air cleaner assembly according to claim 7, wherein the groove comprises an arcuate portion that guides the projection upstream or downstream of the recess as the filter element is inserted through the insert opening.

9. The air cleaner assembly according to claim 6, wherein the guide comprises a tapered groove, and the guide follower comprises a swing arm that mounts the projection and is movably mounted to the filter element such that the swing arm forces the filter element upstream or downstream of the recess as the projection moves along the tapered groove.

10. The air cleaner assembly according to claim 9 and further comprising a biasing element that biases the swing arm to a ready position wherein the projection is oriented relative to the filter element for insertion into the guide.

11. An air cleaner assembly for an air conditioning system having a duct with an opening having a predetermined size and defining an airflow path, the air cleaner assembly comprising:
    a peripheral frame sized to be slidably received within the opening in the duct, and the peripheral frame forming a recess with an insert opening;
    a first filter element sized to be slidably received in the recess through the insert opening; and
    an expander mounted to the peripheral frame and operable from an insert condition to an installed condition for moving the first filter element in a direction along the air flow path from the recess to an installed position wherein at least a portion of the first filter element is exterior of the recess.

12. The air cleaner assembly according to claim 11, wherein the exterior of the recess is one of upstream and downstream of the recess relative to the airflow path in the duct.

13. The air cleaner assembly according to claim 12 and further comprising a second filter element in the other of the upstream and downstream of the recess.

14. The air cleaner assembly according to claim 13 and further comprising a second filter element in the recess.

15. The air cleaner assembly according to claim 14 and further comprising a third filter element in the other of the upstream and downstream of the recess.

16. The air cleaner assembly according to claim 11, wherein the first filter element is inserted into the recess through the insert opening.

17. The air cleaner assembly according to claim 11, wherein the expander comprises an auxiliary peripheral frame sized to carry the first filter element and located at least partially in the recess when the expander is in the insert condition and exterior of the recess when the expander is in the installed condition.

18. The air cleaner assembly according to claim 17, wherein the expander further comprises an expansion mechanism that couples the auxiliary peripheral frame to the peripheral frame and moves the auxiliary peripheral frame relative to the peripheral frame when the expander moves between the insert and the installed conditions.

19. The air cleaner assembly according to claim 11, wherein the expander comprises a guide that directs the first filter element exterior of the recess as the first filter element is inserted into the insert opening.

20. The air cleaner assembly according to claim 19, wherein the expander further comprises a guide follower mounted on the first filter element and operably coupled to the guide for directing the first filter element exterior of the recess.

21. The air cleaner assembly according to claim 20, wherein the guide comprises a groove in the expander, and the guide follower comprises a projection sized for receipt within the groove.

22. The air cleaner assembly according to claim 21, wherein the groove comprises an arcuate portion that guides the projection exterior of the recess as the expander moves to the installed condition.

23. The air cleaner assembly according to claim 20, wherein the guide comprises a tapered groove, and the guide follower comprises a swing arm that mounts the projection and is movably mounted to the first filter element and the tapered groove such that the tapered groove forces the swing arm and the first filter element exterior of the recess as the projection moves along the tapered groove.

24. The air cleaner assembly according to claim 23 and further comprising a biasing element that biases the swing arm to a ready position wherein the projection is oriented relative to the first filter element for insertion into the guide.

* * * * *